United States Patent [19]
Nishimura et al.

[11] Patent Number: 5,950,419
[45] Date of Patent: *Sep. 14, 1999

[54] METHOD OF AND SYSTEM FOR PURIFYING EXHAUST GAS FOR ENGINES

[75] Inventors: Hirofumi Nishimura, Hiroshima; Tadataka Nakazumi, Kure; Ken Umehara, Higashihiroshima; Takanobu Morimasa, Yokohama; Masanori Misumi, Hiroshima, all of Japan

[73] Assignee: Mazda Motor Corporation, Hiroshima-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/578,306

[22] Filed: Dec. 26, 1995

[30] Foreign Application Priority Data

Dec. 28, 1994 [JP] Japan ................................. 6-328975
Aug. 31, 1995 [JP] Japan ................................. 7-223938

[51] Int. Cl.⁶ .................................................... F01N 3/00
[52] U.S. Cl. .............................. 60/274; 60/276; 60/284; 60/285
[58] Field of Search ..................... 60/276, 284, 285, 60/274

[56] References Cited

U.S. PATENT DOCUMENTS

| | | | |
|---|---|---|---|
| 4,119,065 | 10/1978 | Noguchi | 123/290 |
| 4,351,297 | 9/1982 | Suematsu . | |
| 4,359,997 | 11/1982 | Lyssy | 123/592 |
| 5,050,551 | 9/1991 | Morikawa . | |
| 5,205,120 | 4/1993 | Oblander | 123/531 |
| 5,211,011 | 5/1993 | Nishikawa | 60/284 |
| 5,293,741 | 3/1994 | Kashiyama | 60/284 |
| 5,339,630 | 8/1994 | Petit . | |
| 5,501,073 | 3/1996 | Miyashita | 60/285 |
| 5,584,176 | 12/1996 | Meyer | 60/284 |

FOREIGN PATENT DOCUMENTS

| | | |
|---|---|---|
| 0 499 207 A1 | 8/1992 | European Pat. Off. . |
| 6/93943 | 4/1994 | Japan . |
| 6167212 | 6/1994 | Japan . |
| WO 94/17293 | 8/1994 | WIPO . |

OTHER PUBLICATIONS

Patent Abstracts of Japan, Publication No. 05026138, Publication Date: Feb. 2, 1993.
Patent Abstracts of Japan, Publication No. 55161937, Publication Date: Dec. 16, 1980.
Patent Abstracts of Japan, Publication No. 05010238, Publication Date: Jan. 19, 1993.
Patent Abstracts of Japan, Publication No. 04153576, Publication Date: May 27, 1992.
Patent Abstracts of Japan, Publication No. 05272396, Publication Date: Oct. 19, 1993.

*Primary Examiner*—Douglas Hart
*Attorney, Agent, or Firm*—Sixbey, Friedman, Leedom & Ferguson; Donald R. Studebaker

[57] ABSTRACT

Exhaust gas temperature is raised after a cold engine start so as to rapidly activate a catalyst in an exhaust line by retarding an ignition timing at which an air-fuel mixture is fired in the engine to a point after top-dead-center during a certain time interval and promoting combustion of the air-fuel mixture, thereby accelerating the catalyst to attain its effective activation temperature after the cold engine start as quickly as possibly.

126 Claims, 25 Drawing Sheets

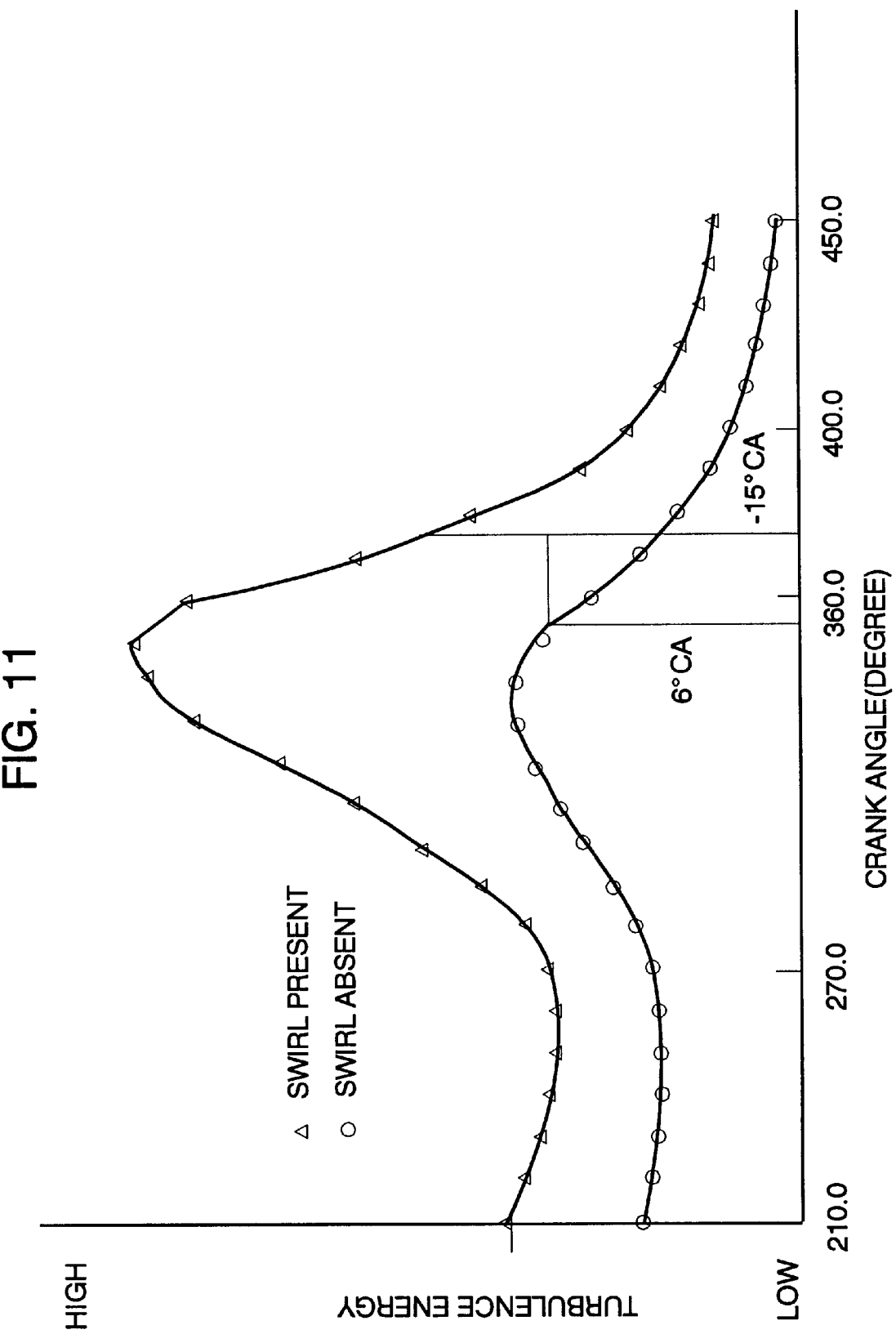

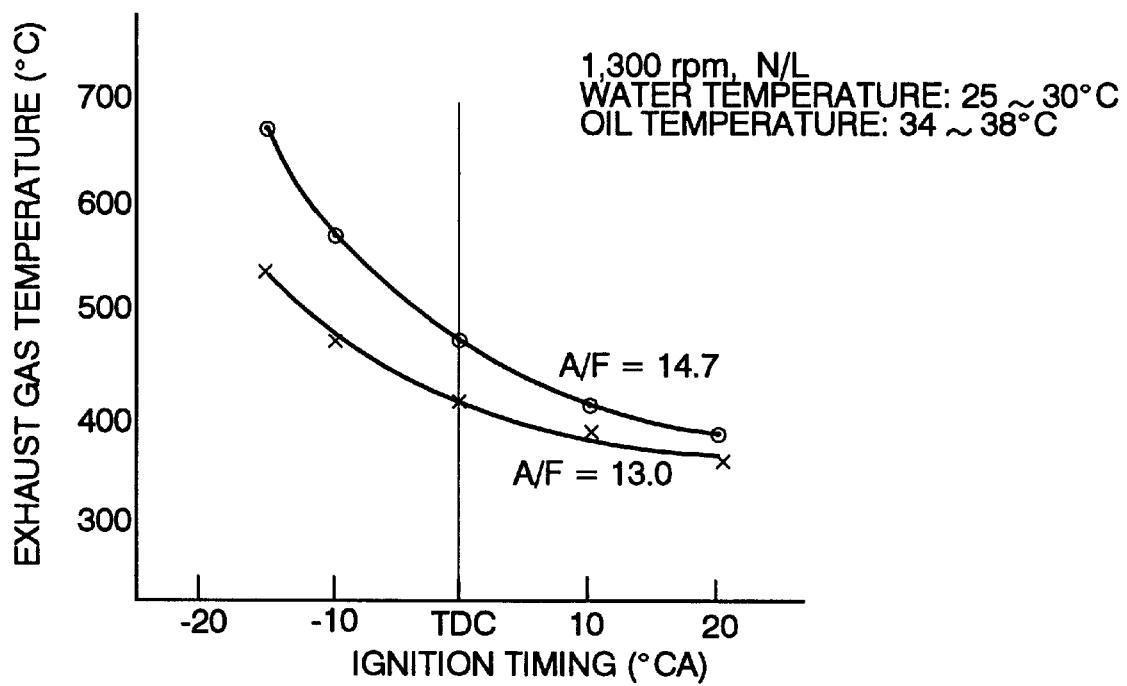

METHOD OF AND SYSTEM FOR PURIFYING EXHAUST GAS FOR ENGINES

BACKGROUND OF THE INVENTION

1. Field of the Invention

The present invention relates to a method of purifying the exhaust gasses for a reciprocating type of an internal combustion engine and an system for implementing the method.

2. Description of Related Art

Typically, catalytic converters, conventionally employed in exhaust systems for automobile engines, have the purpose of controlling exhaust gas emissions through the chemical conversion of hydrocarbons (HC), carbon monoxide (CO) and nitrogen oxides (NOx) into non-polluting components, such as water, carbon dioxide, and nitrogen and purifying the exhaust gas.

Conventional three-way catalytic converters make use of precious metal catalysts, such as platinum, rhodium and palladium, incorporated into a silicon oxide carrier, and must operate above a specific activation temperature of, for example, 350° C. in order to adequately convert exhaust gas emissions to the aforementioned non-polluting components. Because the temperature of exhaust gas, under normal engine operating conditions when the engine is in a warmed up condition, normally ranges from 700 to 900° C. and the catalytic converter is kept at a temperature well above its activation temperature, the desired level of exhaust gas emission control can be adequately obtained.

The catalytic converter, however, gradually increases in temperature with the exhaust gas when the engine operates before being sufficiently warmed up, the result being that exhaust gas emission control is ineffective for approximately the first 60 seconds after an engine start. As a result, hydrocarbons (HC), carbon monoxide (CO) and nitrogen oxides (NOx) contained in the exhaust gas are released into the atmosphere during the cold start until the catalytic converter reaches the effective activation temperature. This demonstrates the necessity of a means to quickly raise the temperature of catalyst to the effective activation temperature within, for example, approximately the first 20 seconds of engine operation after a cold start.

Various means of dealing with this problem have been proposed. For example, Japanese Unexamined Patent Publication No. 4-66715 proposes a system or device of solving the problem through the installation of an electric catalyst heater in an exhaust duct upstream from the catalytic converter, or in the catalytic converter itself in close proximity to the inlet thereof, with the purpose of quickly raising the temperature of the exhaust gas so as to force the catalyst to reach the effective activation temperature while the engine is warming up. Otherwise, Japanese Unexamined Patent Publication No. 6-1672 proposes an afterburner device which is installed in an exhaust duct upstream from the catalytic converter, or in the catalytic converter itself in close proximity to the inlet thereof, with the purpose of quickly raising the temperature of the exhaust gas so as to force the catalyst to reach the effective activation temperature while the engine is warming up.

These exhaust gas purifying systems equipped with the electric catalyst heater or the afterburner device are disadvantageous because these heater and afterburner demand construction of additional components which make the exhaust gas purifying system larger and more complex, and because they pose problems in regard to their integration into the overall design of the vehicle. Moreover, not only the electric heater demands a large amount of electrical power which necessitates the use of a higher capacity battery and alternator than would normally be required in the vehicle, but also a control box would be required for the electric heater, along with heavy gauge wiring, both of which would pose additional problems in integrating the design into the vehicle.

SUMMARY OF THE INVENTION

It is an object of the present invention to provide a method of and a system for exhaust gas purification which can quickly raise the temperature of catalyst to an effective activation temperature during engine warm-up after a cold engine start.

It is another object of the present invention to provide an exhaust gas purifying system of simple construction which can be easily integrated into vehicle design.

The aforesaid objects of the present invention are accomplished by providing a method of and a system for purifying exhaust gas from a reciprocating internal combustion engine of a vehicle which is equipped with an exhaust system having a catalytic converter. A rise in exhaust gas temperature to an effective activation temperature of the catalyst is controlled during a time interval when the engine starts in a cold condition, by means of exhaust gas temperature control in which engine operation is controlled so as to retard the ignition timing at which an air-fuel mixture is fired in the engine to a point after top-dead-center during the time interval for a necessary rise in exhaust gas temperature and to promote combustion of the air-fuel mixture, thereby accelerating the necessary rise in exhaust gas temperature so that the catalyst attains the effective activation temperature as soon as possible. The retardation of the ignition timing may be made according to a warmed condition detected at said engine start by said thermal condition monitoring means.

According to an aspect of the present invention, the exhaust gas temperature control alters an in-cylinder air-fuel ratio at which the air-fuel mixture is introduced into the engine in a range from 13.5 to 18.0 during the time interval for the rise in exhaust gas temperature.

According to another aspect of the present invention, the exhaust gas temperature control alters an excessive air ratio of the air-fuel mixture greater than one (1) during the time interval for the rise in exhaust gas temperature.

According to another aspect of the present invention, the exhaust gas temperature control alters the in-cylinder air-fuel ratio and supply part of intake air directly to the exhaust gas upstream from the catalytic converter so as to alter a virtual exhaust air-fuel ratio, which is defined as a ratio of a total amount of intake air including intake air introduced into the air-fuel mixture and the intake air supplied directly to the exhaust gas relative to an amount of fuel introduced into the air-fuel mixture, is at greater than 14.5. Regulating the amount of intake air independently from operation of an engine throttle valve according to a warmed condition detected at an engine start changes the in-cylinder air-fuel ratio and maintains a specified speed of the engine in the time interval for the necessary rise in exhaust gas temperature.

According to another aspect of the present invention, altering the ignition timing to the point after top-dead-center is made after the engine has attained the specified speed of revolution subsequently to the cold start.

The in-cylinder air-fuel ratio is feedback controlled based on a concentration of oxygen ($O_2$) in the exhaust gas which may be monitored by a heater incorporated lambda oxygen (λO$_2$) sensor so as to reach a stoichiometric air-fuel ratio as a target ratio during the time interval for the rise in exhaust gas temperature.

According to another aspect of the present invention, the amount of intake air introduced into the engine independently from operation of the throttle valve is regulated at the beginning of the time interval for the rise in exhaust gas temperature so as to maintain the specified engine speed and thereafter the ignition timing is further retarded so as to decrease the engine speed below the specified engine speed during the time interval for the rise in exhaust gas temperature.

According to another aspect of the present invention, the ignition timing is retarded to a point more later but before top-dead-center when the vehicle starts under a driving condition during the time interval for the rise in exhaust gas temperature than when driving under the same driving condition after the time interval for the rise in exhaust gas temperature.

According to another aspect of the present invention, while the ignition timing is retarded to a point after top-dead-center during the time interval for a necessary rise in exhaust gas temperature to the effective activation temperature of the catalyst, enhanced turbulence, such as a swirl and/or a tumble, of the air-fuel mixture is generated in the cylinder so as to promote combustion of the air-fuel mixture. In order to generate enhanced turbulence of the air-fuel mixture acceleration of a flow of intake air entering the cylinder, which is effected by means of a low lift type of an intake valve, may be employed. Otherwise, an air-mixing type of a fuel injector may be installed to deliver fuel mixed with air.

The time interval for a rise in exhaust gas temperature is terminated when a specified temperature of exhaust gas is reached. The specified temperature may be monitored based on the temperature of engine cooling water.

The catalyst is heated to its effective activation temperature by the exhaust gas whose temperature is raised by setting the ignition timing of the engine at a point after top-dead-center and igniting an air-fuel mixture directly after the beginning of an expansion stroke after which combustion of the air-fuel mixture initiates. This sequence takes place directly after an initial engine start during a time interval for a rise in exhaust gas temperature. Consequently, the conversion rate at which thermal energy is converted into engine shaft driving power (net power) lowers, resulting in an increase in thermal energy loss which leads to a rise in exhaust gas temperature. Typically, while retarding the ignition timing to a point after top-dead-center would normally result in torque fluctuations induced by a reduction in the stability of engine cycling caused by lowered combustion efficiency and a drop in net power output, nevertheless, according to the exhaust gas purifying system, efficient ignition and combustion of an air-fuel mixture is caused, ensuring the least stability of cycling stability as needed and keeping torque fluctuations to a minimum.

During the time interval for a rise in exhaust gas temperature, the air-fuel ratio is set in a range of 13.5:1 to 18.0:1. As compared to conventional engines by which an air-fuel ratio of 12:1 to 13:1 is utilized, the amount of latent heat energy needed for fuel atomization and the amount of practical heat needed to raise fuel temperature is reduced. These reductions in thermal demand are applied to a further rise in exhaust gas temperature. In particular, establishing the excessive air ratio as more than 1 during the time interval for a rise in exhaust gas temperature, that is, providing the air-fuel ratio leaner than the stoichiometric air-fuel ratio, decreases the thermal energy needed to raise the temperature of fuel and atomize fuel with a resultant rise in exhaust gas temperature. Moreover, the amount of hydrocarbon emission generated during a cold engine start is decreased.

Secondary air supplied to the exhaust gas upstream from the catalytic converter and heat of the exhaust gas increased by the retardation of the ignition timing to a point after top-dead-center aid combustion of residual fuel in the exhaust gas. The heat of combustion of the residual fuel promotes a further rise in exhaust gas temperature. Moreover, during the time interval for a rise in exhaust gas temperature, residual fuel is positively burned and the temperature of exhaust gas is increased as a result of the virtual exhaust air-fuel ratio being maintained lean at higher than a stoichiometric air-fuel ratio of 14.5. Setting the ignition timing at a point after top-dead-center is caused after a boost of engine speed following a full explosion after engine cranking, making the engine operate stably at the setting of the ignition timing at the point after top-dead-center.

Feedback controlling the air-fuel ratio starts during the time interval for a rise in exhaust gas temperature, preventing an air-fuel mixture from enriching and, consequently, the exhaust gas temperature rise is accelerated, while the amount of hydrocarbon emission is reduced.

During the time interval for the exhaust gas temperature rise after a cold engine start, the retardation of ignition timing is adequately determined according to the temperature of engine cooling water. Further, during the time interval for the exhaust gas temperature rise after a cold engine start, the amount of intake air is adequately determined according to the temperature of engine cooling water. The amount of intake air is increasingly or decreasingly controlled during the time interval for the exhaust gas temperature rise to maintains a specified engine speed, reducing torque fluctuations even while the temperature of exhaust gas is rising during engine warming-up.

The ignition timing is set on the retarded side after a certain amount of time has passed while the temperature of exhaust gas is being raised with the effect of decreasing engine speed, resulting in reduced engine noise and non-lurching sensation when the vehicle is put into gear.

The ignition timing is retarded to a point more later but before top-dead-center when the vehicle starts under a driving condition while the temperature of exhaust gas is being raised than when driving under the same driving condition after the exhaust gas temperature rise time interval. This provides favorable starting ability and drivability of the vehicle. Moreover, while, immediately after the vehicle starts, the engine experiences a rapidly increased load and an increased amount of fuel consumption, which typically leads to an increased absolute amount of hydrocarbon emissions, nevertheless, setting the ignition timing retarded by a small angle from an ordinary advanced timing provides a decrease in the amount of hydrocarbon emissions. Moreover, heat increased due to an increase engine load and the retardation of ignition timing produce the effect of raising the temperature of exhaust gas. Even in cases where the vehicle starts during the exhaust gas temperature rise time interval, the ignition timing is set to a point before top-dead-center when the engine is at a high level of output, the vehicle runs with more improved driving performance. The ignition timing is, on the other hand, retarded to a point after top-dead-center when the engine is at a low level of output, the exhaust gas temperature rise is accelerated.

Generating air turbulence, such as a swirl and a tumble, inside of the engine cylinders has the effect of promoting efficient ignition and combustion of an air-fuel mixture. A low-lift type of intake valve acts to speed the flow of intake air from the intake manifold to the inside of the cylinder with the effect of promoting efficient ignition and combustion of an air-fuel mixture. Further, the employment of an air mixing type of fuel injector which injects a mixture of air and fuel into the intake manifold promotes efficient ignition and combustion of the air-fuel mixture. Moreover, a high level of air-fuel mixture ignition energy has the purpose of promoting efficient ignition and combustion of the air-fuel mixture.

Simply terminating the time interval for the exhaust gas temperature rise after a specified time period has elapsed enables an engine control logic and control unit to be simplified. The time interval for the exhaust gas temperature rise is terminated after the exhaust gas downstream from the catalytic converter has reached a specified temperature, thus raising the temperature of exhaust gas until the catalyst attains its effective activation temperature and quickly increasing engine net output after the activation of the catalyst. The time interval for the exhaust gas temperature is terminated when the temperature of engine cooling water, which correlates closely with the temperature of exhaust gas. This assures a rise in the temperature of exhaust gas until the catalyst certainly attains its activation temperature and, after the achievement of activation of the catalyst, quickly raises the net output of the engine.

The ignition timing is set at a point after top-dead center during the time interval for the exhaust gas temperature rise after the engine starts in a cold condition, igniting an air-fuel mixture first in an expansion stroke. Resultingly, the conversion rate of thermal to engine shaft driving energy (net power) is lowered, increasing thermal energy loss due to which the temperature of exhaust gas rises. Moreover, while setting the ignition timing at a point after top-dead-center will generally destabilize engine cycling through torque fluctuations induced from worsened combustion conditions and lower net power output, the exhaust gas purifying system the present invention provides improves ignition and combustion of an air-fuel mixture to a point where a minimum level of engine cycling stability is maintained and torque fluctuations are adequately controlled.

Setting the ignition timing at a point after top-dead-center during the time interval for the rise in the temperature of exhaust gas after an engine cold start causes ignition of an air-fuel mixture for the first time in an expansion stroke and thereafter, combustion of the air-fuel mixture initiates. Resultingly, the rate of conversion of thermal energy to engine shaft driving power (net power) is lowered, resulting in to an increase in thermal energy loss increases which always induces a rise in the temperature of exhaust gas.

BRIEF DESCRIPTION OF THE DRAWINGS

The above and other objects and features of the present invention will be clearly understood from the following description in connection with preferred embodiments of the present invention when considered in conjunction with the accompanying drawings, in which:

FIG. 11 is a graph showing characteristic curves of in-cylinder turbulence energy of an air-fuel mixture in relation to crank angle;

FIG. 13 is a graph showing characteristic curves of exhaust gas temperature in relation to ignition timing for different air-fuel ratios;

DETAILED DESCRIPTION OF THE PREFERRED EMBODIMENTS

Figure 1:
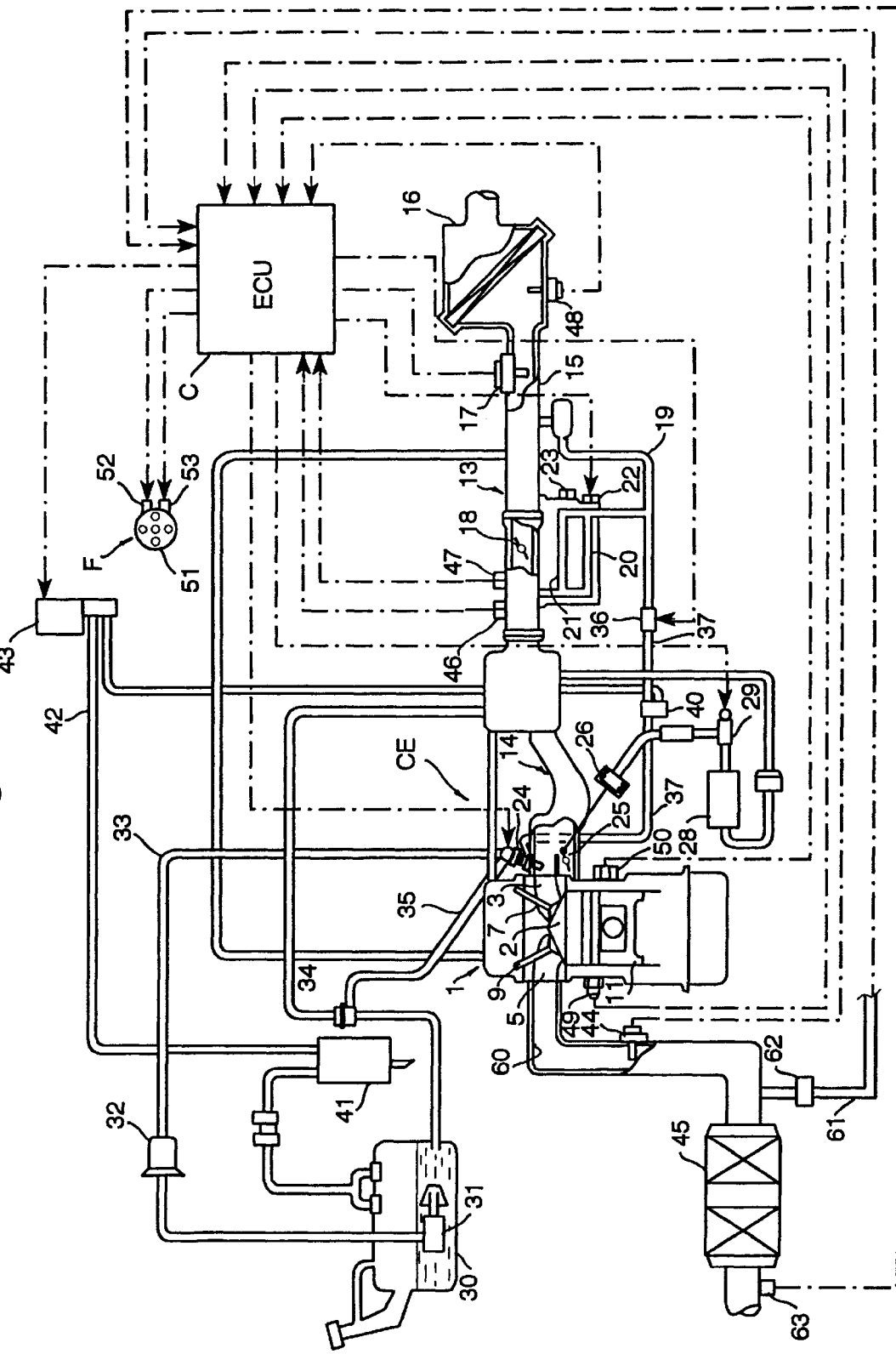
FIG. 1 is a schematic illustration showing a reciprocal internal combustion engine equipped with an exhaust gas purifying system in accordance of an embodiment of the present invention.

Referring to the drawings in detail, and in particular FIG. 1, which schematically shows overall structure of a reciprocal internal combustion engine CE equipped with an exhaust gas purifying system in accordance with a preferred embodiment of the present invention, an engine body 1 having a plurality of cylinders of which only one cylinder is shown and each of which is provided with a combustion chamber 2. A fuel-air mixture is supplied through first and second intake ports 3 and 4, and combusted in the combustion chamber 2. Burned gases are discharged as exhaust gas through first and second exhaust ports 5 and 6 into an exhaust duct 60. The first and second intake ports 3 and 4 are opened and closed by first and second intake valves 7 and 8, respectively, at a specified timing cycle. Similarly, the first and second exhaust ports 5 and 6 are opened and closed by first and second exhaust valves 9 and 10, respectively, at a specified timing cycle. The air-fuel mixture supplied to the combustion chamber 2 is compressed by a piston 11 and ignited by a spark plug 12 (see FIG. 3) at a specified timing, namely a crank angle. The time or the crank angle at which the ignition plug 12 fires is desirably altered by means of an ignition mechanism F which refers to an ignition timing control means in this specification. The ignition mechanism F is capable of setting the ignition timing in a wide range from a point (MBT) advanced by at least a predetermined angle from top-dead-center, where maximum torque is generated or the greatest net output power is obtained, to a point retarded by a large angle, for example 30° in crank angle, from top-dead-center.

Intake system 13, which is utilized to supply air to each cylinder of the engine CE, is comprised of an intake manifold 14 and a common intake duct 15 which is attached in common to an air inlet of the manifold 14. The common intake duct 15 is provided in order from the upstream end an air cleaner 16, a hot wire type of air flow sensor 17 and a throttle valve 18. An intake air bypass duct 19 is installed in the common intake duct 15 so as to allow air to flow bypassing the throttle valve 18. This intake air bypass duct 19 is equipped with a relatively small diameter of an idle speed control (ISC) duct 20 which adjusts the amount of intake air introduced into the engine EC during engine idling, and a relatively large diameter of air duct 21 which is used for raising exhaust gas temperature. An idle speed control (ISC) valve 22 is installed to the idle speed control duct 20 with the purpose of controlling the amount of air entering the idle speed control duct 20. Idle speed control is executed by an engine control unit (ECU) C as will be discussed later. The exhaust temperature rising air duct 21 is equipped with an air control valve 23 which is duty-controlled by the engine control unit (ECU) C so as to adjust the amount of air flowing therein. The bypass air supply system may include, in addition to the idle speed control air duct 20 and the exhaust temperature rising air duct 21, a third route of air duct (not shown) which increases the amount of intake air during cold start of the engine or while the engine temperature is low. In this instance, the air duct 21 must have the largest area of cross section among the three and the third air duct must have the smallest area of cross section among the three. Accordingly, the idle speed control air duct 20 has an area of cross section between those of the others.

Idling engine speed is maintained at a specified speed by means of adjusting the amount of bypass air entering the air duct 20 and the air duct 21, respectively, at the air control valve 22 and the air control valve 23. These air control valves 22 and 23 are controlled by means of the engine control unit C, thus allowing idling speed to be desirably set by the engine control unit C. The bypass air supply system consisting of these air ducts 19, 20 and 21 and air control valves 22 and 23 are referred to in this specification as an intake air volume control means.

A fuel injector 24 is installed to the first intake port 3 with the purpose of injecting fuel into the air in the first intake port 3. A turbulence control valve 25 is installed to the second intake port 4 with the purpose of opening and closing the second intake port 4. This turbulence control valve 25 is operated by means of a vacuum or negative pressure response actuator 26. A solenoid valve 29, disposed between a vacuum tank 28 which accumulates vacuum pressure supplied from a surge tank 27 installed within the intake manifold 14 and the actuator 26, controls supply and discharge of the vacuum pressure from the vacuum tank 28 to operate the actuator 26.

Ignition timing (which is represented by a crank angle) of fuel injection and the amount of fuel injected by the fuel injector 24 are controlled by means of the engine control unit (ECU) C in response to operating conditions of the engine CE. Engine control unit (ECU) C sets the amount of fuel injection through the injector 24 based on the amount of intake air entering the engine CE which is monitored by the air flow sensor 17, thereby allowing the air-fuel ratio of a fuel mixture supplied to the combustion chamber 2 to be desirably adjusted. For the sake of convenience, the term "in-cylinder air-fuel ratio" as used herein shall mean and refer to the air-fuel ratio at which a fuel mixture is supplied to the combustion chamber, and the term "secondary air supplied air-fuel ratio" or "exhaust air-fuel ratio" as used herein shall mean and refer to the virtual air-fuel ratio which is the ratio of the sum of intake air, including the amount of intake air supplied to the combustion chamber and the amount of intake air added as secondary air to the exhaust, relative to the amount of injected fuel.

Fuel injector 24 is of an air mixture-type which forms fine fuel particles in the proximity of the fuel discharge nozzle by supplying mixing air. A fuel is supplied by a fuel pump 31 to the fuel injector 24 through a fuel supply line 33 from a fuel tank 30 via a fuel filter 32 and returned to the fuel tank 30 through a fuel return line 35 via a pressure regulator valve 34. The fuel injector 24 cooperates with a mixing air supply system and a fuel vapor supply system which are well known in various types in the art and take any known form.

Although not shown in detail in the figure, in the air-mixing type fuel supply system, the mixing air supply system for the fuel injector 24 disposed at the first intake port 3 of each cylinder includes a mixing air duct 37 equipped with an air control valve 36. The mixing air duct 37 is connected at its upstream end to the intake bypass duct 19 and at its branched downstream ends to the respective fuel injectors 24, is installed on a branch at the air outlet side of supply duct 37 at each cylinder. Air control valve 36 is opened and closed by the engine control unit C in accordance with operating conditions. For example, when the engine CE is completely warmed up, the air control valve 36 is closed during idling or when the engine CE is running under high engine loads and is otherwise open to supply mixing air to the fuel injector 24.

Fuel vapor supply system includes a canister 41 which collects or traps fuel vapors discharged from the fuel tank 30 and a purge duct 42, provided with a purge solenoid valve 43, which extends from the canister 41 and is connected to a mixing chamber 40 formed upstream from a point at which the mixing air duct 37. The fuel vapors collected or trapped in the canister 41 enter the purge duct 42 when the purge solenoid valve 43 activates and are supplied to the injector 24 in close proximity to the injection nozzle, thus allowing the fuel vapors to enter the combustion chamber 2 during intake strokes.

Purge solenoid valve 43, which is activated by the engine control unit C when predetermined purge conditions are met, allows an amount of purged fuel vapors specified according to engine operating conditions to enter the air-mixing system. The purge solenoid valve 43 is operated at, for instance, a duty rate of 20% when the amount of purged fuel vapors is established to be constant in a specified range of engine operating conditions where a stoichiometric air fuel mixture is maintained in spite of engine speeds and engine loads. On the other hand, the purge solenoid valve 43 is controlled in response to the amount of intake air detected by the air flow sensor 17 and engine speed so that the amount of purge fuel vapors is reduced during a lean burn driving condition where the air-fuel ratio is on the lean side as compared with during driving conditions where the stoichiometric air fuel mixture is set range and that the rate of reduction in the amount of purged fuel vapors becomes larger with a decrease in the amount of intake air. In this manner, air-mixing fuel injection by the injector 24 acts to break fuel into fine particles, providing a uniform mixture of air and fuel that can be ignited and combusted with greater efficiency while reducing nitrogen oxides (NOx) emissions during lean burn driving conditions.

While not shown in the figure, the ignition mechanism F, which supplies electrical power to the spark plug 12 to ignite the air-fuel mixture, can be designed as a high-energy type of ignition system which produces a high energy spark. As a practical example, the high-energy type ignition system is designed and adapted so as to provide increased ignition energy as a result of the characteristics of ignition coil altered as compared to those for ordinary engines and to extend a spark duration 1.5 times as long as that of ordinary ignition systems by making use of low-resistance spark plug cables which reduce transmission losses. Together, the spark plug 12 is of platinum construction which is resistant to high voltages. The ignition mechanism F thus constructed provides a great improvement of the efficiency of ignition and combustibility.

Exhaust system of the engine CE is equipped with a linear oxygen ($O_2$) sensor 44 which monitors the concentration of oxygen ($O_2$) in the exhaust gas, a catalytic converter 45 for controlling exhaust emissions, an air duct 61 and a lead valve 62. The air duct 61 supplies secondary air, of which the amount is controlled by the lead valve 62, to the exhaust gas in the exhaust duct 60 upstream from the catalytic converter 45. In this instance, the engine control unit C uses the output signal from the linear oxygen sensor 44 to compute an air-fuel ratio based on the concentration of oxygen ($O_2$) in the exhaust gas represented by the output signal. The engine control unit C also operates the lead valve 62 to control the amount of secondary air to be supplied to the exhaust system. While the secondary air is supplied to the exhaust system with the purpose of burning residual unburned fuel in the exhaust gas, the secondary air supplied to the exhaust duct 60 aids in the combustion of unburned fuel in the exhaust gas accompanied by an additional result of raising the temperature of the exhaust gas.

The exhaust gas purifying catalyst element employed in the catalytic converter 45 is of a three-way type incorporating a silicon oxide carrier containing precious metals such as platinum, rhodium and palladium. This type of exhaust gas purifying catalyst element provides adequate exhaust gas purifying performance at temperatures only above a specified activation temperature of, for example, 350° C.

Alternatively, what is called a "new three-way catalyst" may be employed as the exhaust gas purifying catalyst element. The new three-way catalyst provides the capability to reduce nitrogen oxides (NOx) at air-fuel mixtures leaner than the stoichiometric air fuel mixture. As an example, the catalyst carrier of, desirably, zeolite incorporates precious metals such as iridium and platinum, or iridium, platinum and rhodium, as activation agents. The new three-way catalyst provides adequate emission control of nitrogen oxides (NOx) and purification of the exhaust gas even at lean air-fuel ratios. Specifically, in many instances where ordinary three-way catalysts are employed, under the stoichiometric air-fuel ratio, the exhaust gas contains only oxygen ($O_2$) too low in level to oxidize hydrocarbons (HC) and carbon monoxide (CO), and as a result, the oxygen ($O_2$) in the nitrogen oxides (NOx) is consumed in the reaction and the nitrogen oxides (NOx) is deoxidized or broken down. On the other hand, under lean air-fuel ratios, the relatively large amount of oxygen ($O_2$) in the exhaust gas reacting with the hydrocarbons (HC) and carbon monoxide (CO) results in the nitrogen oxides (NOx) being left unreacted, thus causing the nitrogen oxides (NOx) to be discharged without being deoxidized.

Contradistinctively, the new three-way catalyst utilizing a zeolite carrier which is highly porous results in capturing a large amount of hydrocarbons (HC) in pores of the zeolite carrier, while the nitrogen oxides (NOx) concurrently adhere to the precious metals incorporated by the zeolite carrier. Even with a large amount of oxygen ($O_2$) in the exhaust gas, the hydrocarbons (HC) captured by the zeolite carrier react with the oxygen ($O_2$) component of the nitrogen oxides (NOx) in the catalytic reaction as a result of the hydrocarbons (HC) existing in close proximity to the nitrogen oxides (NOx), resulting in that the catalyst eliminates the nitrogen oxides (NOx) with a high efficiency even under lean air-fuel ratios. In this case, iridium is utilized as a means of refining the active precious metals, thus increasing the exhaust gas purification efficiency of the catalyst and extending the service life of the catalyst.

Figure 28:
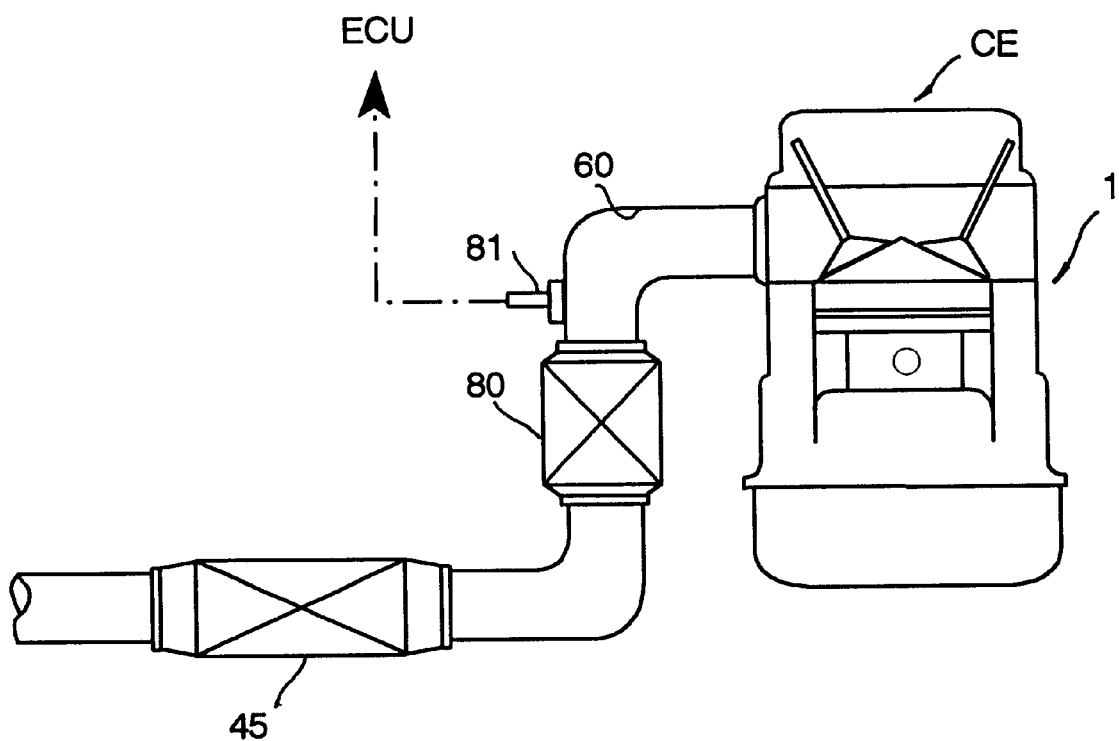
FIG. 28 is a schematic view of an outer appearance of a reciprocal internal combustion engine equipped with an exhaust gas purifying system in accordance of another embodiment of the present invention.

Exhaust system, which is provided with the catalytic converter 45 of an under foot type in the above embodiment and in which secondary air is supplied to the catalytic converter 45, may be modified as shown in FIG. 28.

Referring to FIG. 28, a pre-catalytic converter 80 may be installed to the exhaust duct 60 in close proximity to the engine CE, in other words, attached directly to an exhaust manifold. Further, in place of the linear oxygen ($O_2$) sensor, a lambda oxygen ($\lambda O_2$) sensor 81 of a self-heating type having an incorporated heater is installed to the exhaust duct 60 before or upstream from the pre-catalytic converter 80. In the exhaust system, secondary air is not supplied to the exhaust gas. The same three-way catalyst as used in the catalytic converter 45 may be employed in the pre-catalytic converter 80. As is well known in the art, the lambda oxygen ($\lambda O_2$) sensor 81 does not monitor a linear change in air-fuel ratio but detect whether the air-fuel ratio is leaner or richer than the stoichiometric air-fuel ratio.

Since the exhaust gas does not change in temperature almost at all until entering the pre-catalytic converter 80, the modified exhaust system enables the catalyst to take a time to become active shorter as compared with the exhaust system not being provided with a pre-catalytic converter and, consequently, yields an improved efficiency of purifying the exhaust gas. As a result, as will be described later, the retardation of ignition timing during a time interval for which the temperature of exhaust gas is enforced to rise can be decreased, thereby improving the stability of engine operation. The self-heating type of lambda oxygen ($\lambda O_2$) sensor 81 quickly becomes sensitive to oxygen in the accelerated exhaust temperature raising period. It is judged that the lambda oxygen ($\lambda O_2$) sensor 81 rightly becomes active upon an occurrence of a change in the sensor output from a level indicative of a lean air-fuel ratio to a level indicative of a rich air-fuel ratio. The fuel mixture is prevented from being overly enriched during the accelerated exhaust temperature raising period by performing open-looped air-fuel ratio control at the beginning of the accelerated exhaust temperature raising period and subsequently air-fuel ratio feedback control after the activation of the lambda oxygen ($\lambda O_2$) sensor 81. In this manner, a raise in exhaust temperature is more enhanced, the discharged amount of hydrocarbons (HC) is reduced more during the accelerated exhaust temperature raising period.

In order to monitoring the operating condition of the engine CE, the engine CE is equipped, in addition to the air flow sensor 17 and the linear oxygen ($O_2$) sensor 44, with a throttle position sensor 46 which monitors open positions of the throttle valve 18, an idle switch 47 which detects the throttle valve 18 is in the closed position, temperature sensors 48 and 49 which monitor the temperatures of intake air and engine cooling water, respectively, a knock sensor 50 capable of monitoring an occurrence of knocking of the engine CE, and a temperature sensor 63 which monitors the temperature of exhaust. Further, a distributor 51, which forms a part of the ignition system, is equipped with an angle sensor 52 which is capable of monitoring a turned angle of a crankshaft, and a cylinder discrimination sensor 53 which is capable of outputting a signal based on which the cylinders are differentiated.

Output signals from all of the sensors and switches are sent to the engine control unit (ECU) C equipped with a microcomputer. The engine control unit (ECU) C processes the information contained in the output signals and controls operations of the ignition system F, the idle speed control (ISC) valve 22, the air control valve 23, the fuel injector 24, the turbulence control valve 25, the solenoid valve 29, the air control valve 36, and the purge solenoid valve 43. Specifically, the engine control unit C sets an ignition timing through the ignition system F and controls engine speed during idling by regulating the amount of intake air by means of the idle speed control (ISC) valve 22 and air control valve 23, controls an air-fuel ratio or the amount of fuel and a fuel injection timing through the fuel injector 24, controls the strength of swirl and tumble (ignitability and combustibility) of the fuel mixture in the combustion chamber 2 by regulating opening of the turbulence control valve 25, controls supply of the mixing air to the fuel injector 24 through the air control valve 36, and controls supply of the secondary air through the lead valve 62. The following explanation makes reference to FIGS. 2 through 5. Turbulence is generated in the combustion chamber 2 to improve the ignition and combustion characteristics of an air-fuel mixture. Swirl (horizontal vortex turbulence) and tumble (vertical vortex turbulence) are utilized to speed the flow of an air-fuel mixture into the combustion chamber 2 with the purpose of improving ignition and combustion characteristics. As will be further explained later, because the ignition and combustion characteristics of an air-fuel mixture are improved in the manner stated above, the stability of engine cycling is obtained and torque fluctuations are kept to a minimum, even with an ignition timing retarded greatly to a point after top-dead-center during cold starting of the engine CE.

As shown in FIGS. 2 through 5, each cylinder of the engine (only one cylinder is shown in the figures) is equipped with the fuel injector 24 in close proximity to the first intake port 3, the amount of injected fuel and timing of fuel injection of the fuel injector 24 being determined by the engine control unit C. Turbulence control valve 25 is installed to the second intake port 4, the opening of the turbulence control valve 25 being determined by the engine control unit C in response to engine operating conditions. Valve seats 55 and 56 are formed in openings 3a and 4a to the combustion chamber 2 at the ends of the first intake port 3 and second intake port 4, respectively. Similarly, valve seats 57 and 58 are formed in openings 5a and 6a to the combustion chamber 2 at the ends of the first exhaust port 5 and second exhaust port 6, respectively. The first and second intake valves 7 and 8 are installed to the first and second intake ports 3 and 4, respectively, formed on a ceiling 59 (see FIGS. 4 and 5) of the combustion chamber 2. Similarly, the first and second exhaust valve 9 and 10 are installed to the first and second exhaust ports 5 and 6, respectively, formed on the ceiling 59 of the combustion chamber 2. The openings 3a and 4a at the ends of the first and second intake ports 3 and 4 are arranged in a left half section of the combustion chamber 2 as viewed in a cross section, and the openings 5a and 6a at the ends of the first and second exhaust ports 5 and 6 are likewise arranged in a right half section of the combustion chamber 2 as viewed in the same cross section. The spark plug 12 is installed in the ceiling 59 of the combustion chamber 2 at an off-center position adjacent to the exhaust ports 5 and 6. As will be explained later, the first intake port 3 is configured as a swirl port which provides a swirl of fuel mixture having a swirl ratio greater than 1.0 to the combustion chamber 2, and the second intake port 4 is configured as a tumble port which provides a tumble of fuel mixture having a tumble ratio greater than 1.5 to the combustion chamber 2. The first intake valve 7 is of a low-lift type which have a valve lift set to be relatively small, so that the speed of an air-fuel mixture traveling through a space between the first intake port 3 and first intake valve 7 to combustion chamber 2 is increased and, as a result, the turbulence generating effect in the combustion chamber 2 is further promulgated. This provides a great improvement of the efficiency of ignition and combustibility. The second intake valve 8 may be of the low-lift type.

Figure 2:
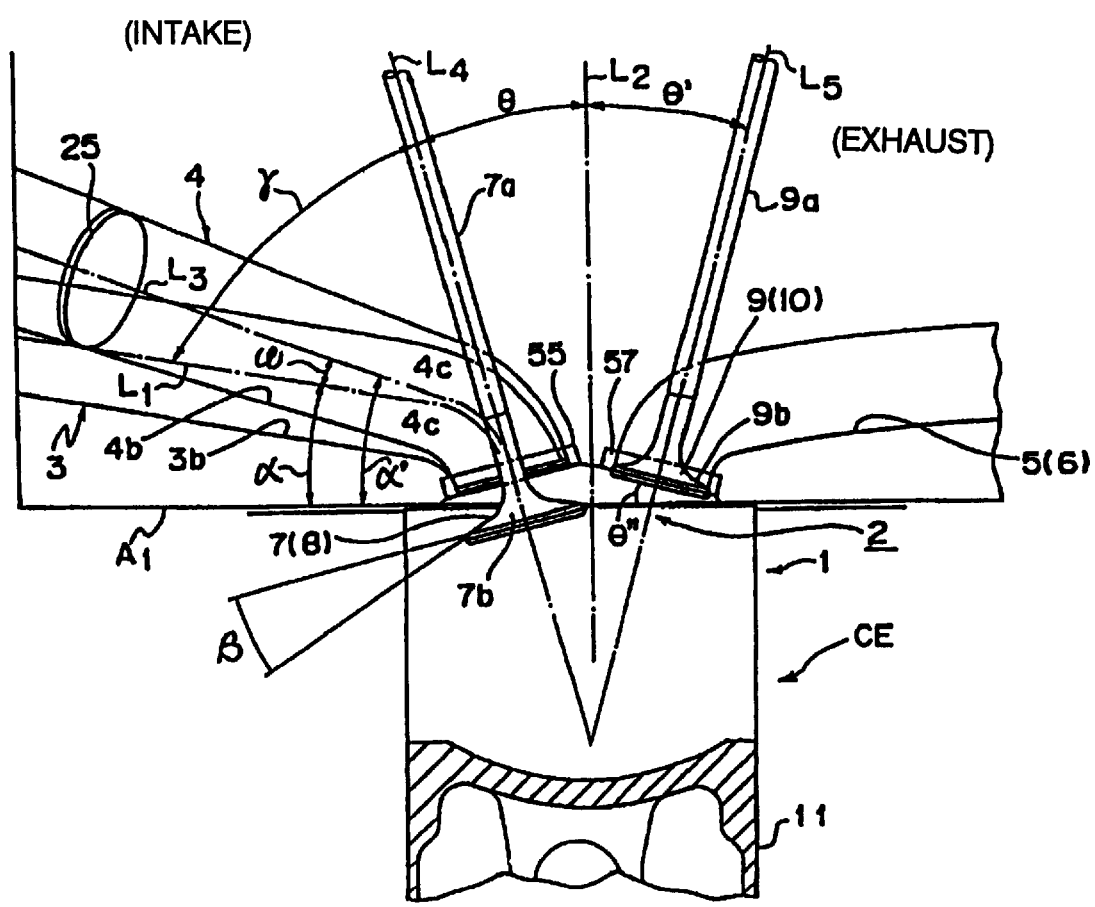
FIG. 2 is an illustration showing a configuration around intake and exhaust ports of a cylinder.

As is apparent from FIG. 2, the first intake port 3 has approximately straight part 3b incorporated at its upstream side thereof and slightly curved part 3c incorporated at its downstream side thereof. In the same manner, the second intake port 4 has approximately straight part 4b incorporated at its upstream side thereof and slightly curved part 4c incorporated at its downstream side thereof. Straight part 3b of the first intake port 3 establishes a specified angle α (which is hereafter referred to as a first intake port inclination angle) between an axis $L_1$ of the straight port 3b and a cross sectional plane $A_1$ perpendicular to the cylinder center axis $L_2$. Similarly, the straight part 4b of the second intake port 4 establishes a specified angle α' (which is hereafter referred to as a second intake port inclination angle) between an axis $L_3$ and the cross sectional plane $A_1$. First intake valve 7, comprised of a valve stem 7a and a valve head 7b, forms an angle θ (which is hereafter referred to as an intake valve inclination angle) between an axis $L_4$ of the valve stem 7a and the cylinder center axis $L_2$. The valve head 7b has the under surface oriented parallel with the pent roof ceiling 59 of the combustion chamber 2 and incorporates a specified valve face angle β between its upper and lower surfaces. Similarly, the first exhaust valve 9, comprised of a valve stem 9a and a valve head 9b, form an angle θ' (which is hereafter referred to as an exhaust valve inclination angle) between an axis $L_5$ of the valve stem 9a and the cylinder center axis $L_2$. The valve head 9b has the under surface oriented parallel with the pent roof ceiling 59 of the combustion chamber 2. In the following description, the term "port incident angle γ" shall mean and refer to an angle formed between the axes $L_1$ and $L_4$, and the term "port angle difference ω" is defined by a deference between the first and second intake port inclination angles (α–α').

Figure 4:
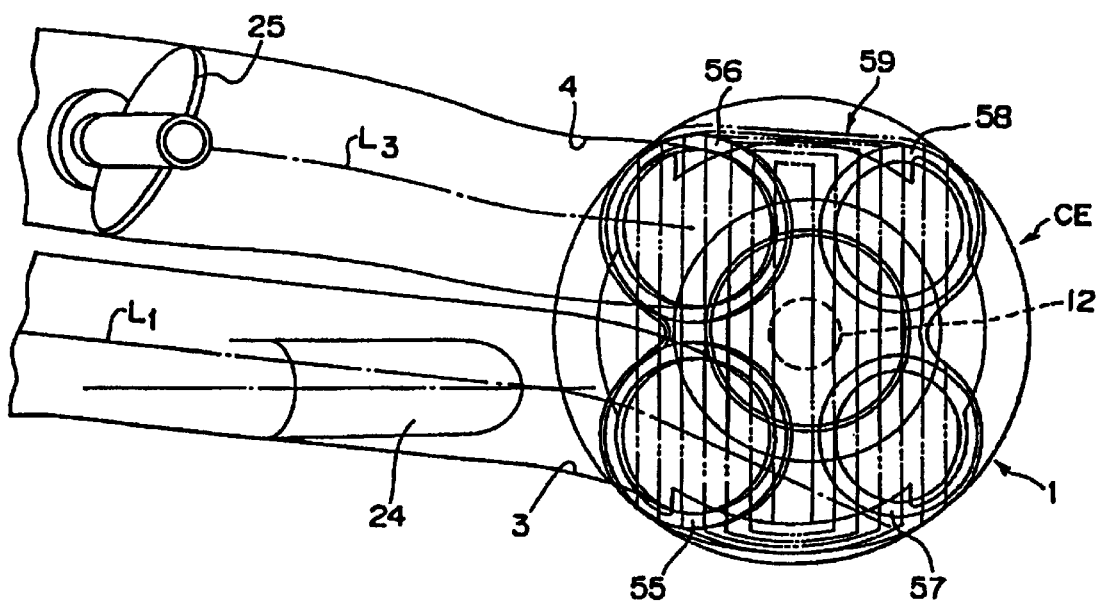
FIG. 4 is an explanatory illustration showing the cylinder of FIG. 2.
Figure 5:
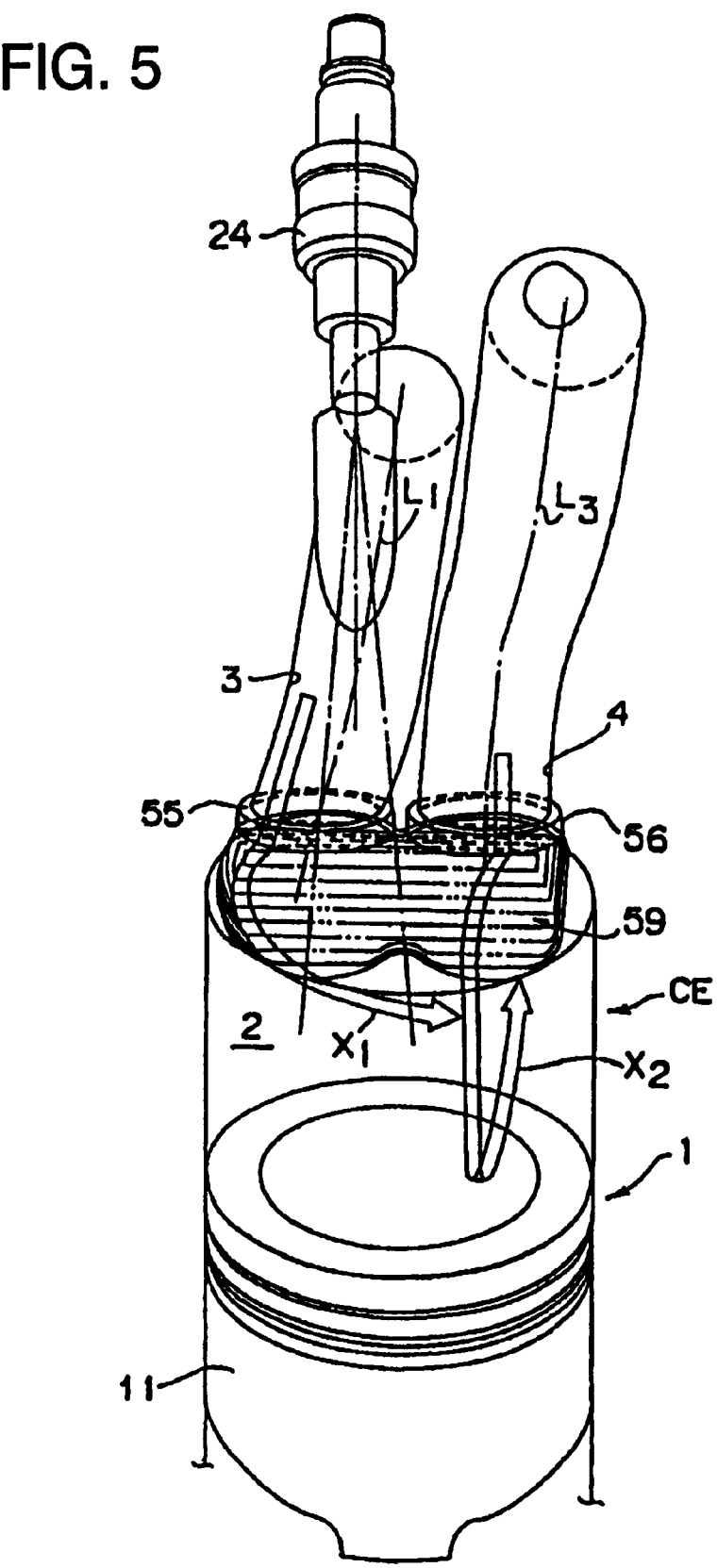
FIG. 5 is an explanatory illustration showing swirl and tumble turbulence in the cylinder of FIG. 2.

As apparently understood from FIGS. 4 and 5, the combustion chamber 2 is formed with the pent roof type of ceiling 59 (depicted by contour lines) having an angle θ" relative to the cylinder horizontal cross section $A_1$ on the exhaust side. In this instance, the under surface of the valve head 9b of first exhaust valve 9 also forms an angle θ" relative to the cylinder horizontal cross section $A_1$. Accordingly, the angles θ" and θ' are equivalent. The pent roof type of combustion chamber 2 has the ceiling angle θ" relative to the cylinder horizontal cross section $A_1$ on the exhaust side which is relatively small. Together, the pent roof type of ceiling 59 has also a relatively small angle relative to the cylinder horizontal cross section $A_1$ on the intake side. Accordingly, the first and second intake valves 7 and 8 and the first and second exhaust valves 9 and 10 have center axes of their valve stems oriented on more a vertical axis.

The angles of α, θ, θ'(θ") and β are desirably established so as to satisfy all of the following inequalities.

$$\beta > \theta \quad \text{(I)}$$

$$\alpha < \theta' \quad \text{(II)}$$

$$\alpha \leq \theta \quad \text{(III)}$$

The parameters set forth are necessary for suitably producing a swirl in the combustion chamber 2. The first parameter (β>θ) defines the direction of an air-fuel mixture flow. If the valve face angle β is less than the specified angle θ, the direction of the air-fuel mixture flow into the combustion chamber 2 from the first intake port 3 is deflected by the upper surface of the valve head 7b and resultingly hits the ceiling 59 of the combustion chamber 2, so that the inflow speed of the air-fuel mixture into the combustion chamber 2 is lowered, thereby preventing the swirl effect from forming. It is, however, not desirable to increase the valve face angle β to a great extent as such an increase would make the cross sectional area between the first intake port 3 and valve head 7b extremely narrow, thus increasing inflow friction. The second and third parameters (α<θ' and α≦θ) yields the distribution of inflow speed components of the air-fuel mixture into the combustion chamber 2. If the first intake port inclination angle α is made as small as possible, the horizontal inflow speed component (the component of inflow speed in the direction parallel to the cylinder cross section $A_1$) of the air-fuel mixture entering the combustion chamber 2 from the first intake port 3 is increased with an effect of accelerating an occurrence of a swirl. Satisfaction of these parameters ensures the air-fuel mixture to flow into the combustion chamber 2 from the first intake port 3 without interfering with the combustion chamber ceiling 59 when the piston is in its down stroke and adequately maintain the horizontal speed, so as to yield an accelerated occurrence of a swirl in the combustion chamber 2.

Figure 6:
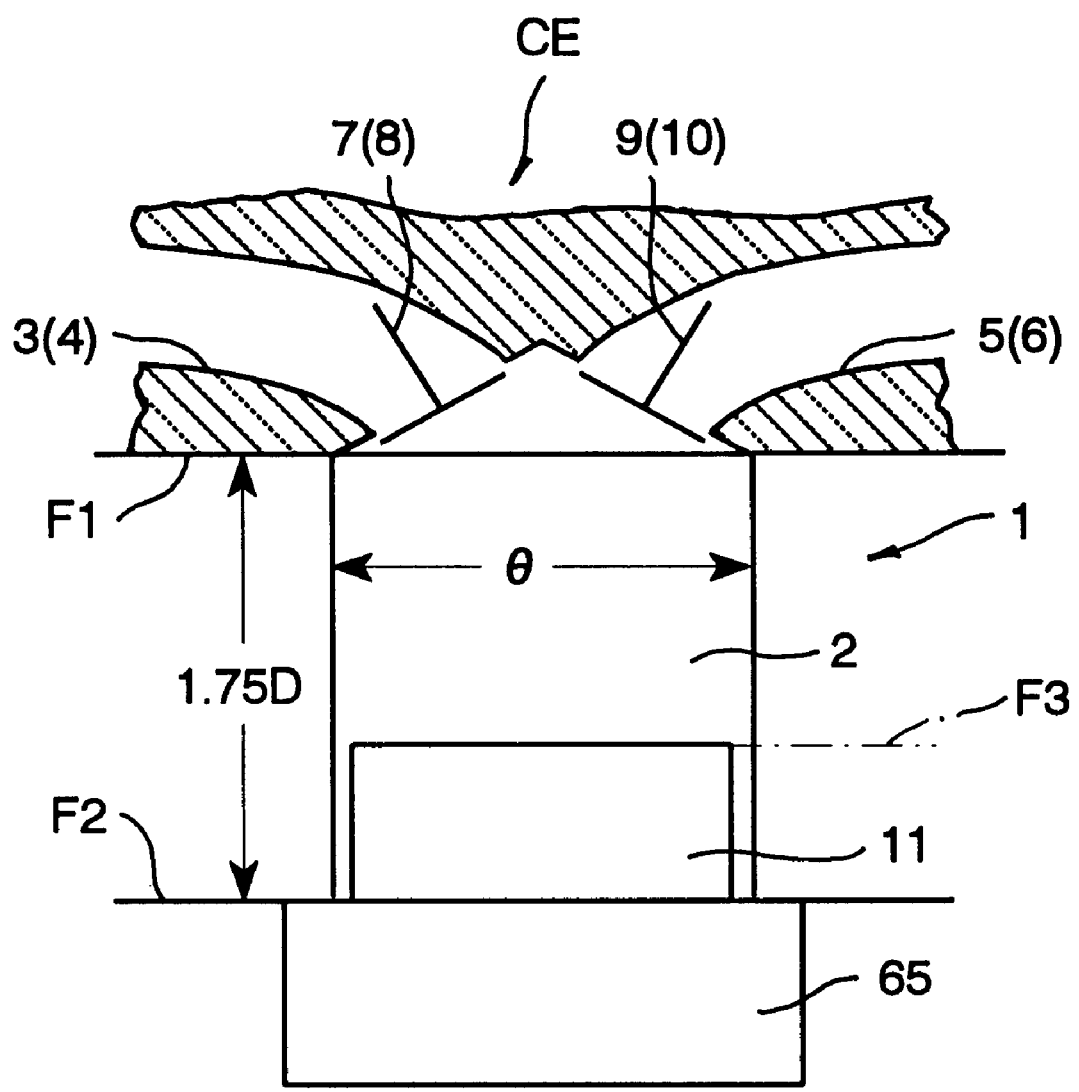
FIG. 6 is an illustration showing a determination of the number of horizontal swirl circulations of an air-fuel mixture in the cylinder which is divided by the number of revolutions of the engine to obtain a swirl ratio.

As a result of the configuration, a strong swirl of a swirl ratio SR of more than 1.0 is formed in the combustion chamber 2 when the turbulence control valve 25 is closed or constricted (partially open), thus significantly improving the ignition and combustion process of the air-fuel mixture. The swirl ratio SR is generally defined as the number of horizontal swirl circulations of an air-fuel mixture in the cylinder divided by the number of revolutions of the engine. The number of horizontal swirl circulations of an air-fuel mixture is determined, as shown in FIG. 6 for example, by means of an impulse swirl meter 65 installed at a position $F_2$ at a distance of 1.75 D from the lower surface of a cylinder head $F_1$ for an engine having a cylinder bore diameter of D. The torque driving the impulse swirl meter 65 (which is referred to as the impulse swirl meter torque G) is used to compute the swirl rate in a manner well known in the art. In FIG. 6, denoted by a reference $F_3$ is the top of piston 11 at bottom-dead-center.

Impulse swirl meter torque is measured in the following manner. That is, the swirl energy acting on the piston top is regenerated by the impulse swirl meter 65 installed at the position $F_2$ at the distance of 1.75 D from the lower surface of the cylinder head $F_1$ so as to uncover how strong the swirl circulating energy is around the piston top. The impulse swirl meter 65 incorporates a multi-cell honeycomb construction to which the swirl directional force applied to each cell is used to compute the total impulse swirl meter torque G.

To explain in more detail, assuming the air-fuel mixture is flowing into the combustion chamber 2 during a period until the piston 11 moves to bottom-dead-center after the intake valve opens; the circulation speed of the air-fuel mixture circulating along the periphery of the combustion chamber 2 becomes the greatest speed when the piston reaches its bottom-dead-center. Accordingly, the swirl ratio SR is obtained by computing the total amount of angular motion at each specified crank angle from the time the intake valve opens until the piston reaches its bottom-dead-center. Based on this principle, the swirl ratio SR is computed from the following formulas (IV) and (V).

$$SR = \eta v \cdot [D \cdot S \cdot \Pi (cf \cdot Nr \cdot d \cdot \varphi)] / [n \cdot d^2 \cdot (\Pi cf \cdot d \cdot \varphi)^2] \quad \text{(IV)}$$

$$Nr = 8 \cdot G / (M \cdot D \cdot V_0) \quad \text{(V)}$$

In the above formulas:
SR is the swirl ratio;
ηv is the volumetric efficiency (=1);
D is the diameter of the cylinder bore;
S is the stroke n is the number of the intake valves
d is the diameter of the throat
cf is the flow volume coefficient in relation to the valve lift;
Nr is the dimensionless rig swirl value in relation to the valve lift;
φ is the crank angle;
G is the impulse swirl meter torque; and
$V_0$ is the speed head.

The formula (V) is induced in the following order:

$$G = I \cdot \omega r \quad (1)$$

$$I = M \cdot D^2 / 8 \quad (2)$$

Substituting formula (2) into formula (1):

$$G = M \cdot D^2 \cdot \omega r / 8 \quad (3)$$

Rearranging formula (3):

$$D \cdot \omega r = 8 \cdot G / (M \cdot D) \quad (4)$$

The dimensionless rig swirl value is expressed by the following formula:

$$Nr = D \cdot \omega r / V_0 \quad (5)$$

When formula (4) is factored into formula (5), the formula (V) is given as follows:

$$Nr = 8 \cdot G / (M \cdot D \cdot V_0) \quad (V)$$

In the above formulas, ωr is the rig swirl value.

In regard to the second intake port 4, the second intake port inclination angle α' is established to be a relatively large value. Because the air-fuel mixture entering the combustion chamber 2 from the second intake port 4, when the turbulence control valve 25 is open, has a relatively large component of speed at which it is forced downward, a strong tumble (vertical vortex) having a tumble ratio RT of more than 1.5 is generated in the downward moving air-fuel mixture. While the tumble creates promoted turbulence of the air-fuel mixture in the combustion chamber 2 and improves efficient ignition and combustion of the air-fuel mixture, the turbulence created in the combustion chamber 2 also suppresses an occurrence of knocking. For example, while knocking would usually be apt to occur in a range of engine operations under moderate or high engine loads where the turbulence control valve 25 is open, the tumble effect explained above prevents the occurrence of knocking.

Tumble ratio RT is generally defined as the number of vertical vortex circulations of an air-fuel mixture in the cylinder divided by the number of revolutions of the engine. The tumble ratio RT is computed in the substantially same manner as explained previously in regard to the swirl ratio RS.

Figure 3:
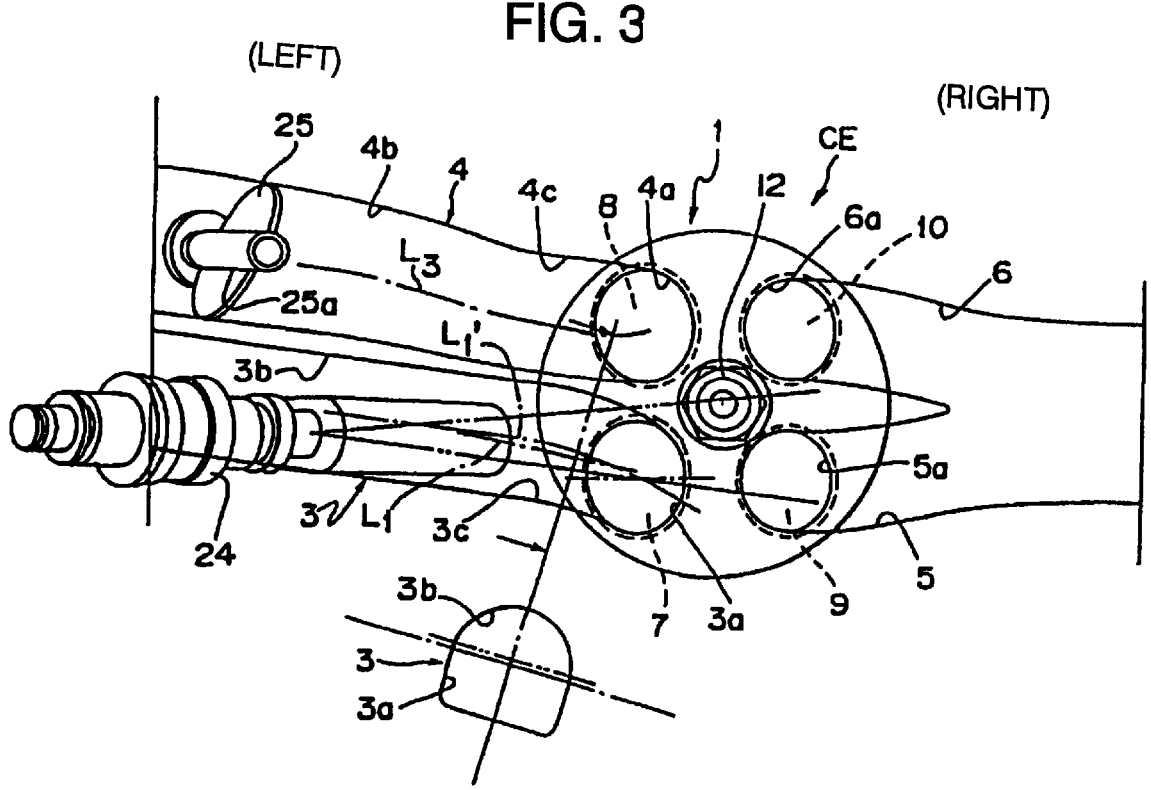
FIG. 3 is a schematic plan view of the configuration around intake and exhaust ports of the cylinder of FIG. 2.

In reference to FIG. 3 which is a plan view of the top of the combustion chamber 2, the opening 3a of first intake port 3 is detected toward or faces the inner periphery of combustion chamber 2, and the opening 4a of second intake port 4 is detected toward nearly the center of combustion chamber 2. Resultingly, a swirl turbulence effect is enhanced by the first intake port 3, and a tumble turbulence effect is enhanced by the second intake port 4. On the other hand, the construction of these intake ports 3 and 4 prevents a reverse swirl effect from occurring at the second intake port 4. In this manner, in the combustion chamber 2, a swirl having a swirl ratio of more than 1.0 and a tumble having a tumble ratio of more than 1.5 are produced such as shown in FIG. 5 by arrows $X_1$ and $X_2$, respectively, thereby significantly improving the ignition and combustion characteristics of an air-fuel mixture.

Engine control unit (ECU) C performs catalyst activation control during cold start of the engine CE in which the catalytic converter 45 becomes operative with an expected exhaust gas purifying efficiency or emission control performance as quickly as possible by means of promoting a raise in the temperature of the catalytic element of catalytic converter 45 to the effective active temperature of catalyst.

In the catalyst activation control, the engine control unit (ECU) C controls the ignition mechanism F including the spark plug 12, the air control valve 23, the fuel injector 24, the turbulence control valve 25, the solenoid valve 29, and the air control valve 36 based on the information contained in the output signals of the sensors and switches previously described, respectively. As specifically stating, the engine control unit (ECU) C sets the ignition timing of spark plug 13 through the ignition mechanism F, controls the speed of rotation of the engine CE by means of regulating the amount of bypass air through the idle speed control (ISC) valve 22 and air control valve 23, controls the amount of fuel injected through the injector 24, controls the strength of swirl and tumble in the combustion chamber 2 by opening and closing the turbulence control valve 25, controls supply of mixing air to the injector 24 through the operation of air control valve 36, and controls the amount of secondary air supplied to the exhaust duct 60 through the lead valve 62.

The catalyst activation control is executed according the following basic aspects. In the catalyst activation control during cold starting where the engine CE is still at ambient temperatures, while ensuring the stability of engine cycling and keeping torque fluctuations to a minimum, the temperature of the catalytic element for exhaust purification is quickly raised to the effective active temperature of, for example, above 350° C. within a time, for example 20 seconds, from the engine start, by means of adequately controlling various control factors such as the ignition timing, the air-fuel ratio, the speed of engine or the amount of bypass air, the amount of secondary air, the strength of turbulence, i.e. swirl and tumble, in the combustion chamber, the amount of mixing air, and the energy of ignition spark. By virtue of the catalyst activation control, the effective active temperature is reached quickly without the aid of a heater for raising the temperature of the catalytic element, such as an afterburner, an EHC, or other like incorporated in the exhaust system. In this instance, the determination of a cold start of the engine CE, or the determination as to whether the engine CE is still at ambient temperatures or not, is undertaken by means of the water temperature sensor 49 which detects whether the temperature of engine cooling water is below or above the specified temperature. The factors influential in the temperature of exhaust gas during a cold start condition basically include the ignition timing, the air-fuel ratio, the speed of engine or the amount of bypass air, and the amount of secondary air. In other words, the temperature of exhaust gas is raised by retarding the ignition timing (see FIGS. 7, 8 and 13), setting the air-fuel ratio closely to the stoichiometric air-fuel ratio (see FIG. 13), raising the speed of engine or the amount of bypass air (see FIG. 8), and supplying secondary air to the exhaust duct 60 upstream from the catalytic converter 45 (see FIG. 14). However, retarding the ignition timing to a point well after top-dead-center will adversely affect the ignition and combustion efficiency and induce torque fluctuations which result from the lowered stability of engine cycling. It is for this reason that the exhaust gas purifying system according to the aspects above described provides a significant increase in ignition and combustion efficiency so as to effectively suppress torque fluctuations through the ensured stability of engine speed with the aid of increasing the swirl ratio to more than 1.0, increasing the tumble ratio to more than 1.5, increasing the speed of intake air flowing into the combustion chamber 2, supplying assist air to the fuel injector 24, and raising the electrical energy supplied to the spark plug 12.

One of the motives for quickly attaining the activation of the catalyst after a cold start of engine lies in the tightened automotive emission regulations or standards in, for instance, the United States and other countries. In the near future, the United States emission regulations or standards will demand ⅙ the current allowable emission of hydrocarbons (HC) and ½ the current allowable emission of nitrogen oxides (NOx). In order to meet these standards, it becomes necessary to achieve the complete activation of the catalyst before the vehicle is driven while the engine is not yet warmed up. In other words, hydrocarbon emissions will increases significantly if the vehicle is driven before the active temperature is attained by the catalyst. Together, according to the emissions test mode in the United States, at least a 20-second warm-up time is called for before the vehicle is initially driven after a cold engine start. Therefore, in light of the emissions standards in the United States, it becomes necessary for the catalyst to attain and exceed the effective active temperature within 20 seconds after an engine start.

The catalyst activation control significantly retards the ignition timing by a specified angle of, for example, 30° in crank angle after top-dead-center for a specified period of time necessary to raise the temperature of exhaust gas during a cold engine start so as to intentionally lower the conversion rate of the thermal energy from combustion of the air-fuel mixture to net power output and utilize the resultant heat loss to raise the temperature of the exhaust gas, thereby promoting a fast rise in the temperature of the catalyst to or above the effective activation temperature. In other words, the engine CE itself is made to function much like an afterburner to raise the temperature of exhaust gas.

It becomes possible to quickly raise the temperature of exhaust gas to or above the effective activation temperature by significantly retarding the ignition timing by a specified angle in crank angle after top-dead-center so that a range where an increasing rate of in-cylinder pressure for each specified crank angle is more than 0 (zero) is established after the middle of an expansion stroke.

Figure 15:
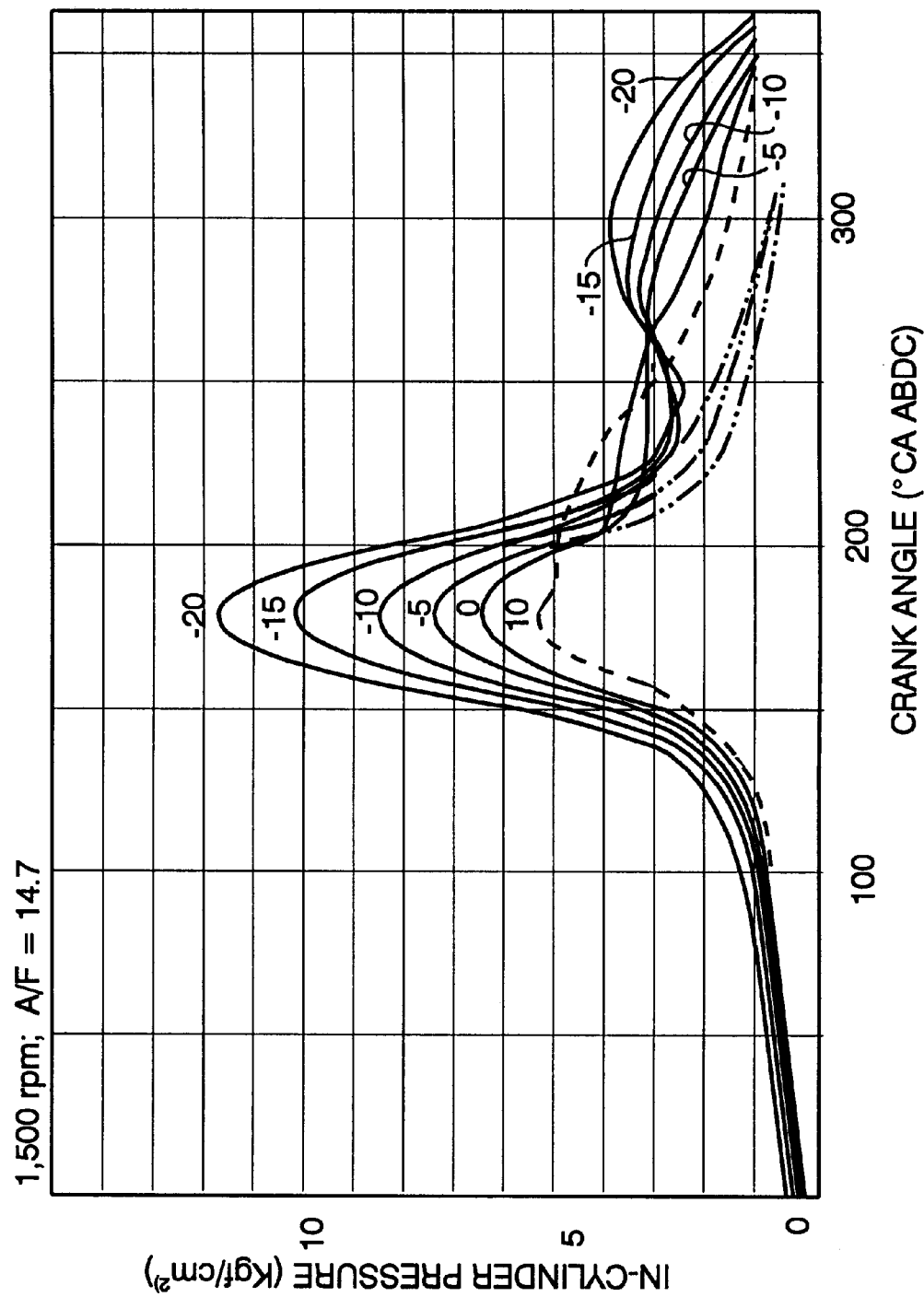
FIG. 15 is a graph showing characteristic curves of in-cylinder pressure in relation to crank angle for various ignition timings.
Figure 16:
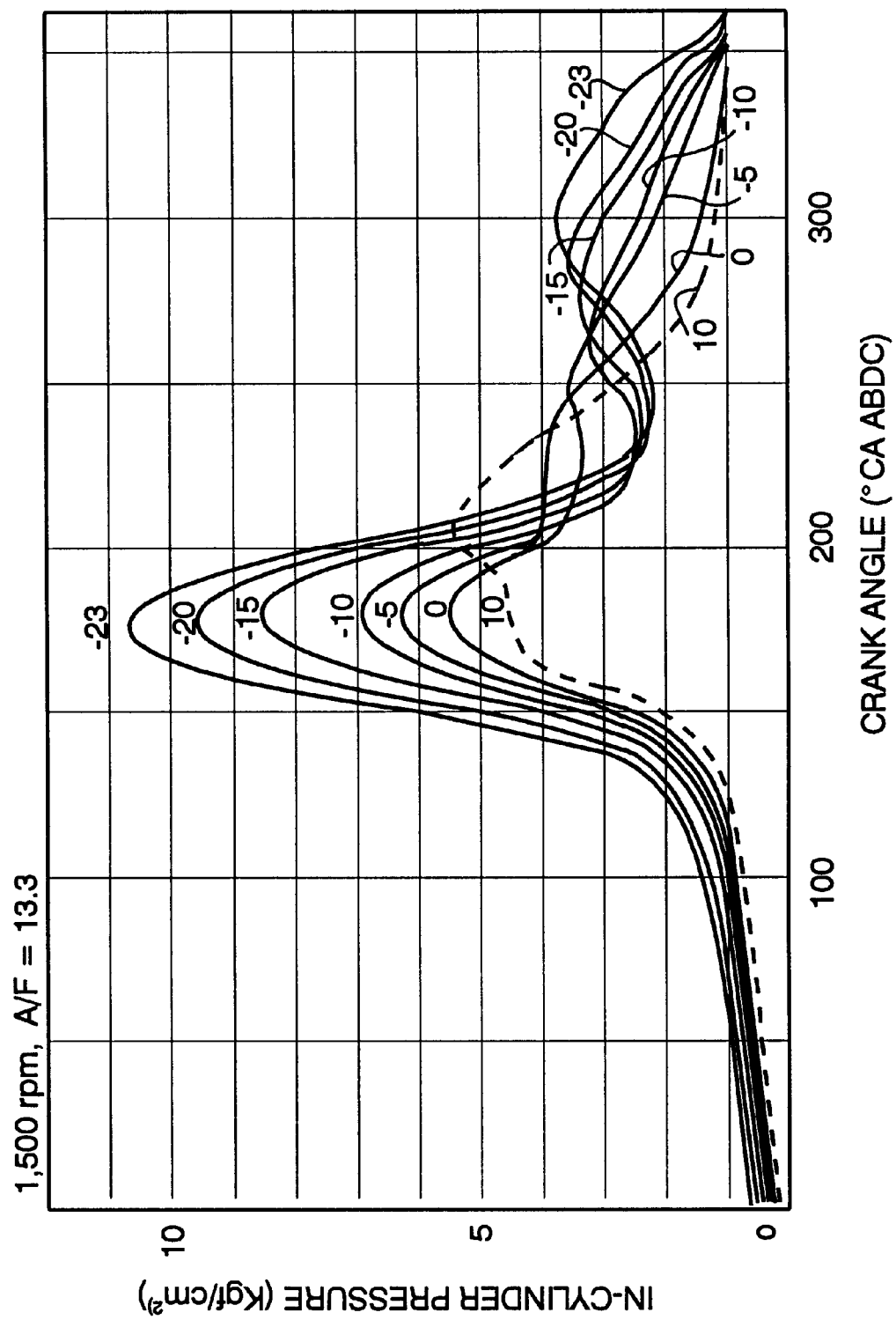
FIG. 16 is a graph showing characteristic curves of in-cylinder pressure in relation to crank angle for various ignition timings.
Figure 17A:
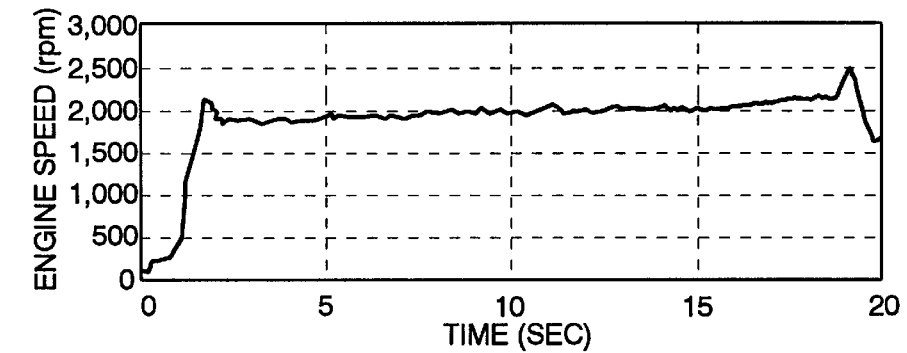
FIGS. 17(A) to 17(D) are graphs showing characteristic curves of engine speed, the amount of intake air, ignition timing and air-fuel ratio in relation to time, respectively, during a cold engine start.
Figure 17B:
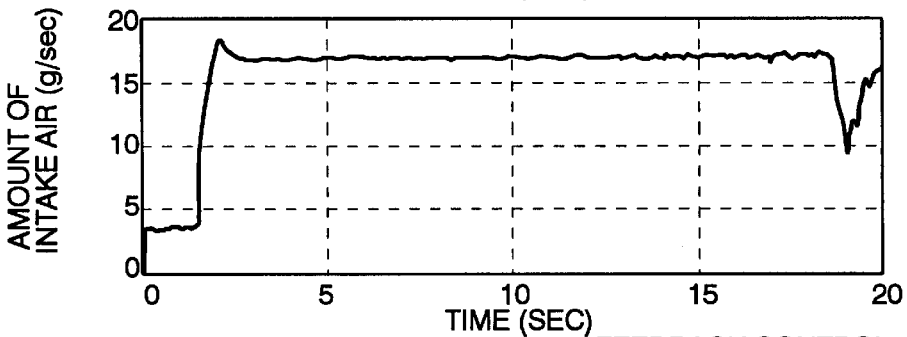
Figure 17C:
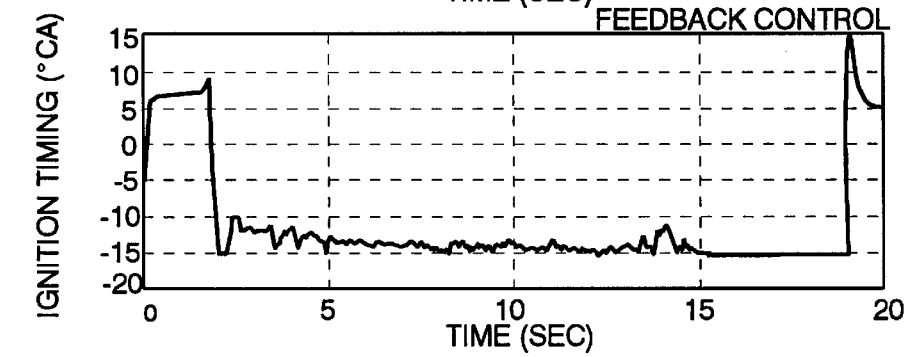
Figure 17D:
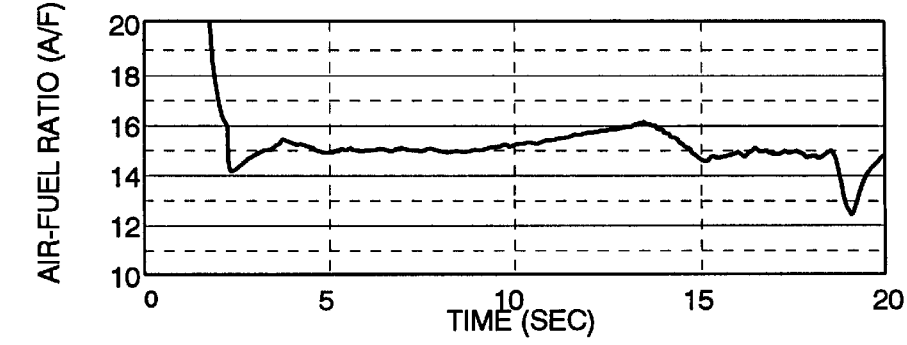

FIGS. 15 and 16 show characteristics of in-cylinder pressure change in relation to crank angles with use of ignition timing as a parameter for air-fuel ratios of 16.7 and 13.0, respectively. In FIGS. 15 and 16, the lines showing the parameters of 10, 0, −5, −10, −15, −20 and −23 denote various degrees of timing advance in crank angle, while the broken line shows in-cylinder pressure without combustion of an air-fuel mixture in the combustion chamber 2. As is apparent from FIGS. 15 and 16, if the ignition timing is retarded at a point after top-dead-center, the range where an increasing rate of in-cylinder pressure for each specified crank angle is more than 0 (zero) or a range in which a second peak of in-cylinder pressure lies is established after the middle of an expansion stroke.

In this manner, in cases where the ignition timing is set to a point after top-dead-center, particularly in cases where the ignition timing is retarded by a crank angle of −10°, the combustion of an air-fuel mixture reaches its peak after a significant drop in in-cylinder pressure, thus causing the thermal energy to be converted into net output power at a significantly low rate. As a result, this considerable increase in thermal energy loss takes the form of a significant increase in exhaust gas temperature.

The reasons for the significant rise in exhaust gas temperature resulting from the retardation of ignition timing to a point after top-dead-center are cited below.

As a general rule, a large proportion, for instance approximately 70 percent, of the thermal energy generated from combustion of an air-fuel mixture in the combustion chamber 2 is given up to thermal energy loss in various forms such as exhaust loss which acts as a heat emission to a low heat source necessary to effect the thermal cycle, heat loses from a cooling effect which protects structural material of the engine from heat damage, mechanical friction loss, and other types of thermal loss. The remaining thermal energy is converted to net power output. Therefore, it is natural to assume that the temperature of exhaust gas will rise as thermal loss to the exhaust gas increases. Together, in this heat exchange or accumulation and expenditure, the cooling loss and mechanical friction loss do not change so significantly according to engine operating conditions. Consequently, there is a correlation between thermal loss to the exhaust and net power output that an increase in either one will result in a complementary decrease in the other.

Figure 7:
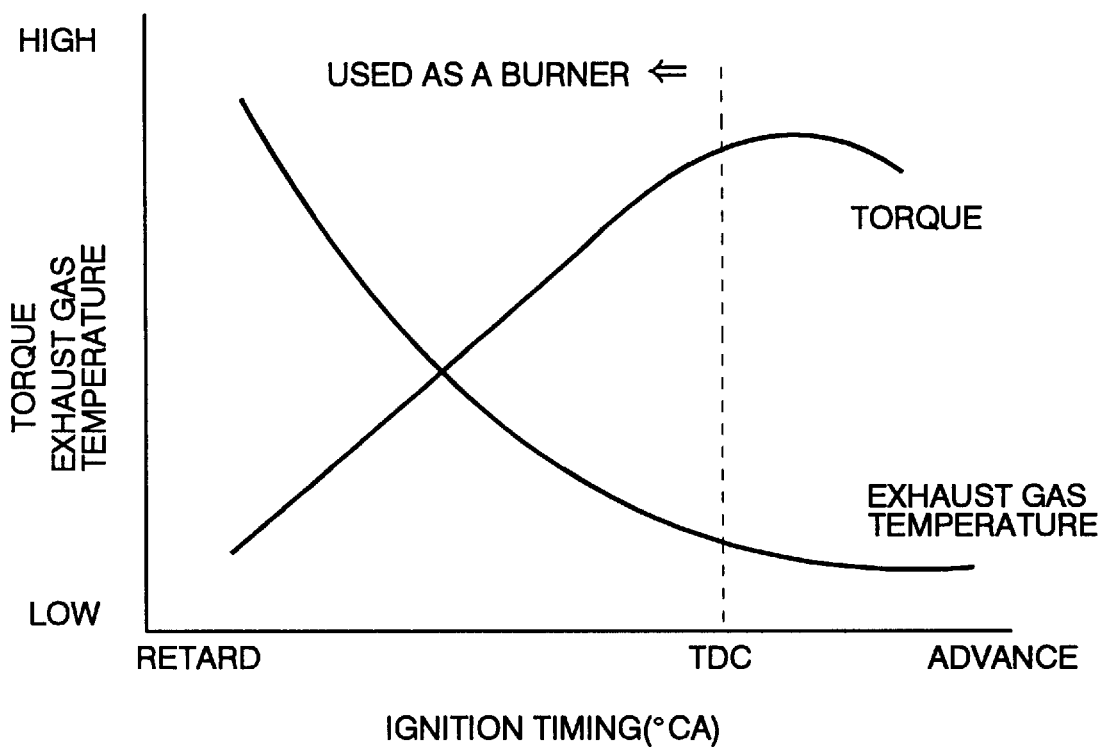
FIG. 7 is a graph showing characteristic curves of engine output torque and exhaust gas temperature in relation to ignition timing.

As a general rule, the output torque, i.e. net power output, of an engine changes as the ignition timing changes as shown in FIG. 7. Maximum net power output is attained only at a specified ignition timing (MBT) advanced by a specific crank angle of, for instance, 20° before top-dead-center. In a conventional engine, the ignition timing is retarded as compared with the advanced ignition timing (MBT) in the present invention, for instance at a crank angle of 10° before top-dead-center, during a cold engine start. In this instance, advancing or retarding the ignition timing from the advanced ignition timing (MBT) results in lowered net power output, the net power output being more significantly reduced in particular when the ignition timing is retarded, and the reduction in net power output complementarily increases thermal loss accompanied by an increase in exhaust gas temperature. FIG. 7 shows, in addition to change in engine output torque, one example of changes in exhaust gas temperature in relation to ignition timing.

Figure 8:
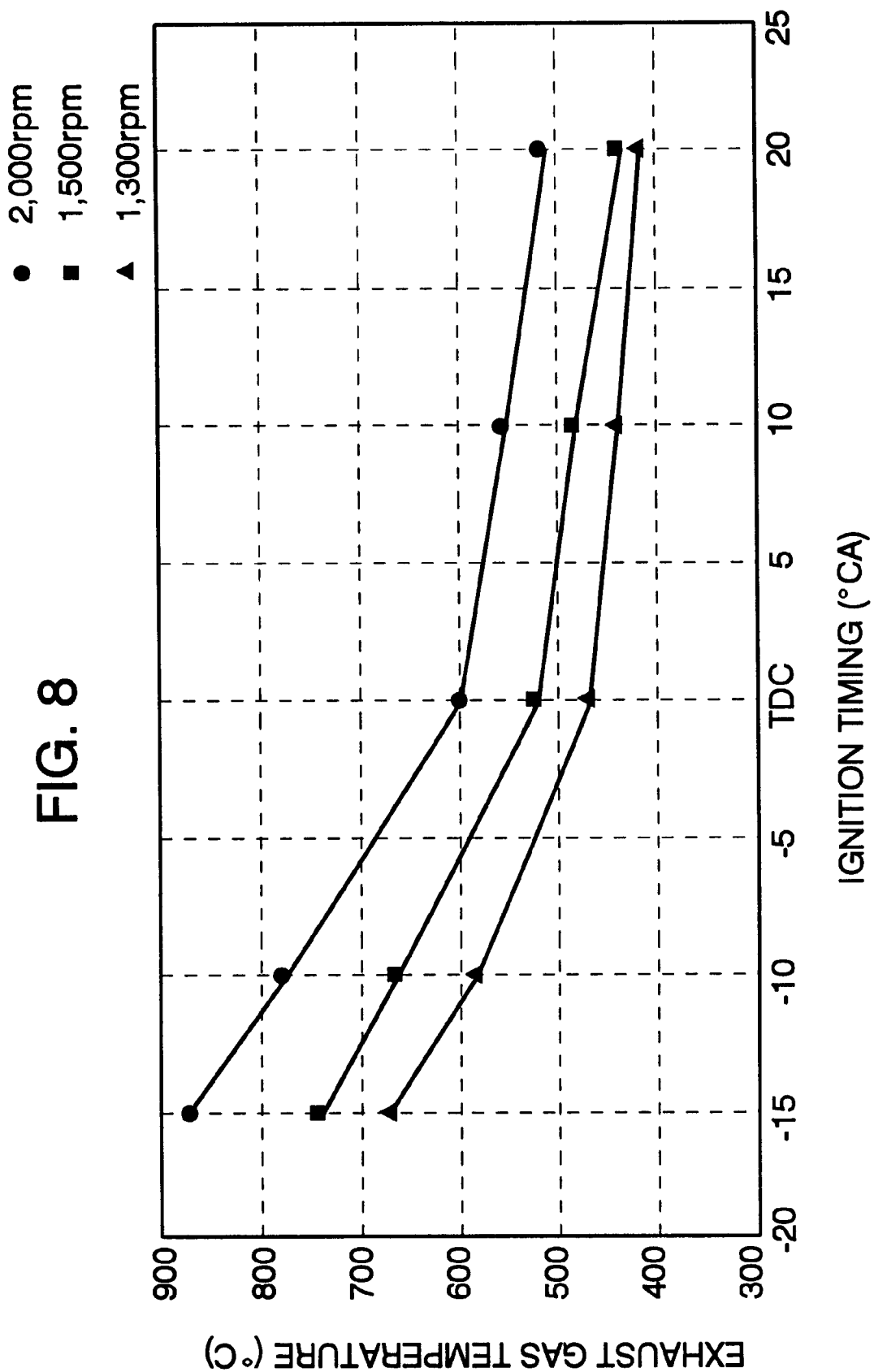
FIG. 8 is a graph showing characteristic curves of exhaust gas temperature in relation to ignition timing for various engine speeds.
Figure 9:
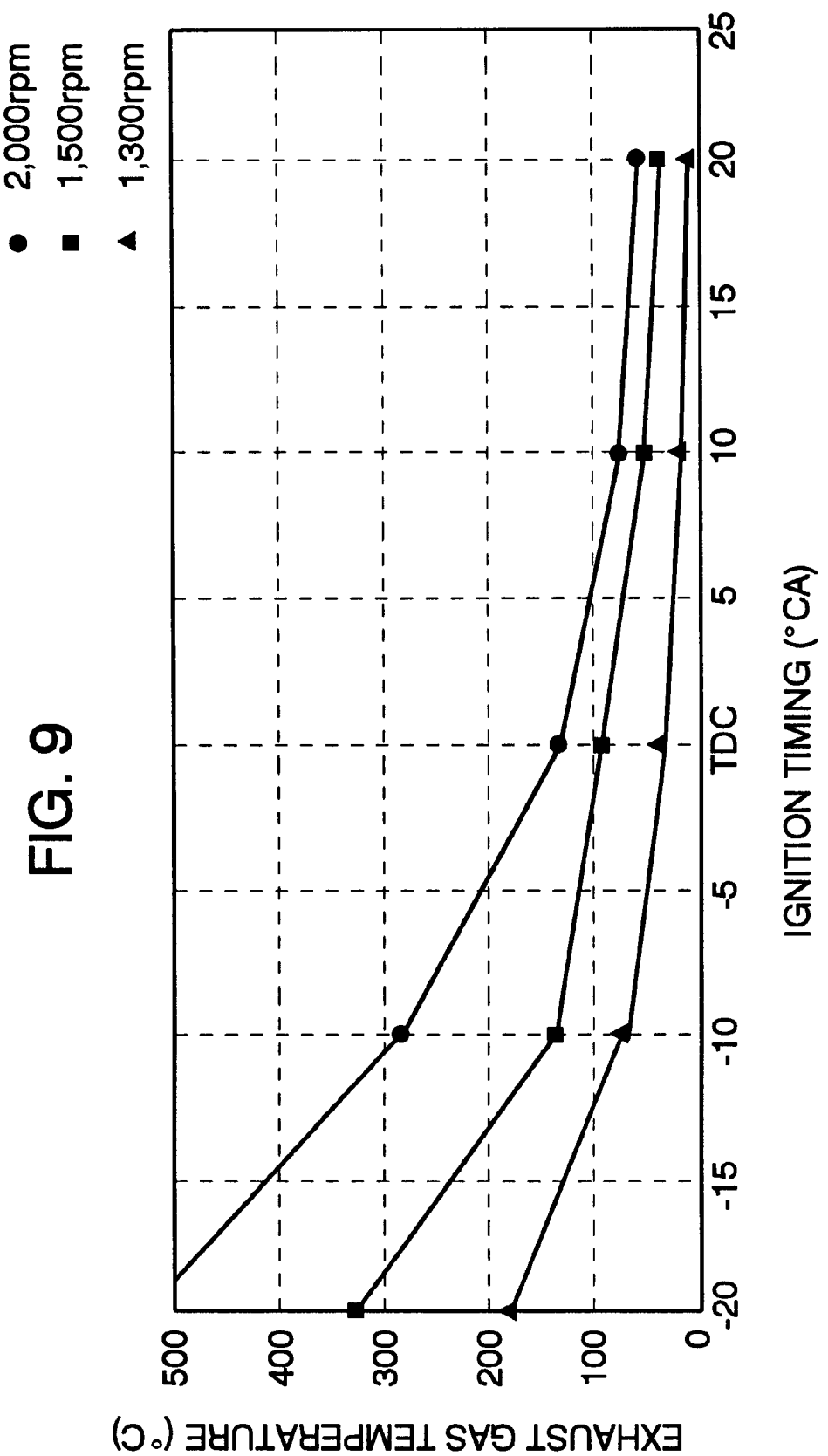
FIG. 9 is a graph showing characteristic curves of estimated catalyst temperature, 20 seconds after an engine start, in relation to ignition timing for various engine speeds.

FIG. 8 shows one example of characteristics of change in exhaust gas temperature in relation to ignition timing for various engine speeds. FIG. 9 shows characteristic curves of change in estimated catalyst temperature, 20 seconds after an initial engine start, in relating to ignition timing for various engine speeds. FIGS. 8 and 9 prove the pronounced effect of ignition timing on exhaust and catalyst temperature. As shown in FIG. 8, there is a significant sharp rise in exhaust gas temperature when the ignition timing is set to a point after top-dead-center. During a cold start of the engine CE, the heat generated by combustion of the air-fuel mixture is lost to the cold surfaces of the combustion chamber 2, especially to the ceiling of the combustion chamber comprised of the under surface of the cylinder head. On the other hand, if retarding the ignition timing to a point significantly after top-dead-center, there occurs the effect of shortening the duration of thermal exchange with surfaces of the combustion chamber 2, specifically the ceiling of the combustion chamber 2 which occupies the greater part of the combustion chamber surfaces, so as to lower the heat exchange rate, or the rate of cooling loss to the engine CE with a result of increasing the rate of thermal loss to the exhaust gas, thereby raising the temperature of the exhaust gas.

According to the aspects of the present invention described above, when the engine CE starts in a cold condition under a light load, while maintaining only the minimal level of net power output necessary for the engine CE to operate itself, the ignition timing is variably retarded in a range after top-dead-center as late as possible during a specific period of time for which acceleration of a rise in the temperature of exhaust gas is made. This retardation of the ignition timing causes great exhaust loss with the effect of increasing a rise in the temperature of exhaust gas and thus quickly raising the temperature of the exhaust purifying catalyst to a point above the effective activation temperature. However, significantly retarding the ignition timing causes aggravation of the ignition and combustion efficiency or characteristics of an air-fuel mixture with a lack of net power output, resulting in a decrease in engine cycling stability which always causes torque fluctuations. In these circumstances, the exhaust gas purifying system of the present invention is designed and adapted to promote shaping and burning an air-fuel mixture when the ignition timing is retarded in a range significantly after top-dead-center during the period of time for which acceleration of a rise in the temperature of exhaust gas is made, thereby ensuring the stability of engine cycling and suppressing an occurrence of torque fluctuations. Practically, a swirl having a swirl ratio of more than 1.0 is created in the combustion chamber 2 so as to increase ignition and combustion efficiency of an air-fuel mixture. In regard to obtaining a strong swirl of a swirl ratio above 1.0, closing or partially closing the second intake port 4 by the turbulence control valve 25 will result in the desirable condition of the air-fuel mixture entering the combustion chamber 2 completely or mainly through the first intake port 3 which functions as the swirl port as described previously. In this instance, there is a limit to the swirl ratio as an overly strong swirl action has the effect of lowering the temperature of exhaust gas.

Alternatively, the ignition and combustion efficiency of an air-fuel mixture may be improved with a tumble of a tumble ratio of greater than 1.5. To obtain a strong tumble of a ratio above 1.5, it is desirable to open greatly the turbulence control valve 25 so as to allow the air-fuel mixture to enter the combustion chamber 2 mainly through the second intake port 4. In the same manner as previously described in regard to an overly strong swirl rate, there is also a limit to the tumble rate.

As described above, because the first intake valve 7 is of a low-lift type, the speed of an air-fuel mixture entering the combustion chamber 2 through the first intake port 3 is increased in such a manner as to promote the creation of turbulence energy in the combustion chamber 2, thus raising the ignition and combustion efficiency of the air-fuel mixture. It is of course that the second intake valve 8 of a low-lift type increases the speed of an air-fuel mixture and promotes greatly the ignition and combustion efficiency in the same manner as stated above.

In the exhaust gas purifying system of the present invention which utilizes an air-mixing type of fuel injector 24, when the engine is started at cold temperatures, mixing air is supplied to the fuel injector 24 to promote atomization and vaporization of an air-fuel mixture in order to increase the ignition and combustion efficiency of the air-fuel mixture during the period of time for which acceleration of a rise in the temperature of exhaust gas is made. This also has the effect of lowering the rate of hydrocarbon (HC) emissions in the exhaust gas. It is to be noted that the engine CE equipped with the exhaust gas purifying system of the present invention stop the supply of mixing air during ordinarily idling as well as conventional engines utilizing air-mixing type fuel injectors. Further, in the exhaust gas purifying system of the present invention, upon a cold engine start, the energy supplied to the spark plug 12 is increased by controlling the ignition mechanism F during the period of time for which acceleration of a rise in the temperature of exhaust gas is made, with the effect of improving the ignition and combustion efficiency of the air-fuel mixture. Resultingly, it becomes possible to maintain cycling stability of engine CE and suppress torque fluctuations even if the ignition timing is retarded in a range significantly after top-dead-center.

The following discussion will be directed to a practical example in which the effect of swirl turbulence is utilized as a means of increasing the ignition and combustion efficiency of an air-fuel mixture.

Figure 10:
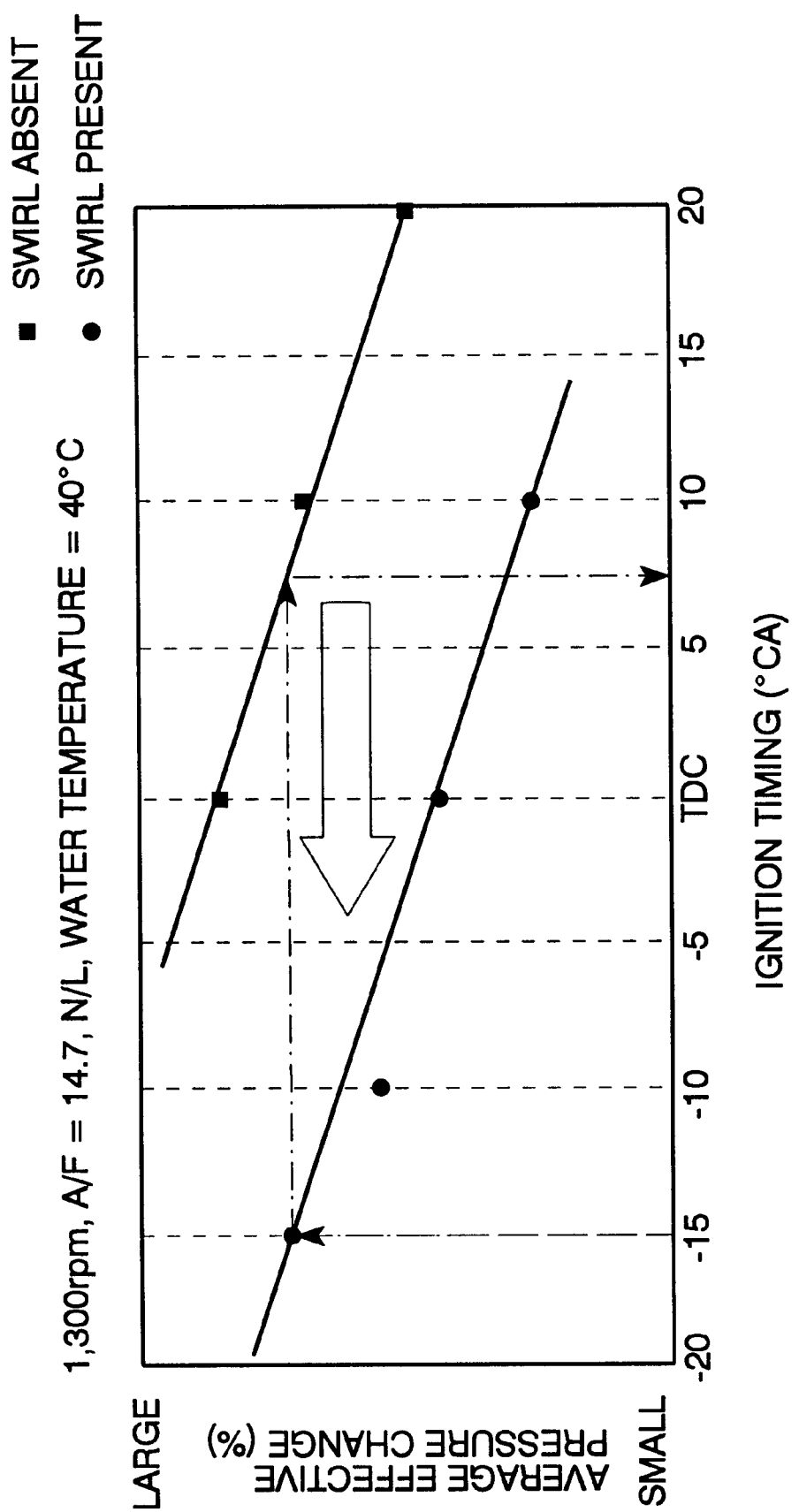
FIG. 10 is a graph showing characteristic curves of average effective pressure in relation to ignition timing for various engine speeds.

FIG. 10 shows changes in average effective pressure (Pi), i.e. torque changes, in relation to ignition timing under a condition where a swirl is present and a condition where a swirl is absent. As FIG. 10 demonstrates, there is a significant decrease in average effective pressure (Pi) in the case where a swirl is present as compared to the case where a swirl is absent. This indicates that, even when the ignition timing is significantly retarded to a point after top-dead-center, it is ensured to stabilize engine cycling and suppress torque fluctuations by promoting and inducing the creation of a swirl in the combustion process.

In further regard to a swirl, FIG. 11 shows an example of a change in in-cylinder turbulence energy of an air-fuel mixture in relation to crank angle. As FIG. 11 demonstrates, turbulence energy is markedly induced after top-dead-center (360° in crank angle), even at a crank angle of 90° after top-dead-center. This turbulence energy has the effect of increasing the ignition and combustion efficiency of the air-fuel mixture.

Figure 12A:
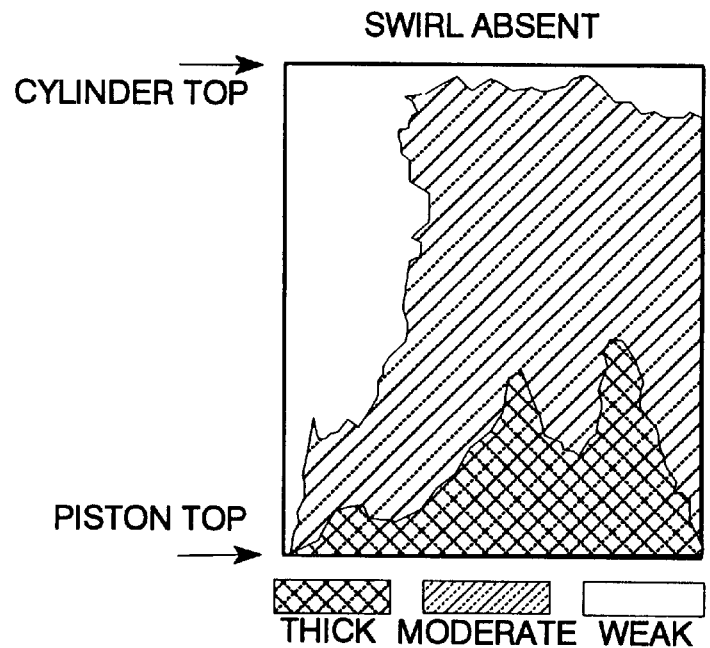
FIG. 12(A) is an illustration showing a distribution of concentration of an air-fuel mixture in the case where a swirl is absent in a cylinder when a piston is at bottom-dead-center.
Figure 12B:
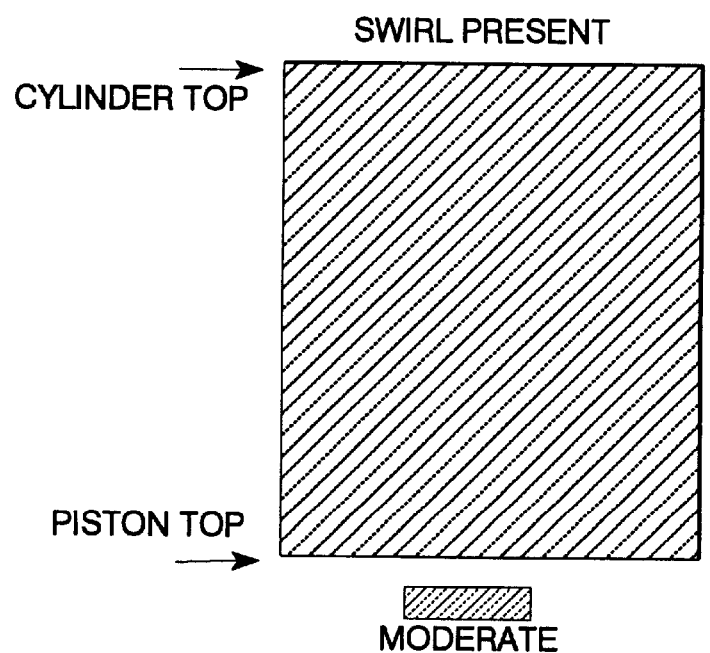
FIG. 12(B) is an illustration showing a distribution of concentration of an air-fuel mixture in the case where a swirl is present in a cylinder when a piston is at bottom-dead-center.

FIGS. 12(A) and 12(B) show the distribution patterns of an fuel-air mixture, with and without swirl turbulence, in the combustion chamber 2 when the piston is at bottom-dead-center (BDC). As FIGS. 12(*b*) and 12(*a*) demonstrate, the mixture density distribution pattern is completely uniform when a swirl is present, while the absence of a swirl causes three different mixture densities consisting of a rich range R1, a moderate range R2, and a lean range R3. Accordingly, the presence of a swirl induces a uniform mixture distribution which in turn aids in the efficient ignition and combustion of the air-fuel mixture.

Upon a cold engine start, the in-cylinder air-fuel ratio is set within a range from 13.5 to 18.0 during the period of time for which acceleration of a rise in the temperature of exhaust gas is made. In this instance, it is more desirable to set an excessive air ratio $\lambda$ at more than 1, in other words, to set an in-cylinder air-fuel ratio (A/F) at greater than 14.7. Thus setting the in-cylinder air-fuel ratio near the stoichiometric air-fuel ratio of 14.7 or slightly on the lean side provides the effect of raising the temperature of exhaust gas. When setting the in-cylinder air-fuel ratio in a range from 13.5 to 18.0 reduces the amount of latent heat necessary to atomize fuel or the amount of developed or actualized heat necessary to raise fuel temperature, as compared to the in-cylinder air-fuel ratio in a range from 12 to 13 conventionally utilized during a cold start. The saved part of heat has the effect of raising the temperature of exhaust gas. Together, because of the existence of adequate oxygen in the combustion chamber 2, the amount of heat generated from more complete combustion of the air-fuel mixture is increased accompanied by an effective rise in exhaust gas temperature. As a result, the exhaust purifying catalyst is more quickly brought to its effective activation temperature. Moreover, the in-cylinder air-fuel ratio is set on the leaner side more in comparison to the conventional engines, the production of hydrocarbons (HC) is lowered and emission control performance is enhanced during a cold start. In this instance, when the amount of heat necessary to atomize fuel or raise fuel temperature is reduced by setting the excessive air ratio above 1, that is, by setting the in-cylinder air-fuel ratio on the lean side or larger than the stoichiometric air-fuel ratio, fuel is burned more completely with a resultant rise in exhaust gas temperature. As a result, the exhaust purifying catalyst is more quickly brought to its effective activation temperature, and the production of hydrocarbons (HC) is lowered and emission control performance is enhanced during a cold start.

Referring to FIG. 13 which is a graph showing the change in exhaust gas temperature in relation to air-fuel ratio and ignition timing, a pronounced increase in exhaust gas temperature is obtained when an air-fuel ratio of 14.7 is utilized as opposed to the 13.0 air-fuel ratio used in the conventional engines. Further, when an air-fuel ratio of 14.7 is utilized, compared to the 13.0 air-fuel ratio employed by the conventional engines, a rising rate of the temperature of exhaust gas markedly increases as the ignition timing is retarded. That is, as compared to the conventional engines, the rising rate of exhaust gas temperature is significantly increased. This indicates that the exhaust gas purifying system of the invention enables the exhaust gas purifying catalyst to quickly attain a temperature above the activation temperature through the mutual effect of making an air-fuel ratio leaner as compared to the conventional engines and the retardation of ignition timing.

The following can be surmised as the cause of the mutual effect of the lean air-fuel ratio and retarded ignition timing.

Generally, combustion of an air-fuel mixture in an expansion stroke and in an exhaust stroke is promulgated more as the temperature of exhaust gas rises. Accordingly, after-combustion of the air-fuel mixture is promulgated if the exhaust gas temperature is increased by means of retarding the ignition timing. However, because after-combustion will not occur if there is insufficient oxygen, a rich air-fuel mixture will decline in after-combustion effect which results from an increase in exhaust gas temperature. On the other hand, if an air-fuel mixture of an air-fuel ratio of greater than 14.7 is provided, a sufficient amount of oxygen is present, and this leads to adequate inducement of the after-combustion effect due to the increased exhaust gas temperature. Resultingly, since the after-combustion effect causes an increase in exhaust gas temperature, the exhaust gas temperature can be markedly increased when the lean air-fuel mixture and retarded ignition timing are concurrently employed. An air-fuel ratio range where the excessive air ratio $\lambda$ is equal to or greater than 1 have the most pronounced effect on raising exhaust gas temperature.

In regard to the conventional engines, because a cold start of the engine shows aggravation of fuel atomization and vaporization and lowers the efficiency of ignition and combustion of an air-fuel mixture, the air-fuel mixture is enriched, for example, within a range of air-fuel ratio from 11 to 13 which is greatly rich as compared to the stoichiometric air-fuel ratio. Contradistinctively, as described previously, the exhaust gas purifying system of the present invention employs a swirl, a tumble and assist air to form a desired fuel-air mixture and promote more efficient combustion of the air-fuel mixture, thus allowing the air-fuel ratio in the range of 13.5 to 18.0 to be utilized during a cold engine start, that is to say, efficient ignition and combustion of the air-fuel mixture can be maintained even with an excessive air ratio $\lambda$ equal to or greater than 1.

It is desirable during a cold engine start and the period of time for which acceleration of a rise in the temperature of exhaust gas is made to supply secondary air to the exhaust duct 60 upstream from the catalytic converter 45 so as to provide an exhaust air-fuel ratio of more than 14.5. In this instance, the secondary air supply, concurrently with the rise in exhaust gas temperature promulgated by the retardation of ignition timing to a point after top-dead-center, acts to combust the residual fuel in the exhaust gas and yield further a raise in the temperature of exhaust gas due to heat from the combustion. Resultingly, heating of the exhaust gas purifying catalyst is promoted and the effective activation temperature is attained quickly. Because an exhaust air-fuel ratio of more than 14.5 is employed, the residual fuel in the exhaust gas is certainly combusted, so as to rise the temperature of exhaust gas, thereby quickly attaining the effective activation temperature.

Figure 14:
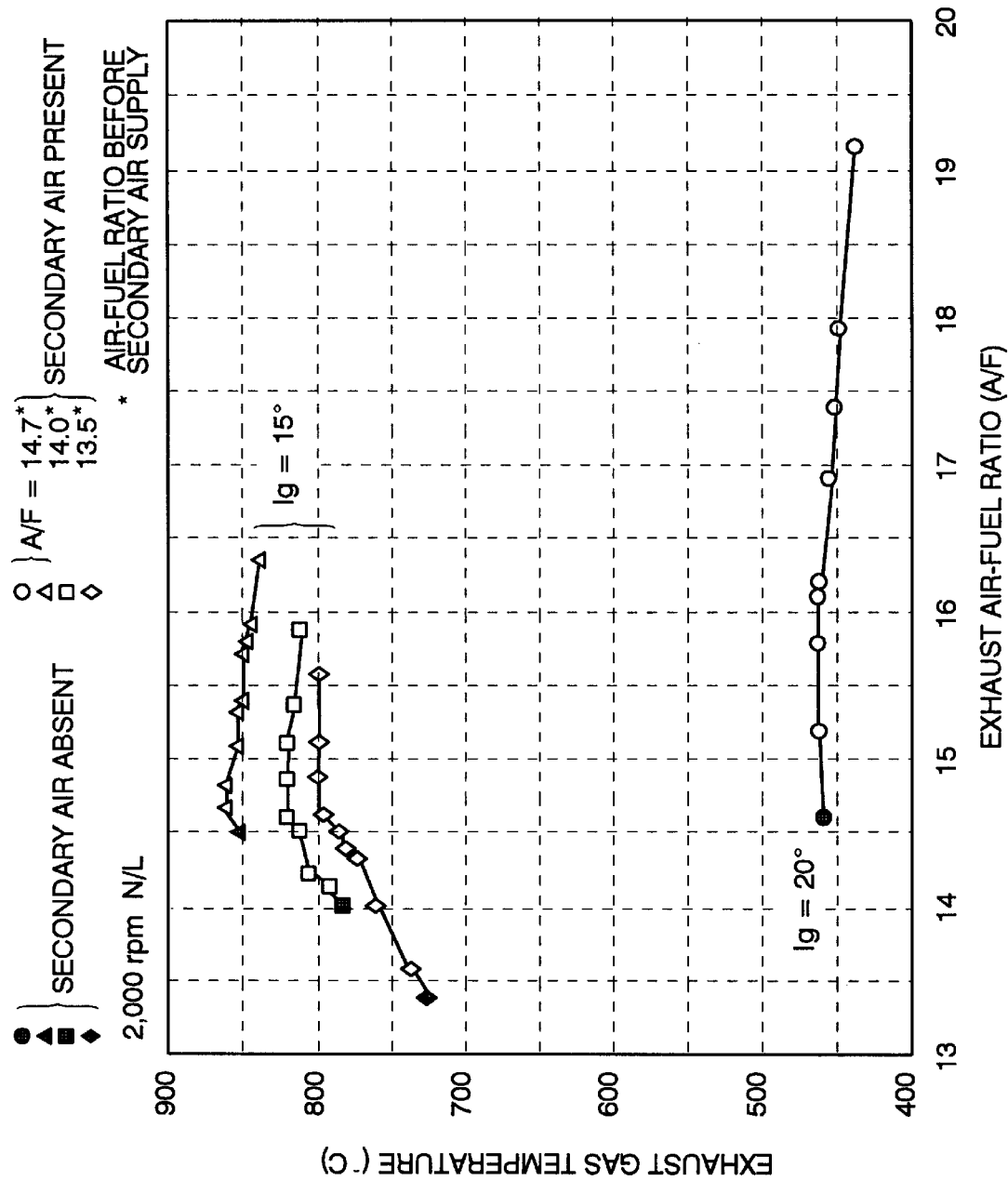
FIG. 14 is a graph showing characteristic curves of exhaust gas temperature before the catalatic converter in relation to virtual exhaust air-fuel ratio.

FIG. 14 shows the temperature of exhaust gas in relation to the exhaust air-fuel ratio, when secondary air is supplied to the exhaust duct 60 upstream from the catalytic converter 45. As FIG. 14 demonstrates, the supply of secondary air increases the temperature of exhaust gas when an air-fuel mixture is richer than the stoichiometric air-fuel mixture. However, when the exhaust gas remains a same exhaust air-fuel ratio, the leaner the in-cylinder air-fuel ratio is, the higher the temperature of exhaust gas becomes. That is, when the total amount of air is the same, supplying the entire air to the combustion chamber 2 results in a greater increase in the temperature of exhaust gas than if part of that air is supplied as secondary air to the exhaust gas.

It is desirable for the catalyst activation control to maintain engine speed at a specified relatively high level, 2,000 rpm for example, by means of regulating the amount of bypass air through the idle speed control (ISC) valve 22 and air control valve 23 during the period of time for which acceleration of a rise in the temperature of exhaust gas is made while the engine is running in a cold condition. This causes the amount of heat per unit time generated in combustion chamber 2 to increase with the result that the temperature of exhaust gas is more increased, so that the exhaust purifying catalyst attains its effective activation temperature extremely quickly.

As was described previously, the characteristic of change in exhaust gas temperature in relation to ignition timing for various engine speeds and the characteristic of change in estimated catalyst temperature, 20 seconds after an initial engine start, in relating to ignition timing are shown in FIGS. 8 and 9, respectively. In this instance, while the temperature of exhaust gas rises as the ignition timing is retarded, the time at which the temperature of exhaust gas begins to rise suddenly is directly related to the increase in engine speed. This results from the fact that, as the delay of ignition is defined by a time after discharge of the spark from spark plug 12 and the time of ignition is defined by a crank angle, a large change in crank angle occurs at higher engine speeds during the delay time of ignition even though which is unchanged. For this reason, when the engine operates at high speeds, the effect of raising the temperature o exhaust gas is adequately obtained even when the ignition timing is relatively advanced.

In the exhaust gas purifying system, the engine speed may be lowered by once again retarding the ignition timing after a certain time interval has passed during the period of time for which acceleration of a rise in the temperature of exhaust gas is made. This reduction in engine speed reduces engine noise as well as a yank to a start when the vehicle is put into gear, and improves the product appeal of the engine CE itself, and hence, of the vehicle into which the engine CE is installed.

Alternatively, after a certain time interval has passed during the period of time for which acceleration of a rise in the temperature of exhaust gas is made, the engine speed may lowered through a reduction in the amount of bypass air. In this case, the same effect is obtained. The retardation of ignition timing and reduction in the amount of bypass air may both be employed to lower the engine speed.

The catalyst activation control returns the ignition timing to a normally advanced timing when the vehicle starts during the period of time for which acceleration of a rise in the temperature of exhaust gas is made. Returning the ignition timing increases engine output torque, resulting in an improvement of the starting and running performance of the vehicle in which the engine EC is installed, which leads to the favorable marketability of the vehicle. Otherwise, it is also preferable that the supply of bypass air may be gradually constricted and cut off after the vehicle starts in order to prevent a sudden decrease in the amount of intake air upon a start and thereby to improve the starting and running performance of the vehicle. It is further preferable to gradually cut off the supply of bypass air in order to prevent a sudden decrease in the amount of intake air upon a start and thereby to improve the starting and running performance of the vehicle.

The catalyst activation control may set the ignition timing retarded from a normally advanced timing before top-dead-center when the vehicle starts during the period of time for which acceleration of a rise in the temperature of exhaust gas is made. This increases engine output torque, resulting in an improvement of the starting and running performance of the vehicle in which the engine EC is installed, which leads to the favorable marketability of the vehicle. The ignition timing may be left retarded in order to promote the rise of exhaust gas temperature, when the engine CE operates at a level of output torque or engine load less than a predetermined level, that is, in a range of operating conditions where the engine CE needs output torque at a low level but higher than output torque necessary to idle. In order for the engine CE to have cycling stability after the vehicle starts, the catalyst activation control may reduce a rate of ignition timing retardation as the engine output torque or engine load increases.

In cases where the vehicle starts and then stops, if the effective activation temperature of the catalyst element of the catalytic converter 45 has not yet been attained, it is preferred that, while shaping an air-fuel mixture and promoting combustion for maximum thermal discharge, the catalyst activation control once again reset the ignition timing retarded to a point after top-dead-center. Thus, even with the vehicle coming to a halt, while combustibility of the air-fuel mixture and engine cycling stability at the necessary minimum level are maintained, the time needed to attain the effective activation temperature is shortened.

Running or stopping of the vehicle may be determined, for instance, based on transmission positions or vehicle speeds. Specifically, when the transmission is in a neutral position, it is determined that the vehicle is stopping. Otherwise, when a vehicle speed sensor detects a speed less than, for instance, 5 Km/h, it may be determined that the vehicle is stopping.

During the period of time for which acceleration of a rise in the temperature of exhaust gas is made after a cold engine start, it is desirable for the catalyst activation control to set the ignition timing to a point after top-dead-center after the engine CE boosts its speed sharply up to, for instance, approximately 2,000 rpm following a full explosion, at which the engine speed is between approximately 500 and 600 rpm slightly less than an engine idle speed, immediately after cranking. In this manner, the engine CE has been sufficiently stable in cycling until the time the ignition timing is set to a point after top-dead-center, yielding reduced torque fluctuations during the acceleration of a rise in the temperature of exhaust gas and improving the marketability of the engine CE. It is more desirable for the catalyst activation control to set the ignition timing to a point after top-dead-center after a certain time interval from a boost of engine speed following a full explosion of the engine after cranking. This increases the stability of engine cycling, leads to reducing torque fluctuations during the period of time for which acceleration of a rise in the temperature of exhaust gas is made, which always improves the marketability of the engine CE. Together, the catalyst activation control may set the ignition timing to a point advanced from the ignition timing in normal driving conditions, until a full explosion is completed after engine cranking. This advanced setting yields the effect of improving the ignition and combustion efficiency of an air-fuel mixture, quickly bringing the engine CE into self-cycling and, as a consequence, improving engine starting performance.

The catalyst activation control may be simply and completely terminated by means of a timer after a certain time interval from the commencement of the period of time for which acceleration of a rise in the temperature of exhaust gas is made after a cold start. This simplifies the engine control system and/or the control logic employed and reduces manufacturing costs. In this regard, the period of time for which acceleration of a rise in the temperature of exhaust gas is made may be terminated at attainment of a specific temperature of the exhaust gas measured at a point behind the catalytic converter 45. This results in raising the temperature of exhaust gas until the catalyst becomes reliably active and promoting the activation of the catalyst. In addition, this allows the net output of engine to be quickly increased after the achievement of activation of the catalyst and yields the stability of engine cycling.

FIGS. 17(A) through 17(D) show one example of changes in engine speed, intake air amount, ignition timing, and air-fuel ratio, respectively, on the passage of time while the catalyst activation control is conducted after a cold start. In this example, the ignition timing is advanced at a crank angle of approximately 7° before top-dead-center until a boost of engine speed to approximately 2,000 rpm and retarded at a crank angle of approximately 15° after top-dead-center after the boost of engine speed to approximately 2,000 rpm. Together, the amount of intake air and ignition timing are kept at steady values during the period of time for which acceleration of a rise in the temperature of exhaust gas is made so as to maintain the engine speed at approximately 2,000.

Figure 18A:
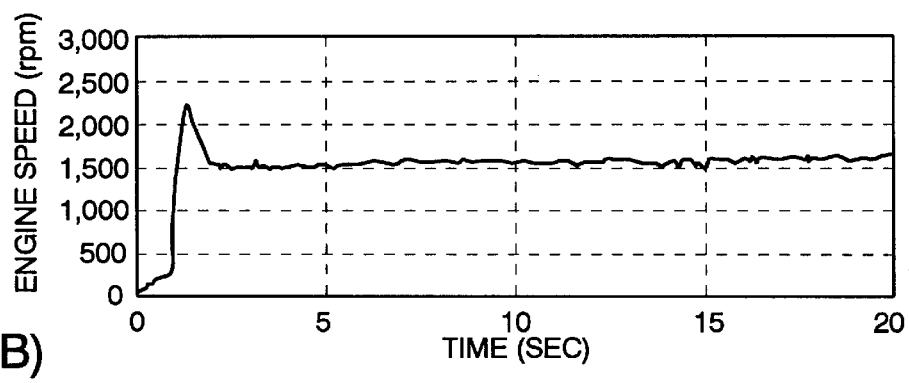
FIGS. 18(A) to 18(C) are graphs showing characteristic curves of engine speed, ignition timing and air-fuel ratio in relation to time, respectively, during a cold engine start.
Figure 18B:
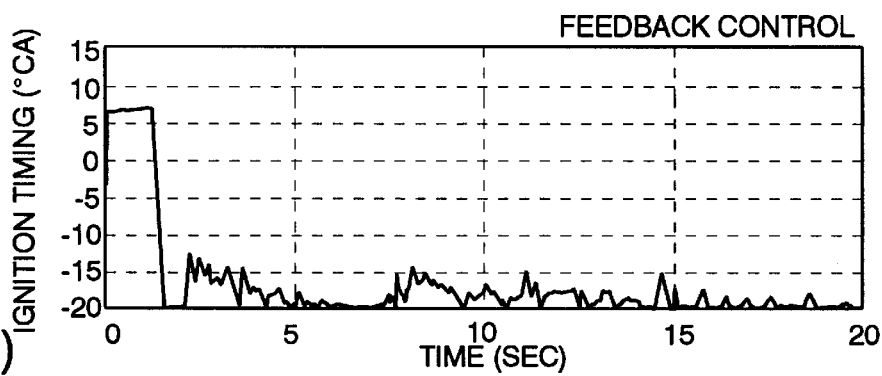
Figure 18C:
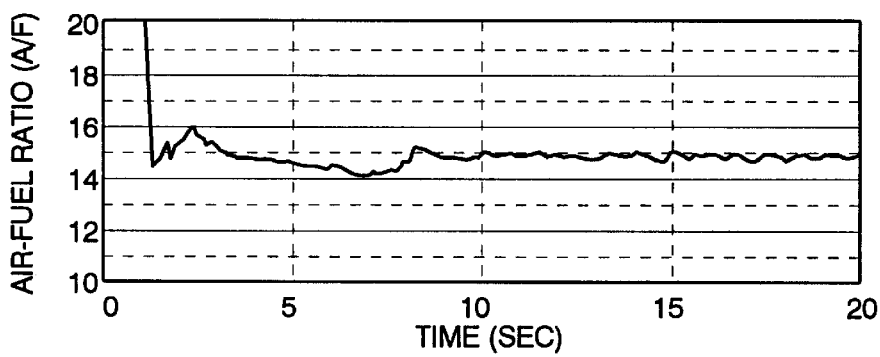

FIGS. 18(A) through 18(C) show another example of changes in engine speed, ignition timing, and air-fuel ratio, respectively, on the passage of time while the catalyst activation control is conducted after a cold start. This example shows the case where the ignition timing is advanced at a crank angle of approximately 7° before top-dead-center until a boost of engine speed to approximately 2,000 rpm and retarded at a crank angle of approximately 15° after top-dead-center at the time of the boost of engine speed to approximately 2,000 rpm, and further retarded after a moment subsequent to the first retardation with the result of a fall of engine speed to approximately 1,500 rpm.

Figure 19A:
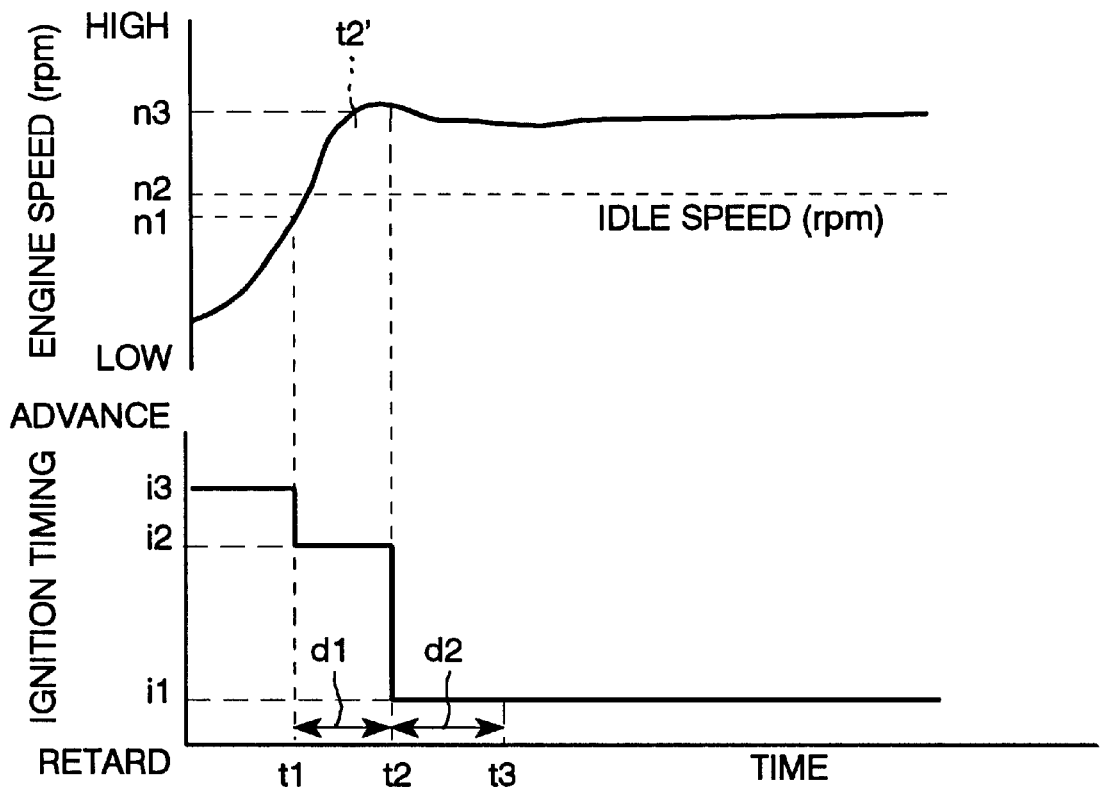
FIG. 19(A) is a graph showing characteristic curves of engine speed and ignition timing in relation to time, respectively, during a cold engine start.

FIGS. 19(A) shows still another example of changes in engine speed and ignition timing on the passage of time while the catalyst activation control is conducted after a cold start. In this example, the ignition timing takes an initial advanced angle $i_3$, which is relatively large, until an explosion time $t_1$ the engine CE makes a full explosion and attains a speed $n_1$ (which is referred to as an explosion speed) slightly lower than an idle speed $n_2$, and a normal advanced angle $i_2$, which is set according to an engine speed and the amount of intake air and relatively small, during a time interval ($d_1$) from the explosion time $t_1$ to a time $t_2$ the engine CE boosts its speed to a maximum speed $n_3$ (which is referred to as a boost time). After the boost of engine speed to approximately 2,000 rpm, the ignition timing is further retarded to a specified crank angle $i_1$ after top-dead-center. For a certain time interval $d_2$ from the boost time $t_2$ to a time $t_3$, the retardation of the ignition timing to the specified crank angle $i_1$ after top-dead-center may be delayed so as to improve the stability of engine cycling. Further, as shown in FIG. 19(A), if the boost of engine speed is detected by monitoring a change in engine speed, the ignition timing may be retarded to the specified crank angle $i_1$ when the maximum engine speed $n_3$ is monitored at a moment $t_2'$. In this case, it is desirable to increase the amount of intake air by, for instance, increasing the opening of the idle speed control (ISC) valve 22 during the time interval $d_1$ and, after the time interval $d_1$, to further increase the amount of intake air. This enables the engine CE to boost its speed smoothly or rapidly. Otherwise, in cases where the air-fuel ratio is fixed, it is desirable to increase the opening of the idle speed control (ISC) valve 22 so as to increase the amount of intake air with an increase in retardation of the ignition timing. Increasing the amount of intake air results in increasing the amount of fuel to an air-fuel mixture and consequently, in increasing heat from combustion of the air-fuel mixture, leading to an accelerated rise in the temperature of exhaust gas.

Figure 19B:
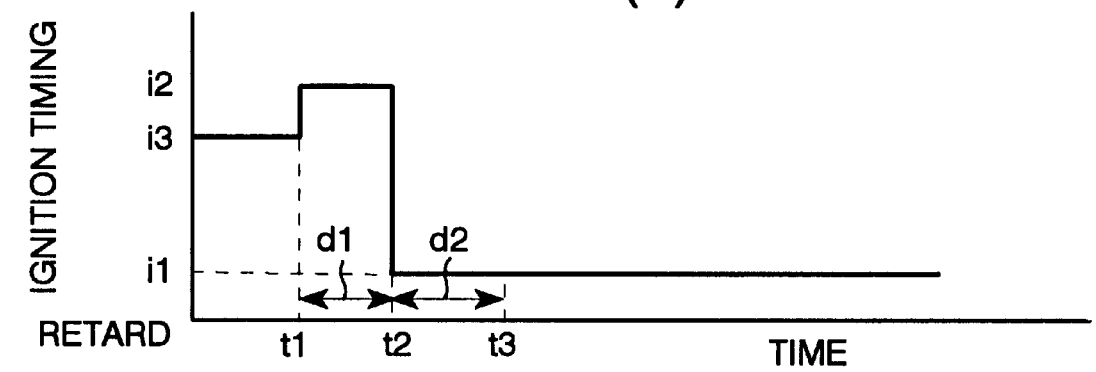
FIG. 19(B) is a graph showing a characteristic curve of ignition timing in relation to time during a cold engine start.

The ignition timing may further be changed as shown in FIG. 19(B). In this example, the ignition timing takes an initial advanced angle $i_3$ until the explosion speed $n_1$ is attained at an explosion time $t_1$, and an angle $i_2$ further advanced from the initial angle $i_3$ during a time interval ($d_1$) from the explosion time $t_1$ to a boost time $t_2$. After the boost of engine speed, the ignition timing is retarded to a specified crank angle $i_1$ after top-dead-center. For a certain time interval $d_2$ from the boost time $t_2$ to a time $t_3$, the retardation of the ignition timing to the specified crank angle $i_1$ after top-dead-center may be delayed so as to improve the stabilize of engine cycling. In this instance, fixing the amount of intake air provides the enhanced stability of engine cycling.

Figure 20:
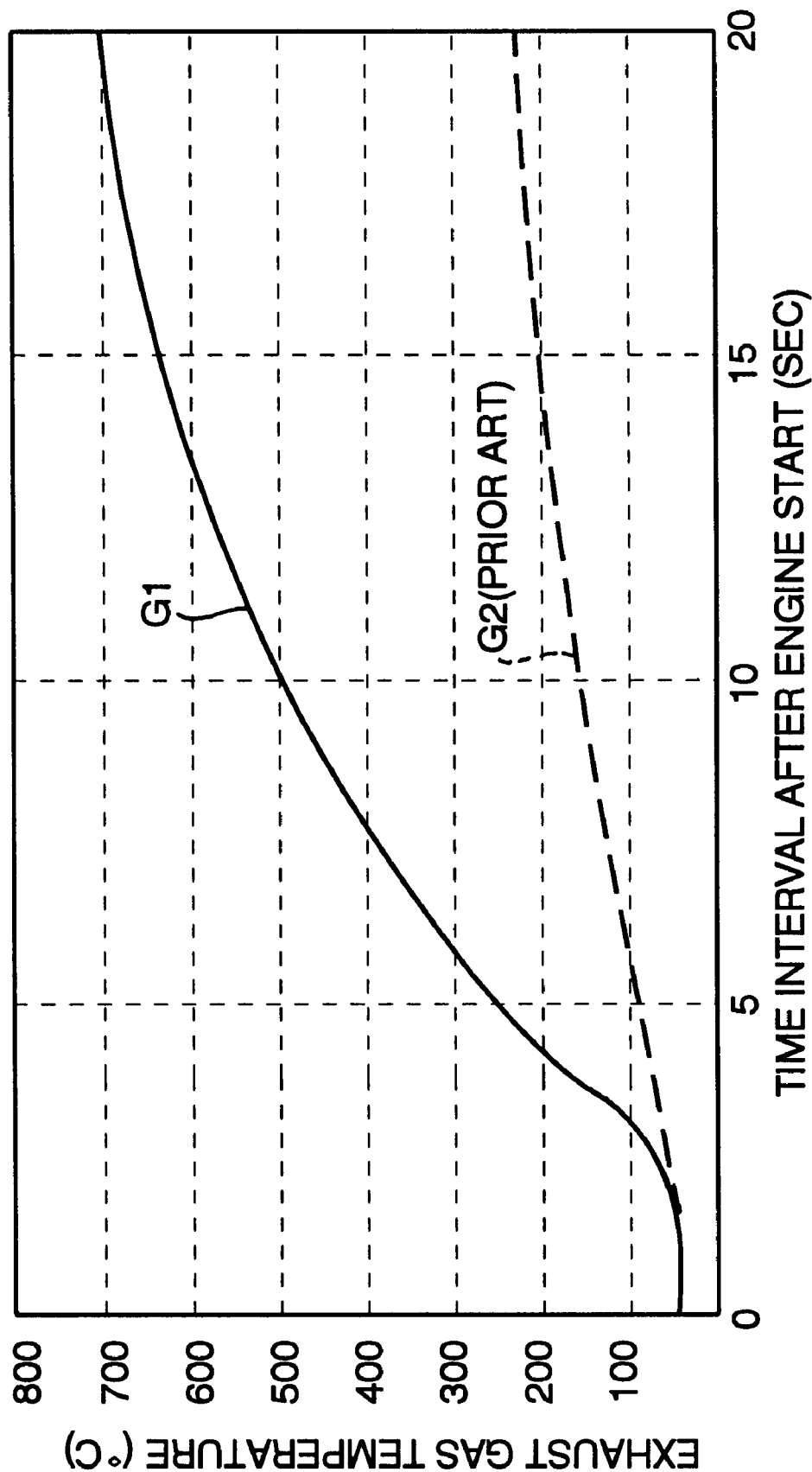
FIG. 20 is a graph showing characteristic curves of exhaust gas temperature in relation to time lapse after an engine start in comparison with a prior art exhaust system.
Figure 21:
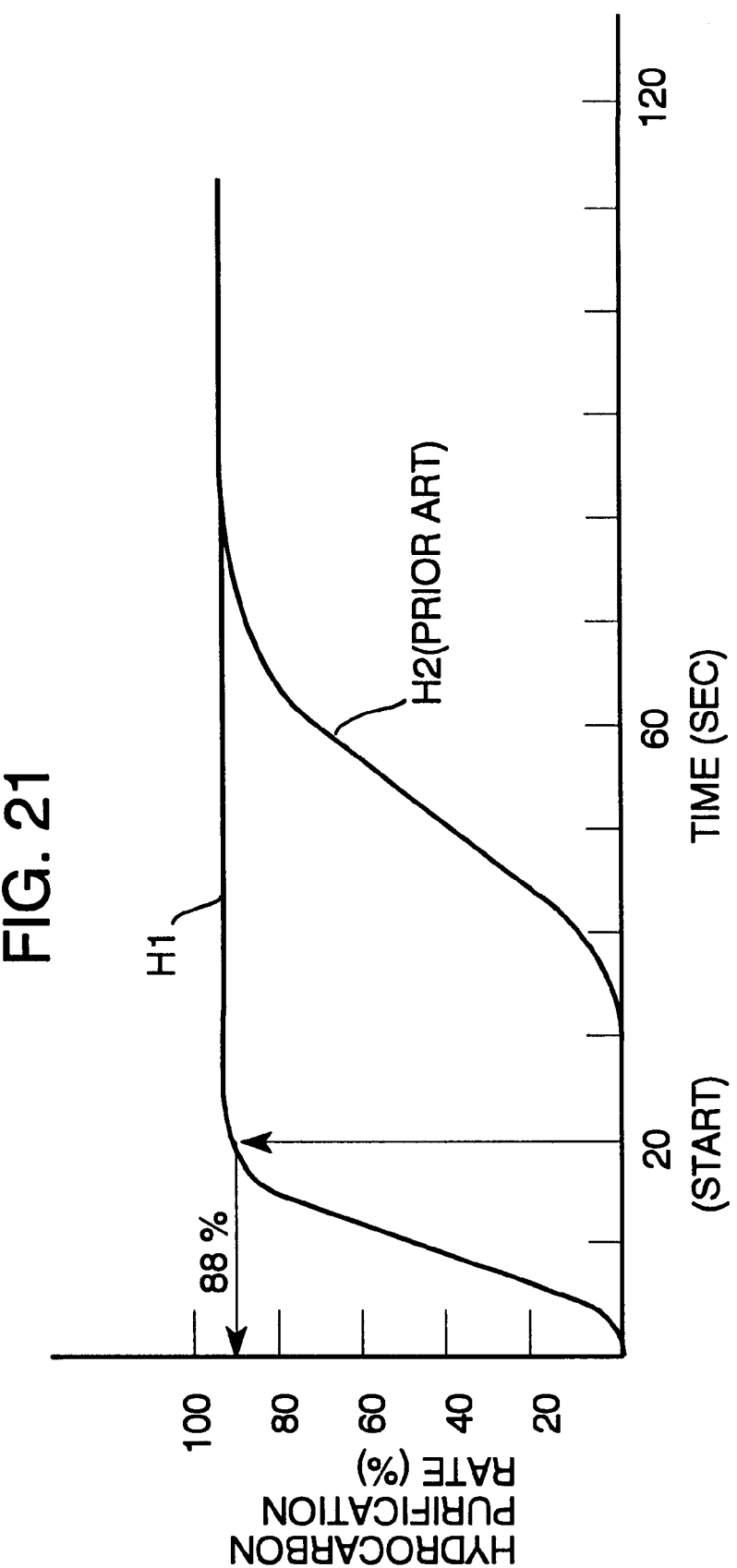
FIG. 21 is a graph showing characteristic curves of hydrocarbon (HC) purifying efficiency in relation to time lapse after an engine start in comparison with a prior art exhaust system.

FIG. 20 shows an example of a change in the temperature of exhaust gas on the passage of time (which is represented by a characteristic curve G1) when the catalyst activation control is performed during a cold engine start, in comparison with a conventional art change in the temperature of exhaust gas on the passage of time (which is represented by a characteristic curve G2). FIG. 21 shows an example of a change in the efficiency of purifying hydrocarbons (HC) (which is represented by a characteristic curve H1) as it occurs after a cold engine start when employing the catalyst activation control, in comparison with the prior art efficiency of purifying hydrocarbons (HC) (which is represented by a characteristic curve H2).

As FIGS. 20 and 21 demonstrate, the engine CE employing the catalyst activation control realizes a significantly rapid rise in the temperature of exhaust gas as compared to the prior art engines. Resultingly, the hydrocarbon purification rate is markedly increased to a level of approximately 88% 20 seconds after an engine start before the vehicle starts.

As described above, according to the aspects of the present invention, without the need for catalyst heating devices such as an EHC or an afterburner, while stabilizing engine cycling to suppress torque fluctuations during a cold engine start, the temperature of the exhaust gas is quickly raised, and the effective activation temperature of the exhaust gas purifying catalytic element is quickly attained when the engine is running in a non-warmed up condition.

The system that Japanese Unexamined Patent Publication No. 2-64253 teaches increases the amount of intake air and retards an ignition timing during a cold engine start with the purpose of stabilizing an idle speed of the engine and rapidly warming up the engine. While, the system of the Japanese Unexamined Patent Publication No. 2-64253 is the same as that of the present invention in regard to retarding the ignition timing, nevertheless, the system does not incorporate a catalytic converter nor retards the ignition timing to a point after top-dead-center. Accordingly, the prior art system is of different construction and operation and does not achieve the effect that the present invention provides.

Figure 22:
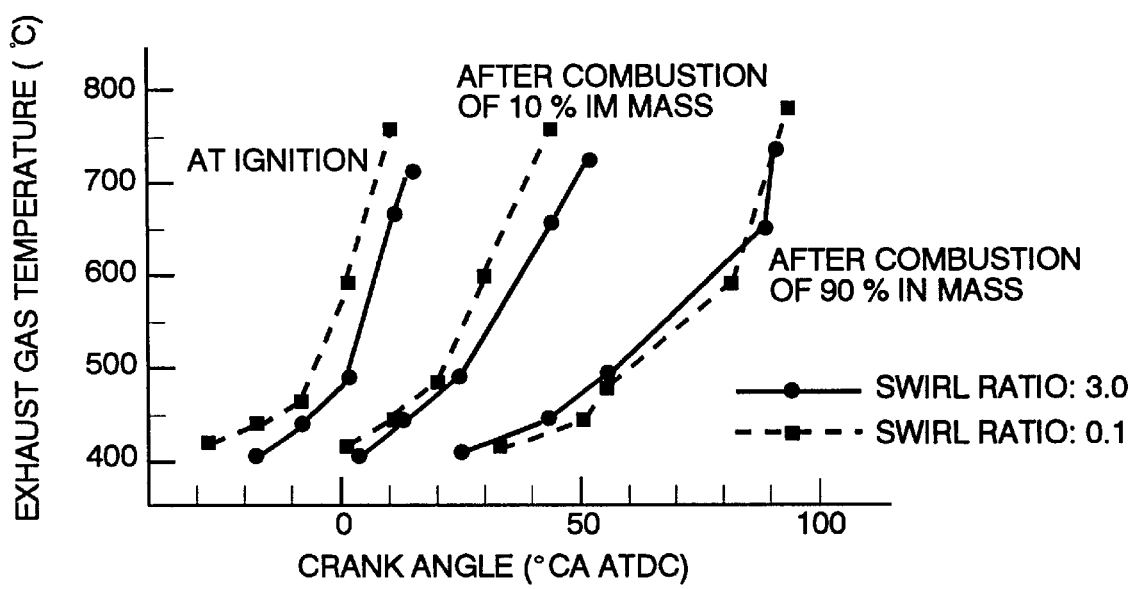
FIG. 22 is a graph showing dependency of exhaust gas temperature and fuel mixture combustion time on crank angle.

FIG. 22 shows the experimental result relating to the dependency of the temperature of exhaust gas on ignition timing and swirl ratio and the dependency of time necessary to combust an air-fuel mixture on ignition timing and swirl ratio. As FIG. 22 demonstrates, the retardation of ignition timing causes a progressive rise in the temperature of exhaust gas. This proves the significant effect of the catalyst activation control employed in the present invention in which the ignition timing is retarded in order to cause a rise in the temperature of exhaust gas. Together, as FIG. 22 demonstrates, the combustion time is shortened with the effect of improvement of the stability of combustion of an air-fuel mixture by means of inducing a strong swirl of, for instance, a swirl ratio of 3.0 into the air-fuel mixture. Accordingly, in the catalyst activation control in which an enhanced swirl is generated, possible aggravation of the stability of combustion of an air-fuel mixture resulting from the retardation of ignition timing is compensated by the enhanced swirl and the substantial stability of combustion is maintained, consequently.

Figure 23:
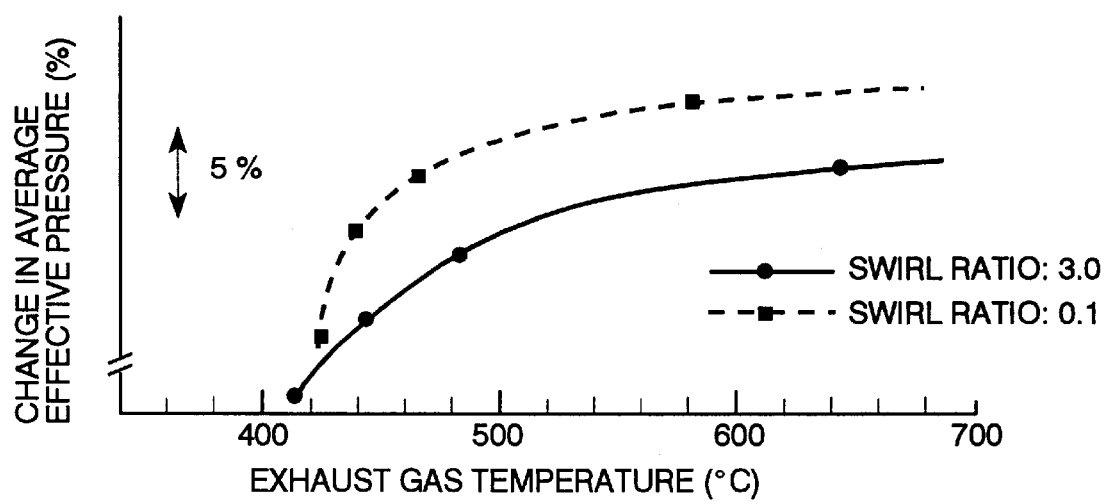
FIG. 23 is a graph showing relationships between average effective pressure and exhaust gas temperature for different swirl ratios.

FIG. 23 shows the experimental result relating to the dependency of a change in average effective pressure (Pi) on the temperature of exhaust gas and swirl ratio. As FIG. 23 demonstrates, the change in average effective pressure (Pi), on one hand, increases with a rise in the temperature of exhaust gas and, the other hand, significantly decreases with an increase in swirl ratio. This proves that, while, in the catalyst activation control in which an enhanced swirl is generated, the change in average effective pressure (Pi) tends to increase as the ignition timing is retarded, the enhanced swirl has an effect of suppressing or compensating the increasing change in average effective pressure (Pi). As a result, the stability of combustion and engine cycling is improved even when the ignition timing is retarded.

Figure 24:
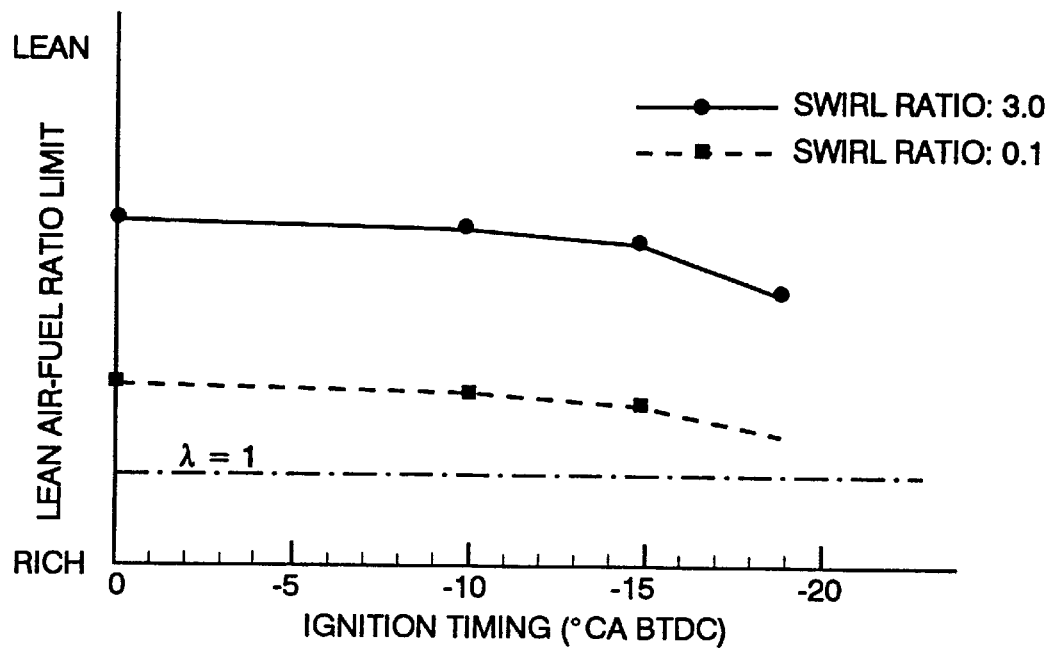
FIG. 24 is a graph showing dependency of lean limit of air-fuel ratio on ignition timing.

FIG. 24 shows the experimental result relating to the dependency of a lean limit to air-fuel ratio on ignition timing and swirl ratio. As FIG. 22 demonstrates, enhancing a swirl has an effect of shifting the lean limit of air fuel ratio to the leaner side. While, in general, the lean limit of air fuel ratio shifts to a less lean side as the ignition timing is retarded, however, in the catalyst activation control of the present invention in which an enhanced swirl is generated, the lean limit of air fuel ratio is on a more leaner side. Resultingly, the stability of combustion and engine cycling is improved even when the ignition timing is retarded.

Experiments were performed by the applicant of this application to find the dependency of hydrocarbon concentration on the temperature of exhaust gas or crank angle. In this instance, the term "hydrocarbon (HC) concentration index" used herein shall mean and refer to a parentage of hydrocarbon (HC) concentration in exhaust gas relative to hydrocarbon (HC) concentration which will be obtained at the optimum ignition timing in order for the engine CE to provide maximum output torque. More specifically, the hydrocarbon concentration index is a percentage of hydrocarbon (HC) concentration at an ignition timing retarded from the optimum ignition timing relative to the hydrocarbon (HC) concentration at the optimum ignition timing which is defined as 100%.

Figure 25:
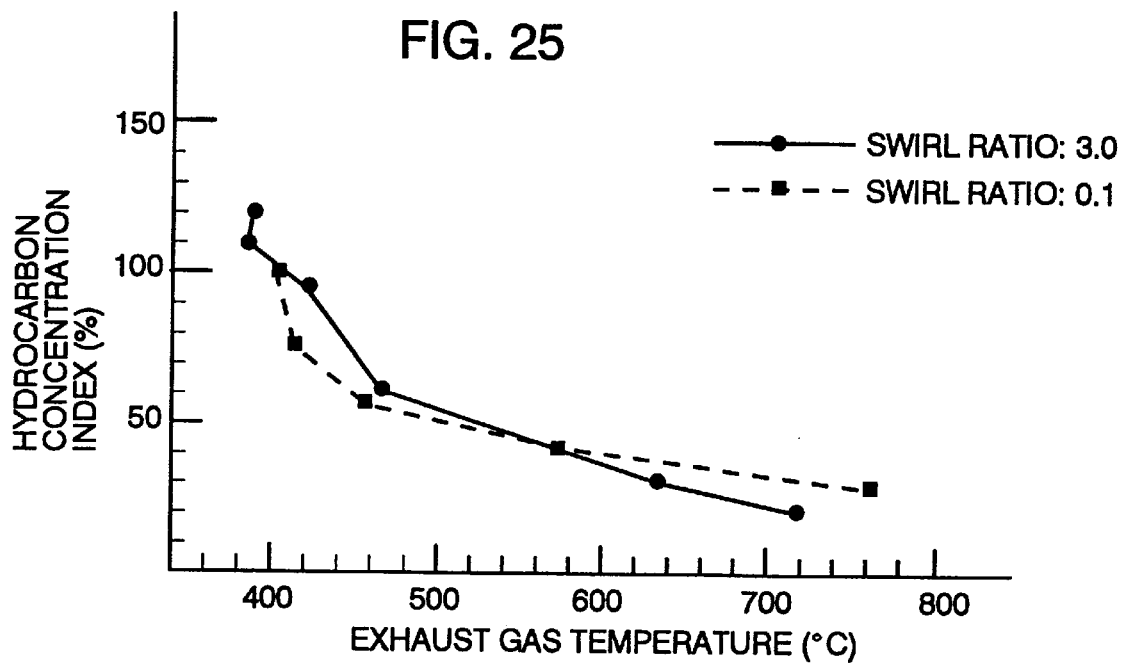
FIG. 25 is a graph showing dependency of hydrocarbon (HC) concentration index on exhaust gas temperature.

FIG. 25 shows the experimental result relating to the dependency of a hydrocarbon concentration index on the temperature of exhaust gas and swirl ration. As FIG. 25 demonstrates, the hydrocarbon concentration index becomes small with a rise in the temperature of exhaust gas and, is, however, independent of swirl ratios. Consequently, in the catalyst activation control of the present invention in which a rise in the temperature of exhaust gas is promoted by retarding the ignition time, the emission of hydrocarbons (HC) is significantly reduced.

Figure 26:
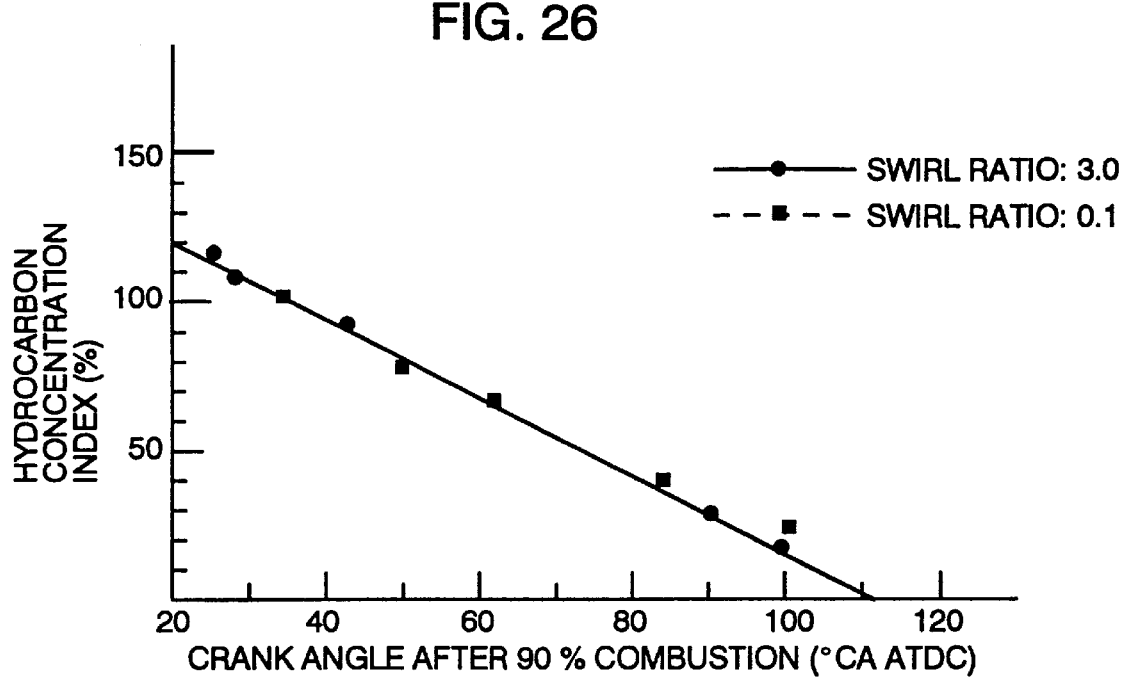
FIG. 26 is a graph showing a relationship between hydrocarbon (HC) concentration index and crank angle at 90% combustion of an air-fuel mixture.

FIG. 26 shows the experimental result relating to the dependency of the hydrocarbons (HC) concentration index in exhaust gas on crank angle, at which combustion of 90% of fuel (which is referred to as 90% combustion crank angle) is achieved, and swirl ratio. As FIG. 26 demonstrates, making the 90% combustion crank angle larger, in other words, setting the retardation of ignition timing larger, has an effect of lowering the hydrocarbon concentration index and is, however, independent of swirl ratios. Consequently, in the catalyst activation control of the present invention in which a rise in the temperature of exhaust gas is promoted by retarding the ignition time, the emission of hydrocarbons (HC) is significantly reduced.

Further, experiments were performed by the applicant of this application to find the dependency of carbon monoxide concentration on the temperature of exhaust gas. In this instance, the term "carbon monoxide (CO) concentration index" used herein shall mean and refer to a parentage of carbon monoxide (CO) concentration in exhaust gas relative to carbon monoxide (CO) concentration which will be obtained at the optimum ignition timing in order for the engine CE to provide maximum output torque. More specifically, the hydrocarbon concentration index is a percentage of hydrocarbon (HC) concentration at an ignition timing retarded from the optimum ignition timing relative to the carbon monoxide (CO) concentration at the optimum ignition timing which is defined as 100%.

Figure 27:
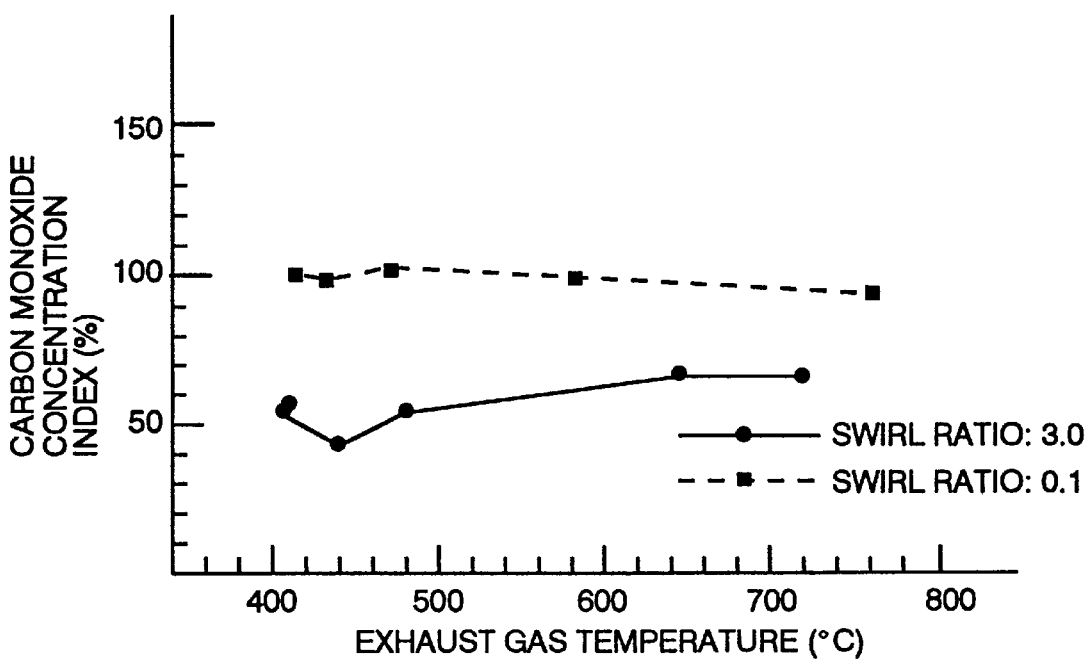
FIG. 27 is a graph showing dependency of carbon monoxide (CO) on exhaust gas temperature.

FIG. 27 shows the experimental result relating to the dependency of the carbon monoxide concentration index on the temperature of exhaust gas and swirl ratio. As FIG. 27 demonstrates, while the carbon monoxide concentration index is almost independent of the temperature of exhaust gas, it is significantly small when a swirl has a large swirl ratio. Consequently, in the catalyst activation control of the present invention in which an enhanced swirl is generated, the emission of hydrocarbons (HC) is significantly reduced.

It is to be understood that although the present invention has been described in connection of preferred embodiments thereof, various other embodiments and variants may occur to those skilled in the art, which are within the scope and spirit of the invention, such other embodiments and variants are intended to be covered by the following claims.

What is claimed is:

1. An exhaust gas purifying system having a catalytic converter in an exhaust line for purifying exhaust gas for a reciprocating internal combustion engine of a vehicle, said exhaust gas purifying system comprising:

thermal condition monitoring means for monitoring a warmed condition of the engine;

engine operation control means for controlling operation of the engine;

combustion promoting means for promoting combustion of an air-fuel mixture in the engine; and temperature control means for controlling a rise in exhaust gas temperature to an effective activation temperature of said catalytic converter during a time interval from an engine start, said temperature control means, while said thermal condition monitoring means detects a specified cold condition of the engine, causing said engine operation control means to retard an ignition timing at which an air-fuel mixture is fired in the engine to a point after top-dead-center during said time interval and causing said combustion promoting means to promote combustion of said air-fuel mixture, wherein said engine operation control means further alters an exhaust air-fuel ratio in a range equal to or greater than 14.5 during said specific time interval, thereby accelerating said rise in exhaust gas temperature to an effective activation temperature after said engine start.

2. An exhaust gas purifying system as defined in claim 1, wherein said temperature control means causes said engine operation control means to alter an excessive air ratio of said air-fuel mixture to a value greater than one (1) during said specific time interval.

3. An exhaust gas purifying system as defined in claim 1, wherein said temperature control means causes said engine operation control means to alter an in-cylinder air-fuel ratio at which said air-fuel mixture is introduced into said engine and supply part of intake air directly to said exhaust gas upstream from said catalytic converter so as to alter a virtual exhaust air-fuel ratio, to be greater than 14.5.

4. An exhaust gas purifying system as defined in claim 1, wherein said temperature control means causes said engine operation control means to alter said ignition timing to said point after top-dead-center after the engine has attained a specified speed of revolution subsequently to said engine start.

5. An exhaust gas purifying system as defined in claim 1, wherein said engine operation control means includes a heater incorporated lambda oxygen ($\lambda O_2$) sensor for monitoring a concentration of oxygen in the exhaust gas, based on which said engine operation control means performs feedback control of said in-cylinder air-fuel ratio toward a stoichiometric air-fuel ratio as a target ratio during said time interval.

6. An exhaust gas purifying system as defined in claim 1, wherein said temperature control means cases said engine operation control means to retard said ignition timing during said time interval according to a warmed condition detected at said engine start by said thermal condition monitoring means.

7. An exhaust gas purifying system as defined in claim 1, wherein said temperature control means cases said engine operation control means to change an amount of intake air introduced into the engine during said time interval according to a warmed condition detected at said engine start by said thermal condition monitoring means.

8. An exhaust gas purifying system as defined in claim 1, wherein said temperature control means causes said engine operation control means to regulate an amount of intake air introduced into the engine independently from operation of a throttle valve of said engine operation control means so as to maintain a specified speed of the engine in said time interval.

9. An exhaust gas purifying system as defined in claim 8, wherein said temperature control means causes said engine operation control means to regulate at the beginning of said time interval an amount of intake air introduced into the engine independently from operation of said throttle valve so as to maintain said specified engine speed and thereafter to further retard said ignition timing so as to decrease engine speed below said specified engine speed during said time interval.

10. An exhaust gas purifying system as defined in claim 8, wherein said temperature control means causes said engine control means to retard said ignition timing to a point more later but before top-dead-center when the vehicle starts under a driving condition during said time interval than when driving under the same driving condition after said time interval.

11. An exhaust gas purifying system as defined in claim 10, wherein, when the vehicle starts during said time interval, said temperature control means causes said engine control means to retard said ignition timing to a point more later but before top-dead-center while the vehicle drives with engine output lower than a specified level than while driving with the same level of engine output.

12. An exhaust gas purifying system as defined in claim 10, wherein, when the vehicle starts during said time interval, said temperature control means causes said engine control means to retard said ignition timing to a point after top-dead-center while the vehicle drives with engine output lower than a specified level and to a point before top-dead-center while the vehicle drives with engine output higher than said specified level.

13. An exhaust gas purifying system as defined in claim 1, wherein said combustion promoting means includes turbulence generating means for generating enhanced turbulence of said air-fuel mixture in a cylinder of the engine.

14. An exhaust gas purifying system as defined in claim 13, wherein said turbulence generating means generates a swirl of said air-fuel mixture.

15. An exhaust gas purifying system as defined in claim 13, wherein said turbulence generating means generates a tumble of said air-fuel mixture.

16. An exhaust gas purifying system as defined in claim 13, wherein said turbulence generating means includes a low lift type of an intake valve for accelerating a flow of intake air entering said cylinder.

17. An exhaust gas purifying system as defined in claim 1, wherein said combustion promoting means includes an air-mixing type of a fuel injector for delivering fuel mixed with air.

18. An exhaust gas purifying system as defined in claim 1, wherein said combustion promoting means includes ignition means for providing high ignition energy.

19. An exhaust gas purifying system as defined in claim 1, wherein said temperature control means terminates said rise in exhaust gas temperature after said time interval.

20. An exhaust gas purifying system as defined in claim 1, and further comprising temperature monitoring means for detecting a specified temperature of the exhaust gas after said catalytic converter at which said temperature control means terminates said time interval for said rise in exhaust gas temperature.

21. An exhaust gas purifying system as defined in claim 1, and further comprising temperature monitoring means for detecting a specified temperature of engine cooling water at which said temperature control means terminates said time interval for said rise in exhaust gas temperature.

22. An exhaust gas purifying system as defined in claim 1, wherein said temperature control means causes said engine operation control means to set said ignition timing so as to produce a rise in in-cylinder pressure after the middle of an expansion stroke during said time interval for said rise in exhaust, gas temperature.

23. An exhaust gas purifying system as defined in claim 13, wherein turbulence of said air-fuel mixture generated by said turbulence generating means is greater as compared to normal turbulence before and after ignition.

24. An exhaust gas purifying system as defined in claim 1, wherein an operating speed of the engine is increased when said combustion promoting means is caused to promote combustion of said air-fuel mixture.

25. The exhaust gas purifying system as defined in claim 1, wherein said combustion promoting means includes an intake port for generating a tumble flow in a combustion chamber of the engine.

26. A method of purifying exhaust gas discharged from a reciprocating internal combustion engine equipped with a catalytic converter in an exhaust system, said exhaust gas purifying method comprising the steps of:

monitoring a thermal condition of the engine after an engine start;

retarding an ignition timing at which an air-fuel mixture is fired in the engine to a point after top-dead-center; and promoting combustion of said air-fuel mixture by controlling the engine to burn said air-fuel mixture with a high combustion efficiency so as to stabilize engine cycling, for a time interval so as to cause a rise in exhaust gas temperature when the engine is monitored to be still in a cold condition, and altering an exhaust air-fuel ratio in a range equal to or greater than 14.5 during said time interval, thereby accelerating a rise in temperature of said catalytic converter to an effective activation temperature.

27. An exhaust gas purifying method as defined in claim 26, wherein said ignition timing is set so as to produce a rise in in-cylinder pressure after the middle of an expansion stroke during said time interval for said rise in exhaust gas temperature.

28. An exhaust gas purifying system having a catalytic converter in an exhaust line for purifying exhaust gas for a reciprocating internal combustion engine of a vehicle, said exhaust gas purifying system comprising:

thermal condition monitoring means for monitoring a temperature condition of the engine;

engine operation control means for controlling operation of the engine;

turbulence generating means for generating enhanced turbulence of an air-fuel mixture in a cylinder of the engine; and temperature control means for controlling a rise in exhaust gas temperature to an effective activation temperature of said catalytic converter during a time interval from an engine start, said temperature control means, while said thermal condition monitoring means detects a specified cold temperature condition of the engine, causing said engine operation control means to retard an ignition timing at which said air-fuel mixture is fired in the engine to a point after top-dead-center during said time interval and causing said turbulence generating means to make an air-fuel mixture rate constant before an ignition time at which a spark plus is fired, to create a turbulent energy at said ignition time when said turbulence generating means is operated greater than a turbulent energy at said ignition time when said turbulence generating means is not operated and to maintain said turbulent energy after said ignition time, thereby accelerating said rise in exhaust gas temperature to an effective activation temperature after said engine start.

29. An exhaust gas purifying system as defined in claim 28, wherein said turbulence generating means generates a swirl of said air-fuel mixture.

30. A exhaust gas purifying system as defined in claim 29, wherein swirl ratio of said air-fuel mixture is greater than 1.0.

31. An exhaust gas purifying system as defined in claim 28, wherein said turbulence generating means generates a tumble of said air-fuel mixture.

32. An exhaust gas purifying system as defined in claim 31, wherein a tumble ratio of said air-fuel mixture is greater than 1.5.

33. An exhaust gas purifying system as defined in claim 28, wherein said turbulence generating means includes a low lift intake valve for accelerating a flow of intake air entering said cylinder.

34. An exhaust gas purifying system as defined in claim 28, wherein an operating speed of the engine is increased when said turbulence generating means is caused to generate enhanced turbulence of said air-fuel mixture.

35. An exhaust gas purifying system having a catalytic converter in an exhaust line for purifying exhaust gas for a reciprocating internal combustion engine of a vehicle, said exhaust gas purifying system comprising:

thermal condition monitoring means for monitoring a temperature condition of the engine;

engine operation control means for controlling operation of the engine;

turbulence generating means for generating enhanced turbulence of an air-fuel mixture in a cylinder of the engine; and temperature control means for controlling a rise in exhaust gas temperature to an effective activation temperature of said catalytic converter during a time interval from an engine start, said temperature control means, while said thermal condition monitoring means detects a specified cold temperature condition of the engine, causing said engine operation control means to retard an ignition timing at which said air-fuel mixture is fired in the engine to a point after top-dead-center during said time interval and causing said turbulence generating means to make an air-fuel mixture rate constant before an ignition time at which a spark plug is fired, to create a turbulent energy at said ignition time when said turbulence generating means is operated greater than a turbulent energy at said ignition time when said turbulence generating means is not operated and to maintain said turbulent energy after said ignition time, thereby accelerating said rise in exhaust gas temperature to an effective activation temperature after said engine start wherein said engine operation control means further alters an exhaust air-fuel ratio in a range equal to or greater than 14.5 during said specific time interval.

36. An exhaust gas purifying system having a catalytic converter in an exhaust line for purifying exhaust gas for a reciprocating internal combustion engine of a vehicle, said exhaust gas purifying system comprising:

thermal condition monitoring means for monitoring a warmed condition of the engine;

engine operation control means for controlling operation of the engine and altering an exhaust air-fuel ratio in a range equal to or greater than 14.5 during a time interval from an engine start; and temperature control means for controlling a rise in exhaust gas temperature to an effective activation temperature of said catalytic converter during said time interval and, while said thermal condition monitoring means detects a specified cold condition of the engine, for causing said engine operating control means to retard an ignition timing at which an air-fuel mixture is fired in the engine to a point after top-dead-center during said time interval, so as thereby to accelerate said rise in exhaust gas temperature to an effective activation temperature after said engine start.

37. An exhaust gas purifying system as defined in claim 36, wherein said temperature control means causes said engine operation control means to regulate an amount of intake air introduced into the engine independently from operation of a throttle valve of the engine so as to maintain a specified speed of the engine in said time interval.

38. An exhaust gas purifying system as defined in claim 36, wherein said engine operation control means controls a throttle valve of the engine to maintain the engine at a relatively high engine speed during said acceleration of said rise in said rise in exhaust gas temperature.

39. An exhaust gas purifying system as defined in claim 38, wherein said temperature control means causes said engine operation control means to regulate at the beginning of said time interval an amount of intake air introduced into the engine independently from operation of said throttle valve so as to maintain said specified engine speed and thereafter to further retard said ignition timing so as to decrease engine speed below said specified engine speed during said timing interval.

40. An exhaust gas purifying system as defined in claim 38, wherein said temperature control means causes said engine operation control means to retard said ignition timing to a point of time more later but before top-dead-center when the vehicle starts under a driving condition during said time interval than when driving under the same driving condition after said time interval.

41. An exhaust gas purifying system having a catalytic converter in an exhaust line for purifying exhaust gas for a reciprocating internal combustion engine of a vehicle, said exhaust gas purifying system comprising:

thermal condition monitoring means for monitoring a warmed condition of the engine;

engine operation control means for controlling operation of the engine;

combustion promoting means operative only during a cold condition of the engine for promoting combustion of an air-fuel mixture in the engine; and temperature control means for controlling a rise in exhaust gas temperature to an effective activation temperature of said catalytic converter during said time interval and, while said thermal condition monitoring means detects a specified cold condition of the engine, for causing said engine operating control means to retard an ignition timing at which an air-fuel mixture is fired in the engine to a point after top-dead-center during said time interval, so as thereby to accelerate said rise in exhaust gas temperature to an effective activation temperature after said engine start.

42. An exhaust gas purifying system having a catalytic converter in an exhaust line for purifying exhaust gas for a reciprocating internal combustion engine of a vehicle, said exhaust gas purifying system comprising:

thermal condition monitoring means for monitoring a warmed condition of the engine;

combustion control means for generating enhanced turbulence of an air-fuel mixture in a cylinder of the engine;

engine operation control means for controlling operation of the engine; and temperature control means for controlling a rise in exhaust gas temperature to an effective activation temperature of said catalytic converter during said time interval and, while said thermal condition monitoring means detects a specified cold condition of the engine, for causing said engine operating control means to retard an ignition timing at which an air-fuel mixture is fired in the engine to a point after top-dead-center during said time interval, so as thereby to accelerate said rise in exhaust gas temperature to an effective activation temperature after said engine start.

43. A method of purifying exhaust gas discharged from a reciprocating internal combustion engine equipped with a catalytic converter in an exhaust system, said exhaust gas purifying means comprising the steps of:

monitoring a thermal condition of the engine after an engine start;

altering an exhaust air-fuel ratio in a range equal to or greater than 14.5 during a specified time interval from said engine start; and retarding an ignition timing at which an air-fuel mixture is fired in the engine to a point after top-dead-center during said time interval so as to cause a rise in exhaust gas temperature when the engine is monitored to be still in a cold condition, thereby accelerating a rise in temperature of said catalytic converter to an effective activation temperature.

44. An exhaust gas purifying system having a catalytic converter in an exhaust line for purifying exhaust gas for a reciprocating internal combustion engine of a vehicle, said exhaust gas purifying system comprising:

thermal condition monitor which monitors a temperature condition of the engine;

engine operation control operative to control operation of the engine;

turbulence generator which generates enhanced turbulence of an air-fuel mixture in a cylinder of the engine; and temperature control operative to control a rise in exhaust gas temperature to an effective activation temperature of said catalytic converter during a time interval from an engine start, said temperature control, while said thermal condition monitor detects a specified cold temperature condition of the engine, causing said engine operation control to retard an ignition timing at which said air-fuel mixture is fired in the engine to a point after top-dead-center during said time interval and causing said turbulence generator to make an air-fuel mixture rate constant before an ignition time at which a spark plug is fired, to create a turbulent energy at said ignition time when said turbulence generator is operated greater than a turbulent energy at said ignition time when said turbulence generator is not operated and to maintain said turbulent energy after said ignition time, thereby accelerating said rise in exhaust gas temperature to an effective activation temperature after said engine start.

45. An exhaust gas purifying system having a catalytic converter in an exhaust line for purifying exhaust gas for a reciprocating internal combustion engine of a vehicle, said exhaust gas purifying system comprising:

thermal condition monitor which monitors a warmed condition of the engine;

engine operation control operative to control operation of the engine and alter an exhaust air-fuel ratio in a range equal to or greater than 14.5 during a time interval from an engine start; and temperature control which controls a rise in exhaust gas temperature to an effective activation temperature of said catalytic converter during said time interval and, while said thermal condition monitor detects a specified cold condition of the engine, causes said engine operating control to retard an ignition timing at which an air-fuel mixture is fired in the engine to a point after top-dead-center during said time interval, so as thereby to accelerate said rise in exhaust gas temperature to an effective activation temperature after said engine start.

46. An exhaust gas purifying system having a catalytic converter in an exhaust line for purifying exhaust gas for a reciprocating internal combustion engine of a vehicle, said exhaust gas purifying system comprising:

thermal condition monitor which monitors a warmed condition of the engine;

engine operation control operative to control operation of the engine;

combustion promotor operative only during a cold condition of the engine for promoting combustion of an air-fuel mixture in the engine; and temperature control operative to control a rise in exhaust gas temperature to an effective activation temperature of said catalytic converter during said time interval and, while said thermal condition monitor detects a specified cold condition of the engine, for causing said engine operating control to retard an ignition timing at which an air-fuel mixture is fired in the engine to a point after top-dead-center during said time interval, so as thereby to accelerate said rise in exhaust gas temperature to an effective activation temperature after said engine start.

47. An engine control system for a reciprocating internal combustion engine of a vehicle equipped with an exhaust gas purifying system having a catalytic converter in an exhaust line for purifying exhaust gas from the engine, said engine control system comprising:

ignition means extending in a combustion chamber of the engine for firing an air-fuel mixture;

thermal condition monitoring means for monitoring a thermal condition of the engine;

fuel supply control means for supplying fuel into said combustion chamber so as to provide an exhaust air-fuel ratio of approximately 14.7 while the engine is monitored to be still in a cold condition after an engine start; and mixture control means for creating a substantially homogeneous distribution of said air-fuel mixture in said combustion chamber before said ignition means ignites said air-fuel mixture.

48. An engine control system as defined in claim 47, and further comprising an ignition control means for controlling said ignition means to retard an ignition time at which said ignition means ignites said air-fuel mixture in said combustion chamber to a point of time after top-dead-center in a compression stroke while the engine is monitored to be still in a cold condition.

49. An engine control system as defined in claim 48, wherein said ignition control means for controlling said ignition means to retard said ignition time to a point of time after top-dead-center in a compression stroke for during a specific time interval from said engine start while the engine is monitored to be still in a cold condition but before top-dead-center in a compression stroke after said time interval while the engine is monitored to be still in a cold condition.

50. An engine control system as defined in claim 48, and further comprising an air-flow sensor operative to detect of an intake air quantity introduced into the engine and a heater equipped oxygen ($O_2$) sensor disposed in the exhaust line and operative to monitor an oxygen concentration of the exhaust gas, wherein said fuel supply control means supplies fuel into said combustion chamber according to said intake air quantity in feed-forward control until said heater equipped oxygen ($O_2$) sensor is activated after a point of time that the engine is monitored to be still in a cold condition after an engine start and according to said intake air quantity and said oxygen concentration in feed-back control after said heater equipped oxygen ($O_2$) sensor is activated while the engine is monitored to be still in a cold condition after said engine start, so as thereby to provide an exhaust air-fuel ratio of approximately 14.7.

51. An engine control system as defined in claim 47, and further comprising an ignition control means for controlling said ignition means to regulate an ignition time at which said ignition means ignites said air-fuel mixture in said combustion chamber so as to provide an increase in cylinder pressure after a middle point in an expansion stroke while the engine is monitored to be still in a cold condition.

52. An engine control system as defined in claim 51, wherein said ignition control means controls said ignition means to regulate said ignition time to a point 10 degrees after top-dead-center in a compression stroke.

53. An engine control system as defined in claim 47, wherein said mixture control means controls an intake air flow introduced into said combustion chamber to create a homogeneous distribution of said air-fuel mixture in said combustion chamber before said ignition means ignites said air-fuel mixture.

54. An engine control system as defined in claim 53, wherein said mixture control means generates a swirl of an intake air flow introduced into said combustion chamber to create a homogeneous distribution of said air-fuel mixture in said combustion chamber before said ignition means ignites said air-fuel mixture.

55. An engine control system as defined in claim 53, wherein said mixture control means generates a tumble of an intake air flow introduced into said combustion chamber to create a homogeneous distribution of said air-fuel mixture in said combustion chamber before said ignition means ignites said air-fuel mixture.

56. An engine control system as defined in claim 47, wherein said thermal condition monitoring means monitors a temperature of engine cooling water based on which the engine is determined to be in a cold condition or not.

57. An engine control system for a reciprocating internal combustion engine of a vehicle equipped with an exhaust gas purifying system having a catalytic converter in an exhaust line for purifying exhaust gas from the engine, said engine control system comprising:

an air-flow sensor operative to detect of an intake air quantity introduced into the engine;

a spark plug extending in a combustion chamber of the engine which is fired to ignite an air-fuel mixture;

a fuel injector operative to deliver fuel into said combustion chamber;

a temperature sensor operative to monitor a temperature of engine cooling water;

a controller operative to control said fuel injector to deliver fuel into said combustion chamber according to said intake air quantity so as to provide an exhaust air-fuel ratio of approximately 14.7 while said temperature sensor monitors said temperature of engine cooling water lower than a specified value; and an intake air passage connected to said combustion chamber to produce an air stream with which said substantially homogeneous distribution of said air-fuel mixture is created in said combustion chamber before said spark plug ignites said air-fuel mixture.

58. An engine control system for a reciprocating internal combustion engine of a vehicle equipped with an exhaust gas purifying system having a catalytic converter in an exhaust line for purifying exhaust gas from the engine, said engine control system comprising:

an air-flow sensor operative to detect of an intake air quantity introduced into the engine;

a spark plug extending in a combustion chamber of the engine which is fired to ignite an air-fuel mixture;

an igniter operative to fire said spark plug;

a fuel injector operative to deliver fuel into said combustion chamber;

a temperature sensor operative to monitor a temperature of engine cooling water;

a controller operative to provide an injection signal for causing said fuel injector to deliver fuel into said combustion chamber according to said intake air quantity so as to provide an exhaust air-fuel ratio of approximately 14.7 while said temperature sensor monitors said temperature of engine cooling water lower than a specified value, and to provide an ignition signal for causing said igniter to fire said spark plug at a point of time after top-dead-center in a compression stroke; and an intake air passage connected to said combustion chamber to produce an air stream with which said substantially homogeneous distribution of said air-fuel mixture is created in said combustion before said spark plug ignites said air-fuel mixture.

59. An engine control system for a reciprocating internal combustion engine of a vehicle equipped with an exhaust gas purifying system having a catalytic converter in an exhaust line for purifying exhaust gas from the engine, said engine control system comprising:

an air-flow sensor operative to detect of an intake air quantity introduced into the engine;

a spark plug extending in a combustion chamber of the engine which is fired to ignite an air-fuel mixture;

an igniter operative to fire said spark plug;

a fuel injector operative to deliver fuel into said combustion chamber;

a temperature sensor operative to monitor a temperature of engine cooling water;

a controller operative to provide an injection signal for causing said fuel injector to deliver fuel into said combustion chamber according to said intake air quantity so as to provide an exhaust air-fuel ratio of approximately 14.7 while said temperature sensor monitors said temperature of engine cooling water lower than a specified value, and to provide an ignition signal for causing said igniter to fire said spark plug at a point of time after top-dead-center in a compression stroke during a specified time interval from a point of time that said temperature sensor monitors said temperature of engine cooling water lower than said specified value and at a point of time before a top-dead-center in a compression stroke after said time interval; and an intake air passage connected to said combustion chamber to produce an air stream with which said substantially homogeneous distribution of said air-fuel mixture is created in said combustion chamber before said spark plug ignites said air-fuel mixture.

60. An engine control system for a reciprocating internal combustion engine of a vehicle equipped with an exhaust gas purifying system having a catalytic converter in an exhaust line for purifying exhaust gas from the engine, said engine control system comprising:

an air-flow sensor operative to detect of an intake air quantity introduced into the engine;

a spark plug extending in a combustion chamber of the engine which is fired to ignite an air-fuel mixture;

an igniter operative to fire said spark plug;

a fuel injector operative to deliver fuel into said combustion chamber;

a heater equipped oxygen ($O_2$) sensor disposed in the exhaust line and operative to monitor an oxygen concentration of the exhaust gas;

a temperature sensor operative to monitor a temperature of engine cooling water;

a controller operative to provide an injection signal for causing said fuel injector to deliver fuel into said combustion chamber according to said intake air quantity in feed-forward control until said heater equipped oxygen ($O_2$) sensor is activated after a point of time that said temperature sensor monitors said temperature of engine cooling water lower than a specified value and according to said intake air quantity and said oxygen concentration in feed-back control after said heater equipped oxygen ($O_2$) sensor is activated, so as thereby to provide an exhaust air-fuel ratio of approximately 14.7, and to provide an ignition signal for causing said igniter to fire said spark plug at a point of time after top-dead-center in a compression stroke during a specified time interval from a point of time that said temperature sensor monitors said temperature of engine cooling water lower than said specified value and a point of time before top-dead-center in a compression stroke after said time interval; and an intake air passage connected to said combustion chamber to produce an air stream with which said substantially homogeneous distribution of said air-fuel mixture is created in said combustion chamber before said spark plug ignites said air-fuel mixture.

61. An engine control system for a reciprocating internal combustion engine of a vehicle equipped with an exhaust gas purifying system having a catalytic converter in an exhaust line for purifying exhaust gas from the engine, said engine control system comprising:

a spark plug extending in a combustion chamber of the engine which is fired to ignite an air-fuel mixture;

an igniter operative to fire said spark plug;

a fuel injector operative to deliver fuel into said combustion chamber;

a temperature sensor operative to monitor a temperature of engine cooling water;

a controller operative to provide an injection signal for causing said fuel injector to deliver fuel into said combustion chamber and an ignition signal for causing said igniter to fire said spark plug so as to provide an increase in cylinder pressure after a middle point in an expansion stroke while said temperature sensor monitors a temperature of engine cooling water lower than a specified value; and an intake air passage connected to said combustion chamber to produce an air stream with which said substantially homogeneous distribution of said air-fuel mixture is created in said combustion chamber before said spark plug ignites said air-fuel mixture.

62. An engine control system for a reciprocating internal combustion engine of a vehicle equipped with an exhaust gas purifying system having a catalytic converter in an exhaust line for purifying exhaust gas from the engine, said engine control system comprising:

an air-flow sensor operative to detect of an intake air quantity introduced into the engine;

a spark plug extending in a combustion chamber of the engine which is fired to ignite an air-fuel mixture;

a fuel injector operative to deliver fuel into said combustion chamber;

a heater equipped oxygen ($O_2$) sensor disposed in the exhaust line and operative to monitor an oxygen concentration of the exhaust gas;

a temperature sensor operative to monitor a temperature of engine cooling water;

a controller operative to provide an injection signal for causing said fuel injector to deliver fuel into said combustion chamber according to said intake air quantity in feed-forward control until said heater equipped oxygen ($O_2$) sensor is activated after a point of time that said temperature sensor monitors said temperature of engine cooling water lower than a specified value and according to said intake air quantity and said oxygen concentration in feed-back control after said heater equipped oxygen ($O_2$) sensor is activated, so as thereby to provide an exhaust air-fuel ratio of approximately 14.7; and an intake air passage connected to said combustion chamber to produce an air stream with which said substantially homogeneous distribution of said air-fuel mixture is created in said combustion chamber before said spark plug ignites said air-fuel mixture.

63. An engine control method of controlling engine operation to purify exhaust gas from a reciprocating internal combustion engine of a vehicle equipped with an exhaust gas purifying system having a catalytic converter in an exhaust line, said engine control method comprising the steps of:

monitoring a thermal condition of the engine;

supplying fuel into said combustion chamber so as to provide an exhaust air-fuel ratio greater than approximately 14.5 while the engine is monitored to be still in a cold condition after an engine start; and creating a substantially homogeneous distribution of said air-fuel mixture in said combustion chamber before said air-fuel mixture is ignited.

64. An engine control method as defined in claim 63, and further comprising the step of retarding an ignition time at which said air-fuel mixture is ignited.

65. An engine control method as defined in claim 64, wherein said ignition time is retarded to a point of time after top-dead-center.

66. An engine control method as defined in claim 65, wherein said ignition time is retarded to a point of time more later but before top-dead-center while the vehicle starts under a driving condition during a specified time interval from an engine start than while driving under the same driving condition after said time interval.

67. An engine control method as defined in claim 66, wherein, when the vehicle starts during said time interval, said ignition time is retarded to a point of time more later but before top-dead-center while the vehicle drives with engine output lower than a specified level than while driving with the same level of engine output.

68. An engine control method as defined in claim 66, wherein, when the vehicle starts during said time interval, said ignition time is retarded to a point of time after top-dead-center while the vehicle drives with engine output lower than a specified level and to a point of time before top-dead-center while the vehicle drives with engine output higher than said specified level.

69. An engine control method as defined in claim 66, wherein said ignition time is retarded during a specified time interval from a point of time that the engine attains a specified speed of rotation after a complete explosion.

70. An engine control method as defined in claim 66, wherein said ignition time is retarded until the exhaust gas attains a specified temperature.

71. An engine control method as defined in claim 70, wherein said exhaust gas temperature is measured after the catalytic converter.

72. An engine control method as defined in claim 63, wherein said substantially homogeneous distribution of said air-fuel mixture is created by an intake air stream in said combustion chamber.

73. An engine control method as defined in claim 72, wherein said substantially homogeneous distribution of said air-fuel mixture is created by a swirl of said intake air stream in said combustion chamber.

74. An exhaust gas purifying system as defined in claim 73, wherein said swirl has a swirl ratio greater than 1.0.

75. An exhaust gas purifying system as defined in claim 72, wherein said substantially homogeneous distribution of said air-fuel mixture is created by a tumble of said intake air stream in said combustion chamber.

76. An exhaust gas purifying system as defined in claim 75, wherein said tumble has a tumble ratio greater than 1.5.

77. An exhaust gas purifying system as defined in claim 63, wherein said exhaust air-fuel ratio is approximately 14.7.

78. An engine control method as defined in claim 63, wherein the control of engine operation is started from a point of time that the engine attains a specified speed of rotation after a complete explosion.

79. An engine control method as defined in claim 63, wherein the control of engine operation is started when a temperature of engine cooling water is lower than a specified value.

80. An engine control method as defined in claim 63, wherein said exhaust air-fuel ratio before the catalytic converter is greater than approximately 14.5.

81. An engine control method as defined in claim 80, wherein air is introduced into the exhaust line before the catalytic converter so as to provide said exhaust air-fuel ratio greater than approximately 14.5.

82. An engine control method as defined in claim 63, and further comprising the step of monitoring an oxygen concentration of the exhaust gas by a heater equipped oxygen ($O_2$) sensor disposed in the exhaust line, wherein fuel is delivered into said combustion chamber according to at least said oxygen concentration in feed-back control so as thereby to provide an exhaust air-fuel ratio of approximately 14.5.

83. An engine control method as defined in claim 82, and further comprising the step of monitoring an intake air quantity introduced into the engine wherein fuel is delivered into said combustion chamber according to said intake air quantity in feed-forward control until said heater equipped oxygen ($O_2$) sensor is activated after a point of time that the engine is monitored to be still in a cold condition after an engine start and according to said intake air quantity and said oxygen concentration in feed-back control after said heater equipped oxygen ($O_2$) sensor is activated while the engine is monitored to be still in a cold condition after said engine start, so as thereby to provide an exhaust air-fuel ratio of approximately 14.5.

84. An engine control method as defined in claim 63, and further comprising the step of increasing an engine speed of rotation to a specified speed of rotation.

85. An engine control method as defined in claim 84, wherein said engine speed of rotation is increased by an increase in intake air quantity by idle speed control.

86. An engine control method as defined in claim 84, and further comprising the step of retarding an ignition time at which said air-fuel mixture is ignited to a point of time after top-dead-center after said engine speed of rotation attains said specified speed of rotation.

87. An engine control method as defined in claim 63, and further comprising the step of controlling combustion of said air-fuel mixture so as to provide an increase in cylinder pressure after a middle point in an expansion stroke while the engine is monitored to be still in a cold condition.

88. An engine control method as defined in claim 87, wherein said combustion is controlled by retarding an ignition time at which said fuel-mixture is ignited later as compared to ordinary combustion control of an air-fuel mixture.

89. An engine control method is defined in claim 88, wherein said ignition time is retarded to a point of time after top-dead-center.

90. An engine control method as defined in claim 89, wherein said ignition time is retarded to a point 10 degrees after top-dead-center in a compression stroke.

91. An engine control method of controlling engine operation to purify exhaust gas from a reciprocating internal combustion engine of a vehicle equipped with an exhaust gas purifying system having a catalytic converter in an exhaust line, said engine control method comprising the steps of:

monitoring a thermal condition of the engine; and controlling combustion of an air-fuel mixture so as to provide an increase in cylinder pressure after a middle point in an expansion stroke while the engine is monitored to be still in a cold condition.

92. An engine control method as defined in claim 91, wherein said combustion is controlled by retarding an ignition time at which said fuel-mixture is ignited later as compared to ordinary combustion control of an air-fuel mixture.

93. An engine control method as defined in claim 92, wherein said ignition time is retarded to a point of time after top-dead-center.

94. An engine control method as defined in claim 93, wherein said ignition time is retarded to a point 10 degrees after top-dead-center in a compression stroke.

95. An engine control method as defined in claim 93, wherein said ignition time is retarded to a point of time more later but before top-dead-center while the vehicle starts under a driving condition during a specified time interval from an engine start than while driving under the same driving condition after said time interval.

96. An engine control method as defined in claim 95, wherein, when the vehicle starts during said time interval, said ignition time is retarded to a point of time more later but before top-dead-center while the vehicle drives with engine output lower than a specified level than while driving with the same level of engine output.

97. An engine control method as defined in claim 95, wherein, when the vehicle starts during said time interval, said ignition time is retarded to a point of time after top-dead-center while the vehicle drives with engine output lower than a specified level and to a point of time before top-dead-center while the vehicle drives with engine output higher than said specified level.

98. An engine control method as defined in claim 92, wherein said ignition time is retarded during a specified time interval from a point of time that the engine attains a specified speed of rotation after a complete explosion.

99. An engine control method as defined in claim 92, wherein said ignition time is retarded until the exhaust gas attains a specified temperature.

100. An engine control method as defined in claim 99, wherein said exhaust gas temperature is measured after the catalytic converter.

101. An engine control method as defined in claim 91 and further comprising the steps of supplying fuel into said combustion chamber so as to provide an exhaust air-fuel ratio between approximately 13.5 and 18 while the engine is monitored to be still in a cold condition after an engine start and creating a substantially homogeneous distribution of said air-fuel mixture in said combustion chamber before said air-fuel mixture is ignited.

102. An engine control method as defined in claim 101, wherein said substantially homogeneous distribution of said air-fuel mixture is created by an intake air stream in said combustion chamber.

103. An engine control method as defined in claim 102, wherein said substantially homogeneous distribution of said air-fuel mixture is created by a swirl of said intake air stream in said combustion chamber.

104. An exhaust gas purifying system as defined in claim 103, wherein said swirl has a swirl ratio greater than 1.0.

105. An exhaust gas purifying system as defined in claim 102, wherein said substantially homogeneous distribution of said air-fuel mixture is created by a tumble of said intake air stream in said combustion chamber.

106. An exhaust gas purifying system as defined in claim 105, wherein said tumble has a tumble ratio greater than 1.5.

107. An exhaust gas purifying system as defined in claim 101, wherein said exhaust air-fuel ratio is approximately 14.7.

108. An engine control method as defined in claim 91, wherein the control of engine operation is started from a point of time that the engine attains a specified speed of rotation after a complete explosion.

109. An engine control method as defined in claim 91, wherein the control of engine operation is started when a temperature of engine cooling water is lower than a specified value.

110. An engine control method as defined in claim 91, and further comprising the step of increasing an engine speed of rotation to a specified speed of rotation.

111. An engine control method as defined in claim 110, wherein said engine speed of rotation is increased by an increase in intake air quantity by idle speed control.

112. An engine control method as defined in claim 110, wherein said combustion is controlled so as to provide an increase in cylinder pressure after a middle point in an expansion stroke after the engine attains said specified speed of rotation.

113. An engine control method as defined in claim 112, wherein said ignition time is retarded.

114. An engine control method as defined in claim 91, wherein said exhaust air-fuel ratio before the catalytic converter is greater than approximately 14.5.

115. An engine control method as defined in claim 114, wherein air is introduced into the exhaust line before the catalytic converter so as to provide said exhaust air-fuel ratio greater than approximately 14.5.

116. An engine control method as defined in claim 91, and further comprising the step of monitoring an oxygen concentration of the exhaust gas by a heater equipped oxygen ($O_2$) sensor disposed in the exhaust line, wherein fuel is delivered into said combustion chamber according to at least said oxygen concentration in feed-back control so as thereby to provide an exhaust air-fuel ratio of approximately 14.5.

117. An engine control method as defined in claim 116, and further comprising the step of monitoring an intake air quantity introduced into the engine wherein fuel is delivered into said combustion chamber according to said intake air quantity in feed-forward control until said heater equipped oxygen ($O_2$) sensor is activated after a point of time that the engine is monitored to be still in a cold condition after an engine start and according to said intake air quantity and said oxygen concentration in feed-back control after said heater equipped oxygen ($O_2$) sensor is activated while the engine is monitored to be still in a cold condition after said engine start, so as thereby to provide an exhaust air-fuel ratio of approximately 14.5.

118. An engine control method of controlling engine operation to purify exhaust gas from a reciprocating internal combustion engine of a vehicle equipped with an exhaust gas purifying system having a catalytic converter in an exhaust line, said engine control method comprising the steps of:

monitoring a thermal condition of the engine;

supplying fuel into said combustion chamber so as to provide an exhaust air-fuel ratio greater than approximately 14.5;

creating a substantially homogeneous distribution of said air-fuel mixture in said combustion chamber before said air-fuel mixture is ignited; and retarding said ignition time to a point of time after top-dead-center while the engine is monitored to be still in a cold condition after an engine start.

119. An engine control method of controlling engine operation to purify exhaust gas from a reciprocating internal combustion engine of a vehicle equipped with an exhaust gas purifying system having a catalytic converter in an exhaust line, said engine control method comprising the steps of:

monitoring a thermal condition of the engine;

supplying fuel into said combustion chamber so as to provide an exhaust air-fuel ratio greater than approximately 14.5;

controlling an intake air stream in said combustion chamber to create a substantially homogeneous distribution of said air-fuel mixture in said combustion chamber before said air-fuel mixture is ignited; and retarding said ignition time to a point of time after top-dead-center while the engine is monitored to be still in a cold condition after an engine start.

120. An engine control method of controlling engine operation to purify exhaust gas from a reciprocating internal combustion engine of a vehicle equipped with an exhaust gas purifying system having a catalytic converter in an exhaust line, said engine control method comprising the steps of:

monitoring a thermal condition of the engine;

supplying fuel into said combustion chamber so as to provide an exhaust air-fuel ratio of approximately 14.7;

creating a substantially homogeneous distribution of said air-fuel mixture in said combustion chamber before said air-fuel mixture is ignited;

retarding said ignition time to a point of time after top-dead-center while the engine is monitored to be still in a cold condition after an engine start; and monitoring an oxygen concentration of the exhaust gas by a heater equipped oxygen ($O_2$) sensor disposed in the exhaust line so as to control fuel delivery into said combustion chamber according to at least said oxygen concentration in feed-back control.

121. An engine control method as defined in claim 120, wherein said substantially homogeneous distribution of said air-fuel mixture is created by an intake air stream in said combustion chamber.

122. An engine control method as defined in claim 120, and further comprising the step of monitoring an intake air quantity introduced into the engine wherein fuel is delivered into said combustion chamber according to said intake air quantity in feed-forward control until said heater equipped oxygen ($O_2$) sensor is activated after a point of time that the engine is monitored to be still in a cold condition after an engine start and according to said intake air quantity and said oxygen concentration in feed-back control after said heater equipped oxygen ($O_2$) sensor is activated while the engine is monitored to be still in a cold condition after said engine start.

123. An engine control method of controlling engine operation to purify exhaust gas from a reciprocating internal combustion engine of a vehicle equipped with an exhaust gas purifying system having a catalytic converter in an exhaust line, said engine control method comprising the steps of:

monitoring a thermal condition of the engine;

supplying fuel into said combustion chamber so as to provide an exhaust air-fuel ratio greater than approximately 14.5;

creating a substantially homogeneous distribution of said air-fuel mixture in said combustion chamber before said air-fuel mixture is ignited;

retarding said ignition time to a point of time after top-dead-center while the engine is monitored to be still in a cold condition after an engine start; and introducing air into the exhaust line before the catalytic converter so as to provide said exhaust air-fuel ratio greater than approximately 14.5.

124. An engine control method as defined in claim 123, wherein said substantially homogeneous distribution of said air-fuel mixture is created by an intake air stream in said combustion chamber.

125. An engine control method of controlling engine operation to purify exhaust gas from a reciprocating internal combustion engine of a vehicle equipped with an exhaust gas purifying system having a catalytic converter in an exhaust line, said engine control method comprising the steps of:

monitoring a thermal condition of the engine; and controlling combustion of an air-fuel mixture so as to provide an increase in cylinder pressure after a middle point in an expansion stroke while the engine is monitored to be still in a cold condition;

supplying fuel into said combustion chamber so as to provide an exhaust air-fuel ratio greater than approximately 14.5;

creating a substantially homogeneous distribution of said air-fuel mixture in said combustion chamber before said air-fuel mixture is ignited; and retarding said ignition time to a point of time after top-dead-center while the engine is monitored to be still in a cold condition after an engine start.

126. An engine control method as defined in claim 125, wherein said substantially homogeneous distribution of said air-fuel mixture is created by an intake air stream in said combustion chamber.

* * * * *